(12) United States Patent
Tojima et al.

(10) Patent No.: US 8,482,526 B2
(45) Date of Patent: Jul. 9, 2013

(54) INPUT SYSTEM, PORTABLE TERMINAL, DATA PROCESSOR, AND INPUT METHOD

(75) Inventors: Akira Tojima, Osaka (JP); Taichi Andoh, Osaka (JP); Akihiro Azuma, Osaka (JP); Taichiro Morishita, Osaka (JP); Masaki Takeuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 372 days.

(21) Appl. No.: 12/747,805

(22) PCT Filed: Dec. 11, 2008

(86) PCT No.: PCT/JP2008/072478
§ 371 (c)(1),
(2), (4) Date: Jun. 11, 2010

(87) PCT Pub. No.: WO2009/078325
PCT Pub. Date: Jun. 25, 2009

(65) Prior Publication Data
US 2010/0289746 A1    Nov. 18, 2010

(30) Foreign Application Priority Data

| Dec. 14, 2007 | (JP) | 2007-323795 |
| Dec. 14, 2007 | (JP) | 2007-323796 |
| Dec. 14, 2007 | (JP) | 2007-323797 |
| Dec. 14, 2007 | (JP) | 2007-323798 |
| Dec. 14, 2007 | (JP) | 2007-323799 |

(51) Int. Cl.
*G06F 17/00* (2006.01)

(52) U.S. Cl.
USPC .......................................... 345/168; 715/810

(58) Field of Classification Search
USPC .................. 345/168, 744; 715/810; 455/566, 455/550.1
See application file for complete search history.

(56) References Cited

U.S. PATENT DOCUMENTS

| 2004/0109020 A1* | 6/2004 | Song .............................. 345/744 |
| 2007/0016877 A1* | 1/2007 | Shirakawa et al. ........... 715/810 |
| 2008/0287165 A1* | 11/2008 | Enmei ........................... 455/566 |
| 2009/0124282 A1* | 5/2009 | Kim et al. ................... 455/550.1 |

FOREIGN PATENT DOCUMENTS

| JP | 6-60074 A | 3/1994 |
| JP | 2001-14087 A | 1/2001 |
| JP | 2002-78042 A | 3/2002 |

\* cited by examiner

*Primary Examiner* — Quan-Zhen Wang
*Assistant Examiner* — Yuk Chow
(74) *Attorney, Agent, or Firm* — Birch, Stewart, Kolasch & Birch, LLP

(57) ABSTRACT

An input system, a portable terminal, a data processor, and an input method are provided that can be used to easily input a character of the type permitted to be input. The input system includes the data processor and the portable terminal. The data processor stores an input permitted character type that is a type of characters permitted to be input to a corresponding one of not less than one input box, in association with the corresponding input box. The data processor transmits to the portable terminal the input permitted character type associated with a character input enabled input box. The portable terminal sets the type of characters to be input, to the input permitted character type as received, and transmits to the data processor an input character that is of the input permitted character type as set.

23 Claims, 43 Drawing Sheets

FIG.8

USER REGISTRATION

PLEASE INPUT USER INFORMATION, ID AND PASSWORD.

| Field | | |
|---|---|---|
| FULL NAME (FULL WIDTH) | FAMILY NAME [IW212/SL205] | FIRST NAME [IW214] |
| READING IN KANA (FULL WIDTH) | FAMILY NAME [IW222] | FIRST NAME [IW224] |
| DATE OF BIRTH (HALF WIDTH) | [IW232] YEAR [IW234] MONTH [IW236] DAY | |
| POSTAL CODE (HALF WIDTH NUMERAL) | [IW242] — [IW244] | |
| ADDRESS (FULL WIDTH) | [IW252] | |
| PHONE NUMBER (HALF WIDTH NUMERAL) | [IW262] — [IW264] — [IW266] | |
| USER ID (HALF WIDTH ALPHANUMERIC CHARACTER) | [IW272] | |
| PASSWORD (HALF WIDTH ALPHANUMERIC CHARACTER) | [IW282] | |

DO YOU REGISTER YOURSELF WITH ABOVE DETAILS?

| INPUT BOX ID | PERMITTED CHARACTER TYPE | INPUT DATA CAPACITY (BYTE) |
|---|---|---|
| TX01 | KANJI | 16 |
| TX02 | KANJI | 16 |
| TX03 | HIRAGANA | 32 |
| TX04 | HIRAGANA | 32 |
| TX05 | HALF-NUMERAL | 4 |
| TX06 | HALF-NUMERAL | 2 |
| TX07 | HALF-NUMERAL | 2 |
| TX08 | HALF-NUMERAL | 6 |
| TX09 | HALF-NUMERAL | 6 |
| TX10 | KANNJI, HIRAGANA, NUMERAL | 60 |
| TX11 | HALF-NUMERAL | 4 |
| TX12 | HALF-NUMERAL | 6 |
| TX13 | HALF-NUMERAL | 6 |
| TX14 | HALF-ALPH-UPPER, HALF-ALPH-LOWER, HALF-NUMERAL | 10 |
| TX15 | HALF-ALPH-UPPER, HALF-ALPH-LOWER, HALF-NUMERAL, [PASSWORD] | 10 |

| LABEL | DESCRIPTION |
|---|---|
| KANJI | KANJI |
| HIRAGANA | HIRAGANA |
| KATAKANA | FULL WIDTH KATAKANA |
| HALF-KATA | HALF WIDTH KATAKANA |
| ALPH-UPPER | FULL WIDTH ALPHABET UPPERCASE |
| ALPH-LOWER | FULL WIDTH ALPHABET LOWERCASE |
| HALF-ALPH-UPPER | HALF WIDTH ALPHABET UPPERCASE |
| HALF-ALPH-LOWER | HALF WIDTH ALPHABET LOWERCASE |
| NUMERAL | FULL WIDTH NUMERAL |
| HALF-NUMERAL | HALF WIDTH NUMERAL |
| PASSWORD | PASSWORD |

| INPUT BOX ID | PERMITTED CHARACTER TYPE | INPUT DATA CAPACITY (BYTE) |
|---|---|---|
| TX04 | HIRAGANA | 32 |

| INPUT BOX ID | INPUT CHARACTER STRING | DATA SIZE (BYTE) |
|---|---|---|
| TX04 | たろう | 6 |

| INHIBITED CHARACTER TYPE | CORRESPONDING CHARACTER TYPE |
|---|---|
| HALF WIDTH KATAKANA | FULL WIDTH KATAKANA |
| FULL WIDTH ALPHABET UPPERCASE | HALF WIDTH ALPHABET UPPERCASE |
| FULL WIDTH ALPHABET LOWERCASE | HALF WIDTH ALPHABET LOWERCASE |
| FULL WIDTH NUMERAL | HALF WIDTH NUMERAL |

| INPUT BOX ID | PERMITTED CHARACTER TYPE | INPUT DATA CAPACITY (BYTE) | CHARACTER STRING TYPE |
|---|---|---|---|
| TX01 | KANJI | 16 | NAME-SEI |
| TX02 | KANJI | 16 | NAME-MEI |
| TX03 | HIRAGANA | 32 | NAME-SEI-KANA |
| TX04 | HIRAGANA | 32 | NAME-MEI-KANA |
| TX05 | HALF-NUMERAL | 4 | BIRTHDAY-Y |
| TX06 | HALF-NUMERAL | 2 | BIRTHDAY-M |
| TX07 | HALF-NUMERAL | 2 | BIRTHDAY-D |
| TX08 | HALF-NUMERAL | 6 | ZIP-CODE-1 |
| TX09 | HALF-NUMERAL | 6 | ZIP-CODE-2 |
| TX10 | KANNJI, HIRAGANA, NUMERAL | 60 | ADDRESS |
| TX11 | HALF-NUMERAL | 4 | TEL-NUM-1 |
| TX12 | HALF-NUMERAL | 6 | TEL-NUM-2 |
| TX13 | HALF-NUMERAL | 6 | TEL-NUM-3 |
| TX14 | HALF-ALPH-UPPER, HALF-ALPH-LOWER, HALF-NUMERAL | 10 | USER-ID |
| TX15 | HALF-ALPH-UPPER, HALF-ALPH-LOWER, HALF-NUMERAL, [PASSWORD] | 10 | PASSWORD |

FIG.18

| LABEL | DESCRIPTION T110A |
|---|---|
| NAME-SEI | FAMILY NAME (KANJI) |
| NAME-MEI | FIRST NAME (KANJI) |
| NAME-SEI-KANA | READING IN KANA OF FAMILY NAME |
| NAME-MEI-KANA | READING IN KANA OF FIRST NAME |
| BIRTHDAY-Y | DATE OF BIRTH (YEAR) |
| BIRTHDAY-M | DATE OF BIRTH (MONTH) |
| BIRTHDAY-D | DATE OF BIRTH (DAY) |
| ZIP-CODE-1 | POSTAL CODE (FIRST HALF) |
| ZIP-CODE-2 | POSTAL CODE (SECOND HALF) |
| ADDRESS | ADDRESS |
| TEL-NUM-1 | PHONE NUMBER (AREA CODE) |
| TEL-NUM-2 | PHONE NUMBER (FIRST HALF) |
| TEL-NUM-3 | PHONE NUMBER (SECOND HALF) |
| USER-ID | USER ID |
| PASSWORD | PASSWORD |

| INPUT BOX ID | PERMITTED CHARACTER TYPE | INPUT DATA CAPACITY (BYTE) | CHARACTER STRING TYPE |
|---|---|---|---|
| TX04 | HIRAGANA | 32 | NAME-MEI-KANA |

| NUMBER | CHARACTER STRING TYPE | INPUT CHARACTER STRING |
|---|---|---|
| 1 | NAME-MEI-KANA | たろう |

| NUMBER | CHARACTER STRING TYPE | INPUT CHARACTER STRING |
|---|---|---|
| 1 | NAME-SEI | 秋春 |
| 2 | NAME-MEI | 太郎 |
| 3 | NAME-SEI-KANA | あきはる |
| 4 | NAME-MEI-KANA | たろう |
| 5 | BIRTHDAY-Y | 1979 |
| 6 | BIRTHDAY-M | 10 |
| 7 | BIRTHDAY-D | 15 |
| 8 | ZIP-CODE-1 | 111 |
| 9 | ZIP-CODE-2 | 2222 |
| 10 | ADDRESS | A県B市…<br>(A PREFECTURE, B CITY ...) |
| 11 | TEL-NUM-1 | 01 |
| 12 | TEL-NUM-2 | 2222 |
| 13 | TEL-NUM-3 | 3333 |
| 14 | USER-ID | aki1234 |
| 15 | PASSWORD | abcde |

FIG.24

USER REGISTRATION
PLEASE INPUT USER INFORMATION, ID AND PASSWORD.

| | | | | |
|---|---|---|---|---|
| FULL NAME (FULL WIDTH) | FAMILY NAME | 秋春 (IW212, SL205) | FIRST NAME | 太郎 (IW214) |
| READING IN KANA (FULL WIDTH) | FAMILY NAME | あきはる (IW222) | FIRST NAME | たろう (IW224) |
| DATE OF BIRTH (HALF WIDTH) | 1979 YEAR (IW232) | 10 MONTH (IW234) | 15 DAY (IW236) | |
| POSTAL CODE (HALF WIDTH NUMERAL) | 111 (IW242) — 2222 (IW244) | | | |
| ADDRESS (FULL WIDTH) | A県B市…(A PREFECTURE, B CITY …) (IW252) | | | |
| PHONE NUMBER (HALF WIDTH NUMERAL) | 01 (IW262) — 2222 (IW264) — 3333 (IW266) | | | |
| USER ID (HALF WIDTH ALPHANUMERIC CHARACTER) | aki1234 (IW272) | | | |
| PASSWORD (HALF WIDTH ALPHANUMERIC CHARACTER) | * * * * * * (IW282) | | | |

DO YOU REGISTER YOURSELF WITH ABOVE DETAILS?

| INPUT BOX ID | INPUT COMPLETED CHARACTER STRING |
|---|---|
| TX01 | 秋春 |
| TX02 | 太郎 |
| TX03 | あきはる |
| TX04 | たろう |
| TX05 | 1979 |
| TX06 | 10 |
| TX07 | x 15 |
| TX08 | 111 |
| TX09 | 2222 |
| TX10 | A県B市⋯<br>(A PREFECTURE, B CITY ...) |
| TX11 | 01 |
| TX12 | 2222 |
| TX13 | 3333 |
| TX14 | aki1234 |
| TX15 | abcde |

| INPUT BOX ID | PERMITTED CHARACTER TYPE | INPUT DATA CAPACITY (BYTE) | INPUT COMPLETED CHARACTER STRING | DATA SIZE (BYTE) |
|---|---|---|---|---|
| TX04 | HIRAGANA | 32 | たろう | 6 |

| INPUT BOX ID | INPUT CHARACTER STRING | DATA SIZE (BYTE) |
|---|---|---|
| TX04 | こたろう | 8 |

| INPUT BOX ID | INPUT CHARACTER | DATA SIZE (BYTE) |
|---|---|---|
| TX04 | た | 2 |

| CHARACTER STRING NUMBER | SELECTION CANDIDATE CHARACTER STRING |
|---|---|
| 1 | たかし |
| 2 | たくろう |
| 3 | たなか |
| 4 | たろう |
| ⋮ | ⋮ |

| INPUT BOX ID | SELECTED NUMBER |
|---|---|
| TX04 | 4 |

| INPUT BOX ID | INPUT CHARACTER | DATA SIZE (BYTE) |
|---|---|---|
| TX04 | たろ | 4 |

| CHARACTER STRING NUMBER | SELECTION CANDIDATE CHARACTER STRING |
|---|---|
| 1 | たろう |
| 2 | たろすけ |
| ⋮ | ⋮ |

| NUMBER | INPUT BOX ID | PERMITTED CHARACTER TYPE | INPUT DATA CAPACITY (BYTE) | CHARACTER STRING TYPE |
|---|---|---|---|---|
| 1 | TX01 | KANJI | 16 | NAME-SEI |
| 2 | TX02 | KANJI | 16 | NAME-MEI |
| 3 | TX03 | HIRAGANA | 32 | NAME-SEI-KANA |
| 4 | TX04 | HIRAGANA | 32 | NAME-MEI-KANA |
| 5 | TX05 | HALF-NUMERAL | 4 | BIRTHDAY-Y |
| 6 | TX06 | HALF-NUMERAL | 2 | BIRTHDAY-M |
| 7 | TX07 | HALF-NUMERAL | 2 | BIRTHDAY-D |
| 8 | TX08 | HALF-NUMERAL | 6 | ZIP-CODE-1 |
| 9 | TX09 | HALF-NUMERAL | 6 | ZIP-CODE-2 |
| 10 | TX10 | KANNJI, HIRAGANA, NUMERAL | 60 | ADDRESS |
| 11 | TX11 | HALF-NUMERAL | 4 | TEL-NUM-1 |
| 12 | TX12 | HALF-NUMERAL | 6 | TEL-NUM-2 |
| 13 | TX13 | HALF-NUMERAL | 6 | TEL-NUM-3 |
| 14 | TX14 | HALF-ALPH-UPPER, HALF-ALPH-LOWER, HALF-NUMERAL | 10 | USER-ID |
| 15 | TX15 | HALF-ALPH-UPPER, HALF-ALPH-LOWER, HALF-NUMERAL, [PASSWORD] | 10 | PASSWORD |

FIG.42

USER REGISTRATION
PLEASE INPUT USER INFORMATION, ID AND PASSWORD.

| | | |
|---|---|---|
| FULL NAME (FULL WIDTH) | FAMILY NAME [TX01 / IW212] | FIRST NAME [TX02 / IW214] |
| READING IN KANA (FULL WIDTH) | FAMILY NAME [TX03 / IW222] | FIRST NAME [TX04 / IW224] |
| DATE OF BIRTH (HALF WIDTH) | [TX05 / IW232] YEAR [TX06 / IW234] MONTH | [TX07 / IW236] DAY |
| POSTAL CODE (HALF WIDTH NUMERAL) | [TX08 / IW242] — [TX09 / IW244] | |
| ADDRESS (FULL WIDTH) | [TX10 / IW252] | |
| PHONE NUMBER (HALF WIDTH NUMERAL) | [TX11 / IW262] — [TX12 / IW264] — [TX13 / IW266] | |
| USER ID (HALF WIDTH ALPHANUMERIC CHARACTER) | [TX14 / IW272] | |
| PASSWORD (HALF WIDTH ALPHANUMERIC CHARACTER) | [TX15 / IW282] | |

DO YOU REGISTER YOURSELF WITH ABOVE DETAILS?

| NUMBER | INPUT BOX ID | INPUT CHARACTER STRING | DATA SIZE (BYTE) |
|---|---|---|---|
| 1 | TX01 | 秋春 | 4 |
| 2 | TX02 | 太郎 | 4 |
| 3 | TX03 | あきはる | 8 |
| 4 | TX04 | たろう | 6 |
| 5 | TX05 | 1979 | 4 |
| 6 | TX06 | 10 | 2 |
| 7 | TX07 | 15 | 2 |
| 8 | TX08 | 111 | 3 |
| 9 | TX09 | 2222 | 4 |
| 10 | TX10 | A県B市… (A PREFECTURE, B CITY …) | 36 |
| 11 | TX11 | 01 | 2 |
| 12 | TX12 | 2222 | 4 |
| 13 | TX13 | 3333 | 4 |
| 14 | TX14 | aki1234 | 7 |
| 15 | TX15 | abcde | 5 |

USER REGISTRATION

PLEASE INPUT USER INFORMATION, ID AND PASSWORD.

| | | | SL205 | | |
|---|---|---|---|---|---|
| FULL NAME (FULL WIDTH) | FAMILY NAME | TX01 / IW212 秋春 | | FIRST NAME | TX02 / IW214 太郎 |
| READING IN KANA (FULL WIDTH) | FAMILY NAME | TX03 / IW222 あきはる | | FIRST NAME | TX04 / IW224 たろう |

DATE OF BIRTH (HALF WIDTH)　TX05 /IW232　1979 YEAR　TX06 /IW234　10 MONTH　TX07 /IW236　15 DAY

POSTAL CODE (HALF WIDTH NUMERAL)　TX08 /IW242　111　—　TX09 /IW244　2222

ADDRESS (FULL WIDTH)　TX10　/IW252　A県B市…(A PREFECTURE, B CITY …)

PHONE NUMBER (HALF WIDTH NUMERAL)　TX11 /IW262　01　—　TX12 /IW264　2222　—　TX13 /IW266　3333

USER ID (HALF WIDTH ALPHANUMERIC CHARACTER)　TX14 /IW272　aki1234

PASSWORD (HALF WIDTH ALPHANUMERIC CHARACTER)　TX15 /IW282　* * * * * * *

DO YOU REGISTER YOURSELF WITH ABOVE DETAILS?

OK　/BG295

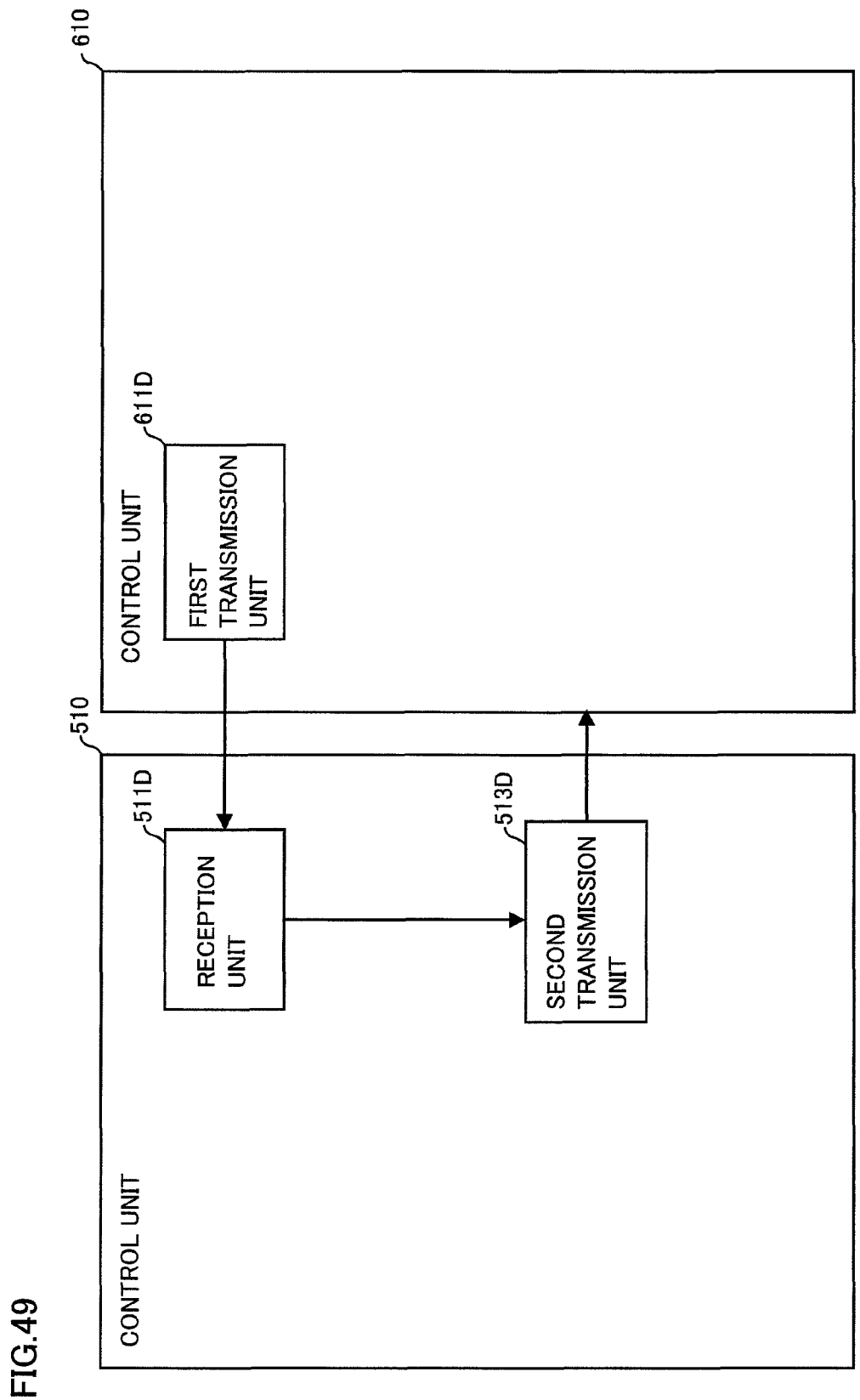

INPUT SYSTEM, PORTABLE TERMINAL, DATA PROCESSOR, AND INPUT METHOD

TECHNICAL FIELD

The present invention relates to an input system, a portable terminal, a data processor, and an input method, and particularly relates to an input system, a portable terminal, a data processor, and an input method for performing processing to input characters.

BACKGROUND ART

In recent years, there have been increasing instances where characters are input by means of a remote controller to an apparatus that can be controlled by the remote controller (hereinafter also referred to as controlled apparatus). In such instances, the controlled apparatus is connected for example to the Internet and the text of an electronic mail to be sent from the controlled apparatus is input by means of the remote controller.

Further, portable terminals such as mobile phone that can be used as a remote controller are becoming prevalent in these years.

Japanese Patent Laying-Open No. 2002-078042 (Patent Document 1) discloses a technique for inputting characters to a controlled apparatus (video recorder) by means of a portable terminal used as a remote controller (hereinafter also referred to as first conventional art).

Patent Document 1: Japanese Patent Laying-Open No. 2002-078042

DISCLOSURE OF THE INVENTION

Problems to be Solved by the Invention

For the controlled apparatus to which characters are to be input, the type of characters permitted to be input thereto varies depending on the case. The character type includes, for example, hiragana, katakana of full width, numeral of half width, and alphabet of half width. In such a case where a telephone number is to be input to the controlled apparatus, input of only half width numerals for example may be permitted.

Regarding the first conventional art, in order to input characters of the type for which input is permitted while the input mode is not set to the mode adapted to input of the characters of the input-permitted type, a user has to bear such a burden as switching the input mode. Namely, in the case where the characters of the input-permitted type are to be input while the input mode is not set to the mode adapted to input of characters of the input-permitted type, a problem is that a burden is imposed on the user.

Further, at the controlled apparatus to which characters are to be input, input of a character string of the same type is requested repeatedly in some cases. Here, a character string of the same type is, for example, a character string of the full name of a person or a telephone number.

A conventional problem is that the burden of inputting a character string of the requested type is imposed on a user even if the character string of the requested type has been input in the past. The first conventional art discloses no technique for solving such a problem.

Furthermore, for the controlled apparatus to which characters are to be input, it may be necessary in some cases, if a character string has been input (hereinafter also referred to as input completed character string), to edit the input completed character string. For example, an input completed character string has to be edited in such a case where some characters are to be added to the input completed character string.

When the portable terminal used as a remote controller for the controlled apparatus is manipulated to edit the input completed character string at the controlled apparatus, the user has to manipulate the portable terminal while watching the controlled apparatus and the portable terminal alternately. A resultant problem is that the user cannot efficiently edit the input completed character string at the controlled apparatus. The first conventional art discloses no technique for solving such a problem.

According to the first conventional art, in the case where a character string is to be input to the controlled apparatus by manipulation of the portable terminal used as a remote controller for the controlled apparatus, the character string to be input to the controlled apparatus is input first to the portable terminal, and thereafter the input character string is transmitted from the portable terminal to the controlled apparatus (video recorder). Therefore, even if the controlled apparatus has stored the character string transmitted from the portable terminal, the character string has to be input again to the portable terminal, which leads to a problem of low efficiency.

The present invention has been made to solve the problems above. A first object is to provide an input system, a portable terminal, a data processor, and an input method with which characters of an input-permitted type can be easily input. A second object is to provide an input system, a portable terminal, a data processor, and an input method with which a character string of a requested type can be easily input. A third object is to provide an input system, a portable terminal, a data processor, and an input system with which an input completed character string can be efficiently edited. A fourth object is to provide an input system, a portable terminal, a data processor, and an input method with which a character string can be efficiently input.

Means For Solving The Problems

In order to solve the above-described problems, an input system according to an aspect of the present invention includes a data processor and a portable terminal for performing short-range communication with the data processor. The data processor includes: a first display unit for displaying not less than one input box to which a character is to be input; a storage unit for storing an input permitted character type that is a type of characters permitted to be input to a corresponding one of the not less than one input box, the storage unit storing the input permitted character type in association with the corresponding input box; and a first transmission unit for transmitting to the portable terminal the input permitted character type associated with a character input enabled input box among the not less than one input box displayed by the first display unit. The portable terminal includes: an input unit for inputting a character; a reception unit for receiving the input permitted character type transmitted from the data processor; a setting unit for setting a type of characters to be input by the input unit to the input permitted character type; a second display unit for displaying a character that is input by the input unit and is of the input permitted character type set by the setting unit; and a second transmission unit for transmitting the character displayed by the second display unit to the data processor.

Preferably, the first transmission unit transmits to the portable terminal an input data capacity that is a data size of a character that can be input to the character input enabled input box, the reception unit receives the input data capacity, and a data size of a character that can be input by the input unit is not more than the input data capacity.

Preferably, the second transmission unit transmits to the data processor a selection signal for selecting one input box from the not less than one input box, and the data processor further includes: a signal reception unit for receiving the selection signal; and an input box setting unit executing a setting process for setting a state of the input box selected by the received selection signal from the not less than one input box, to a state where a character can be input to the input box.

Preferably, the first transmission unit transmits to the portable terminal a character request instruction for requesting a character in response to execution of the setting process, the reception unit of the portable terminal receives the character request instruction, and the second display unit displays an image for inputting a character, in response to reception of the character request instruction.

Preferably, the portable terminal further includes a determination unit for determining whether the received input permitted character type is a terminal input permitted character type that is a type of characters that can be input by the portable terminal, the setting unit sets, when the determination unit determines that the input permitted character type is not the terminal input permitted character type, the type of characters to be input by the input unit to the terminal input permitted character type, the portable terminal further includes a conversion unit for converting a character that is input by the input unit and is of the terminal input permitted character type set by the setting unit, to a character of the received input permitted character type, and the second transmission unit transmits to the data processor the character converted by the conversion unit.

Preferably, the first transmission unit transmits to the portable terminal box identifying information that is information for specifying the character input enabled input box, the reception unit of the portable terminal receives the box identifying information, and the second transmission unit transmits to the data processor a character that is input by the input unit and is to be input to the input box specified by the received box identifying information, and the box identifying information.

Preferably, the first transmission unit transmits to the portable terminal device identifying information that is information for specifying the data processor, the reception unit of the portable terminal receives the device identifying information, and the second transmission unit transmits the character input by the input unit to the data processor specified by the received device identifying information.

In order to solve the above-described problems, an input system according to an aspect of the present invention includes a data processor and a portable terminal for performing short-range communication with the data processor. The data processor includes: a first display unit for displaying not less than one input box to which a character is to be input; a first storage unit for storing a character string type that is a type of a character string requested to be input to a corresponding one of the not less than one input box, the first storage unit storing the character string type in association with the corresponding input box; and a first transmission unit for transmitting to the portable terminal the character string type associated with a character input enabled input box among the not less than one input box displayed by the first display unit. The portable terminal includes: an input unit for inputting a character; a reception unit for receiving the character string type transmitted from the data processor; a second storage unit for storing the received character string type and an input character string that is a character string input by the input unit, in association with each other; a determination unit for determining whether the input character string associated with the received character string type is stored by the second storage unit; a second display unit for displaying the input character string when the determination unit determines that the input character string is stored; and a second transmission unit for transmitting the input character string displayed by the second display unit to the data processor.

Preferably, the input unit includes an edit unit for editing the input character string displayed by the second display unit.

Preferably, the second transmission unit transmits to the data processor a selection signal for selecting one input box from the not less than one input box, and the data processor further includes: a signal reception unit for receiving the selection signal; and a setting unit executing a setting process for setting a state of the input box selected by the received selection signal from the not less than one input box, to a state where a character can be input to the input box.

Preferably, the first transmission unit transmits to the portable terminal box identifying information that is information for specifying the character input enabled input box, the reception unit of the portable terminal receives the box identifying information, and the second transmission unit transmits to the data processor the input character string and the box identifying information when the determination unit determines that the input character string is stored.

Preferably, the first transmission unit transmits to the portable terminal device identifying information that is information for specifying the data processor, the reception unit of the portable terminal receives the device identifying information, and the second transmission unit transmits the input character string, when the determination unit determines that the input character string is stored, to the data processor specified by the received device identifying information.

In order to solve the above-described problems, an input system according to an aspect of the present invention includes a data processor and a portable terminal for performing short-range communication with the data processor. The data processor includes: a first display unit for displaying not less than one input box to which a character is to be input; a storage unit for storing, in association with an input completed box that is an input box to which a character string has been input among the not less than one input box, an input completed character string that is the character string having been input to the input completed box; and a first transmission unit for transmitting to the portable terminal the input completed character string associated with the input completed box. The portable terminal includes: a reception unit for receiving the input completed character string transmitted from the data processor; a second display unit for displaying the received input completed character string; an edit unit for editing the input completed character string displayed by the second display unit; and a second transmission unit for transmitting the character string edited by the edit unit to the data processor.

Preferably, the storage unit further stores an input permitted character type that is a type of characters permitted to be input to a corresponding one of the not less than one input box, the storage unit storing the input permitted character type in association with the corresponding input box, the first transmission unit transmits the input permitted character type associated with the input completed box to the portable terminal, and the reception unit receives the input permitted character type transmitted from the data processor. The portable terminal further includes: an input unit for inputting a character and including the edit unit; and a setting unit for setting a type of characters to be input by the input unit to the input permitted character type, and the character string edited by the edit unit includes a character that is input by the input unit and is of the input permitted character type set by the setting unit.

Preferably, the second transmission unit transmits to the data processor a selection signal for selecting one input box from the not less than one input box, and the data processor further includes: a signal reception unit for receiving the selection signal; and an input box setting unit executing a setting process for setting a state of the input box selected by the received selection signal from the not less than one input box, to a state where a character can be input to the input box.

Preferably, the first transmission unit transmits to the portable terminal a character string request instruction for requesting a character string in response to execution of the setting process, the reception unit of the portable terminal receives the character string request instruction, and the second display unit displays an input image that is an image for inputting a character, and displays the input completed character string in the input image, in response to reception of the character string request instruction.

Preferably, the first transmission unit transmits to the portable terminal box identifying information that is information for specifying the input completed box, the reception unit of the portable terminal receives the box identifying information, and the second transmission unit transmits to the data processor the character string edited by the edit unit and the box identifying information.

Preferably, the first transmission unit transmits to the portable terminal device identifying information that is information for specifying the data processor, the reception unit of the portable terminal receives the device identifying information, and the second transmission unit transmits the character string edited by the edit unit to the data processor specified by the received device identifying information.

In order to solve the above-described problems, an input system according to an aspect of the present invention includes a data processor and a portable terminal for performing short-range communication with the data processor. The portable terminal includes: an input unit for inputting a character; and a first transmission unit for transmitting to the data processor an input completed character that is a character having been input, each time the character is input by the input unit. The data processor includes: a storage unit for storing a plurality of character strings in advance; a first reception unit for receiving the input completed character transmitted from the portable terminal; a retrieval unit for retrieving an inclusion character string that is a character string including the received input completed character, from a plurality of character strings stored by the storage unit; and a second transmission unit for transmitting to the portable terminal the inclusion character string retrieved by the retrieval unit. The portable terminal further includes: a second reception unit for receiving the inclusion character string transmitted from the data processor; and a display unit for displaying the received inclusion character string.

Preferably, the second reception unit receives a plurality of inclusion character strings, the display unit displays the received plurality of inclusion character strings, the portable terminal further includes a selection unit for selecting any of a plurality of inclusion character strings displayed by the display unit, and the first transmission unit transmits to the data processor a character string specifying information piece for specifying the inclusion character string selected by the selection unit.

Preferably, the second transmission unit transmits to the portable terminal a plurality of inclusion character strings and a plurality of character string specifying information pieces for specifying a plurality of inclusion character strings respectively, the second reception unit receives a plurality of inclusion character strings and a plurality of character string specifying information pieces, and the display unit displays the received plurality of inclusion character strings. The portable terminal further includes a selection unit for selecting any of a plurality of inclusion character strings displayed by the display unit, and the first transmission unit transmits to the data processor the character string specifying information piece for specifying the inclusion character string selected by the selection unit, among the received plurality of character string specifying information pieces.

Preferably, the second transmission unit transmits to the portable terminal box identifying information that is information for specifying a character input enabled input box, the second reception unit receives the box identifying information, and the first transmission unit transmits the character string specifying information and the box identifying information to the data processor.

Preferably, the second transmission unit transmits to the portable terminal device identifying information that is information for specifying the data processor, the second reception unit receives the device identifying information, and the first transmission unit transmits the character string specifying information piece to the data processor specified by the received device identifying information.

In order to solve the above-described problems, an input system according to an aspect of the present invention includes a data processor and a portable terminal for performing short-range communication with the data processor. The data processor includes: a first display unit for displaying a plurality of input boxes to which characters are to be input; a first storage unit for storing a character string type that is a type of a character string requested to be input to a corresponding one of a plurality of input boxes, the first storage unit storing the character string type in association with the corresponding input box; and a first transmission unit for transmitting to the portable terminal a plurality of character string types associated respectively with a plurality of input boxes displayed by the first display unit, and a plurality of box identifying information pieces for specifying a plurality of input boxes respectively. The portable terminal includes: an input unit for inputting a character; and a reception unit for receiving a plurality of character string types and a plurality of box identifying information pieces transmitted from the data processor, the input unit inputting a character string of at least one character string type among the received plurality of character string types. The portable terminal further includes: a second storage unit for storing each of not less than one input character string that is a character string input by the input unit, among character strings of a plurality of character string types, and the character string type of the input character string, the second storage unit storing the input character string and the character string type in association with each other; a second display unit for displaying at least one of the not less than one input character string stored by the second storage unit; and a second transmission unit for transmitting to the data processor the not less than one input character string, and the box identifying information piece among a plurality of box identifying information pieces, for specifying an input box among a plurality of input boxes, to which input of the input character string is requested.

Preferably, the input unit includes an edit unit for editing the input character string displayed by the second display unit.

Preferably, the first transmission unit transmits to the portable terminal device identifying information that is information for specifying the data processor, the reception unit receives the device identifying information, and the second transmission unit transmits the not less than one input character string to the data processor specified by the received device identifying information.

A portable terminal according to another aspect of the present invention performs short-range communication with a data processor. The data processor displays not less than one input box to which a character is to be input, and stores an input permitted character type that is a type of characters permitted to be input to a corresponding one of the not less than one input box, the data processor storing the input permitted character type in association with the corresponding input box. The portable terminal includes: an input unit for inputting a character; a reception unit for receiving from the data processor the input permitted character type associated with a character input enabled input box among the not less than one input box; a setting unit for setting a type of characters to be input by the input unit to the input permitted character type; a display unit for displaying a character that is input by the input unit and is of the input permitted character type set by the setting unit; and a transmission unit for transmitting the character displayed by the display unit to the data processor.

In order to solve the above-described problems, an input system according to an aspect of the present invention includes a data processor and a portable terminal for performing short-range communication with the data processor. The data processor includes: a first display unit for displaying not less than one input box to which a character is to be input; a storage unit for storing an input data capacity that is a data size of a character that can be input to a corresponding one of the not less than one input box, the storage unit storing the input data capacity in association with the corresponding input box; and a first transmission unit for transmitting to the portable terminal the input data capacity associated with a character input enabled input box among the not less than one input box displayed by the display unit. The portable terminal includes: an input unit for inputting a character; a reception unit for receiving the input data capacity transmitted from the data processor; a setting unit for setting a data size of a character to be input by the input unit to a data size of not more than the input data capacity; a second display unit for displaying a character that is input by the input unit and is of the data size of not more than the input data capacity set by the setting unit; and a second transmission unit for transmitting the character displayed by the second display unit to the data processor.

A portable terminal according to a further aspect of the present invention performs short-range communication with a data processor. The data processor displays not less than one input box to which a character is to be input, and stores a character string type that is a type of a character string requested to be input to a corresponding one of the not less than one input box, the data processor storing the character string type in association with the corresponding input box. The portable terminal includes: an input unit for inputting a character; a reception unit for receiving from the data processor the character string type associated with a character input enabled input box among the not less than one input box; a storage unit for storing the received character string type and an input character string that is a character string input by the input unit, in association with each other; a determination unit for determining whether the input character string associated with the received character string type is stored by the storage unit; a display unit for displaying the input character string when the determination unit determines that the input character string is stored; and a transmission unit for transmitting the input character string displayed by the display unit to the data processor.

A portable terminal according to a further aspect of the present invention performs short-range communication with a data processor. The data processor displays not less than one input box to which a character is to be input, and stores, in association with an input completed box that is an input box to which a character string has been input among the not less than one input box, an input completed character string that is the character string having been input to the input completed box. The portable terminal includes: a reception unit for receiving from the data processor the input completed character string associated with the input completed box; a display unit for displaying the received input completed character string; an edit unit for editing the input completed character string displayed by the display unit; and a transmission unit for transmitting the character string edited by the edit unit to the data processor.

A portable terminal according to a further aspect of the present invention performs short-range communication with a data processor storing a plurality of character strings in advance. The data processor receives an input completed character that is a character having been input by the portable terminal, and retrieves an inclusion character string that is a character string including the received input completed character, among a plurality of character strings. The portable terminal includes: an input unit for inputting a character; a transmission unit for transmitting to the data processor an input completed character that is a character having been input, each time the character is input by the input unit; a reception unit for receiving from the data processor the retrieved inclusion character string; and a display unit for displaying the received inclusion character string.

A portable terminal according to a further aspect of the present invention performs short-range communication with a data processor. The data processor displays a plurality of input boxes to which characters are to be input, and stores a character string type that is a type of a character string requested to be input to a corresponding one of a plurality of input boxes, the data processor storing the character string type in association with the corresponding input box. The portable terminal includes: an input unit for inputting a character; and a reception unit for receiving from the data processor a plurality of character string types associated respectively with a plurality of input boxes, and a plurality of box identifying information pieces for specifying a plurality of input boxes respectively. The input unit inputs a character string of at least one character string type among the received plurality of character string types. The portable terminal further includes: a storage unit for storing each of not less than one input character string that is a character string input by the input unit, among character strings of a plurality of character string types, and the character string type of the input character string, the storage unit storing the input character string and the character string type in association with each other; a display unit for displaying at least one of the not less than one input character string stored by the storage unit; and a transmission unit for transmitting to the data processor the not less than one input character string, and the box identifying information piece among a plurality of box identifying information pieces, for specifying an input box among a plurality of input boxes, to which input of the input character string is requested.

A portable terminal according to a further aspect of the present invention performs short-range communication with a data processor. The data processor displays not less than one input box to which a character is to be input, and stores an input data capacity that is a data size of a character that can be input to a corresponding one of the not less than one input box, the data processor storing the input data capacity in association with the corresponding input box. The portable terminal includes: an input unit for inputting a character; a reception unit for receiving from the data processor the input data capacity associated with a character input enabled input box among the not less than one input box; a setting unit for setting a data size of a character to be input by the input unit to a data size of not more than the input data capacity; a display unit for displaying a character that is input by the input unit and is of the data size of not more than the input data capacity set by the setting unit; and a transmission unit for transmitting the character displayed by the display unit to the data processor.

A data processor according to a further aspect of the present invention performs short-range communication with a portable terminal. The data processor displays not less than one input box to which a character is to be input. The portable terminal receives an input permitted character type that is a type of characters permitted to be input, sets a type of characters to be input by the portable terminal to the input permitted character type, and displays a character that is input by the portable terminal and is of the set input permitted character type. The data processor includes: a storage unit for storing an input permitted character type that is a type of characters permitted to be input to a corresponding one of the not less than one input box, the storage unit storing the input permitted character type in association with the corresponding input box; a transmission unit for transmitting to the portable terminal the input permitted character type associated with a character input enabled input box among the not less than one input box; and a reception unit for receiving the displayed character from the portable terminal.

A data processor according to a further aspect of the present invention performs short-range communication with a portable terminal. The data processor displays not less than one input box to which a character is to be input. The portable terminal receives a character string type that is a type of a character string requested to be input to a corresponding one of the not less than one input box, stores the character string type and an input character string that is a character string input by the portable terminal, in association with each other and, in a case where the portable terminal stores the input character string associated with the received character string type, the portable terminal displays the input character string. The data processor includes: a storage unit for storing a character string type that is a type of a character string requested to be input to a corresponding one of the not less than one input box, the storage unit storing the character string type in association with the corresponding input box; a transmission unit for transmitting to the portable terminal the character string type associated with a character input enabled input box among the not less than one input box; and a reception unit for receiving from the portable terminal the displayed input character string.

A data processor according to a further aspect of the present invention performs short-range communication with a portable terminal. The data processor displays not less than one input box to which a character is to be input. The portable terminal receives an input completed character string that is a character string having been input to an input completed box that is an input box to which the character string has been input among the not less than one input box, and displays the input completed character string. The data processor includes: a storage unit for storing, in association with the input completed box, the input completed character string that is the character string having been input to the input completed box; a transmission unit for transmitting to the portable terminal the input completed character string associated with the input completed box; and a reception unit for receiving from the portable terminal a character string generated by editing the input completed character string.

A data processor according to a further aspect of the present invention performs short-range communication with a portable terminal. The portable terminal displays a received character string. The data processor includes: a storage unit for storing a plurality of character strings in advance; a reception unit for receiving from the portable terminal an input completed character that is a character having been input, each time the character is input by the portable terminal; a retrieval unit for retrieving an inclusion character string that is a character string including the received input completed character, from a plurality of character strings stored by the storage unit; and a transmission unit for transmitting to the portable terminal the inclusion character string retrieved by the retrieval unit.

A data processor according to a further aspect of the present invention performs short-range communication with a portable terminal. The data processor displays a plurality of input boxes to which characters are to be input. The portable terminal receives a plurality of character string types that is each a type of a character string requested to be input to a corresponding one of a plurality of input boxes and receives a plurality of box identifying information pieces for specifying a plurality of input boxes respectively, stores each of not less than one input character string that is input by the portable terminal, among character strings of a plurality of character string types and stores the character string type of the input character string, in association with each other, and displays at least one of the not less than one input character string. The data processor includes: a storage unit for storing a character string type that is a type of a character string requested to be input to a corresponding one of a plurality of input boxes, the storage unit storing the character string type in association with the corresponding input box; a transmission unit for transmitting to the portable terminal a plurality of character string types associated respectively with a plurality of input boxes and a plurality of box identifying information pieces; and a reception unit for receiving from the portable terminal the not less than one input character string, and a box identifying information piece among a plurality of box identifying information pieces, for specifying an input box among a plurality of input boxes, to which the input character string is requested to be input.

A data processor according to a further aspect of the present invention performs short-range communication with a portable terminal. The data processor displays not less than one input box to which a character is to be input. The portable terminal receives an input data capacity that is a data size of a character that can be input, sets a data size of a character to be input by the portable terminal to a data size of not more than the input data capacity, and displays a character that is input by the portable terminal and is of the set data size of not more than the input data capacity. The data processor includes: a storage unit for storing an input data capacity that is a data size of a character that can be input to a corresponding one of the not less than one input box, the storage unit storing the input data capacity in association with the corresponding input box; a transmission unit for transmitting to the portable terminal the input data capacity associated with a character input enabled input box among the not less than one input box; and a reception unit for receiving the displayed character from the portable terminal.

An input method according to a further aspect of the present invention is a method for inputting a character by an input system. The input system includes a data processor and a portable terminal for performing short-range communication with the data processor. The data processor displays not less than one input box to which a character is to be input, and stores an input permitted character type that is a type of characters permitted to be input to a corresponding one of the not less than one input box, the data processor storing the input permitted character type in association with the corresponding input box. The input method includes the steps of: transmitting by the data processor to the portable terminal the input permitted character type associated with a character input enabled input box among the not less than one input box; receiving by the portable terminal the input permitted character type transmitted from the data processor; setting by the portable terminal a type of a character to be input by the portable terminal to the input permitted character type; displaying by the portable terminal a character that is input by the portable terminal and is of the set input permitted character type; and transmitting by the portable terminal to the data processor the character displayed in the displaying step.

An input method according to a further aspect of the present invention is a method for inputting a character by an input system. The input system includes a data processor and a portable terminal for performing short-range communication with the data processor. The portable terminal includes a storage unit for storing information. The data processor displays not less than one input box to which a character is to be input, and stores a character string type that is a type of a character string requested to be input to a corresponding one of the not less than one input box, the data processor storing the character string type in association with the corresponding input box. The input method includes the steps of: transmitting by the data processor to the portable terminal the character string type associated with a character input enabled input box among the not less than one input box; receiving by the portable terminal the character string type transmitted from the data processor; storing by the portable terminal in the storage unit the received character string type and an input character string that is a character string input by the portable terminal, in association with each other; determining by the portable terminal whether the input character string associated with the received character string type is stored in the storage unit; displaying by the portable terminal the input character string when it is determined that the input character string is stored; and transmitting by the portable terminal to the data processor the input character string displayed in the displaying step.

An input method according to a further aspect of the present invention is a method for inputting a character by an input system. The input system includes a data processor and a portable terminal for performing short-range communication with the data processor. The portable terminal includes a display unit for displaying information. The data processor displays not less than one input box to which a character is to be input, and stores an input completed character string that is a character string having been input to an input completed box that is an input box to which the character string has been input, among the not less than one input box, in association with each other. The input method includes the steps of: transmitting by the data processor to the portable terminal the input completed character string associated with the input completed box; receiving by the portable terminal the input completed character string transmitted from the data processor; displaying by the portable terminal the received input completed character string on the display unit; editing by the portable terminal the displayed input completed character string; and transmitting by the portable terminal the edited character string to the data processor.

An input method according to a further aspect of the present invention is a method for inputting a character by an input system. The input system includes a data processor and a portable terminal for performing short-range communication with the data processor. The portable terminal includes a display unit for displaying information. The data processor stores a plurality of character strings in advance. The input method includes the steps of: transmitting by the portable terminal to the data processor an input completed character that is a character having been input, each time the character is input by the portable terminal; receiving by the data processor the input completed character transmitted from the portable terminal; retrieving by the data processor an inclusion character string that is a character string including the received input completed character, from a plurality of character strings; transmitting by the data processor the retrieved inclusion character string to the portable terminal; receiving by the portable terminal the inclusion character string; and displaying by the portable terminal the received inclusion character string on the display unit.

An input method according to a further aspect of the present invention is a method for inputting a character by an input system. The input system includes a data processor and a portable terminal for performing short-range communication with the data processor. The portable terminal includes a storage unit for storing information. The data processor displays a plurality of input boxes to which characters are to be input, and stores a character string type that is a type of a character string requested to be input to a corresponding one of a plurality of input boxes, the data processor storing the character string type in association with the corresponding input box. The input method includes the steps of: transmitting by the data processor to the portable terminal a plurality of character string types associated respectively with a plurality of input boxes, and a plurality of box identifying information pieces for specifying a plurality of input boxes respectively; receiving by the portable terminal a plurality of character string types and a plurality of box identifying information pieces transmitted from the data processor; storing by the portable terminal in the storage unit each of not less than one input character string that is a character string input by the portable terminal, among character strings of a plurality of character string types, and the character string type of the input character string, in association with each other; displaying by the portable terminal at least one of the not less than one input character string stored in the storage unit; and transmitting by the portable terminal to the data processor the not less than one input character string, and a box identifying information piece among a plurality of box identifying information pieces, for specifying an input box among a plurality of input boxes, to which the input character string is requested to be input.

An input method according to a further aspect of the present invention is a method for inputting a character by an input system. The input system includes a data processor and a portable terminal for performing short-range communication with the data processor. The data processor displays not less than one input box to which a character is to be input, and stores an input data capacity that is a data size of a character that can be input to a corresponding one of the not less than one input box, the data processor storing the input data capacity in association with the corresponding input box. The input method includes the steps of: transmitting by the data processor to the portable terminal the input data capacity associated with a character input enabled input box among the not less than one input box; receiving by the portable terminal the input data capacity transmitted from the data processor; setting by the portable terminal a data size of a character to be input by the portable terminal to a data size of not more than the input data capacity; displaying by the portable terminal a character that is input by the portable terminal and is of the set data size of not more than the input data capacity; and transmitting by the portable terminal to the data processor the character displayed in the displaying step.

Effects Of The Invention

In an input system according to the present invention, a portable terminal and a data processor perform short-range communication with each other. The data processor stores an input permitted character type that is a type of characters permitted to be input to a corresponding one of not less than one input box, and the data processor stores the input permitted character type in association with the corresponding input box. The data processor transmits to the portable terminal the input permitted character type associated with a character input enabled input box. The portable terminal sets a type of characters to be input, to the input permitted character type, and transmits to the data processor a character that is input and is of the input permitted character type as set.

Accordingly, the effect is achieved that characters of the type permitted to be input to a character input enabled input box can be easily input.

In an input system according to the present invention, a portable terminal and a data processor perform short-range communication with each other. The data processor stores a character string type that is a type of a character string requested to be input to a corresponding one of not less than one input box, and the data processor stores the character string type in association with the corresponding input box. The data processor transmits to the portable terminal the character string type associated with a character input enabled input box among not less than one input box. The portable terminal stores the received character string type and an input character string that is a character string having been input, in association with each other. In a case where the input character string associated with the received character string type is stored, the portable terminal transmits the input character string to the data processor.

Accordingly, the effect is achieved that a character string of the type requested to be input to a character input enabled input box can be easily input.

In an input system according to the present invention, a portable terminal and a data processor perform short-range communication with each other. The data processor stores, in association with an input completed box that is an input box to which a character string has been input, an input completed character string that is the character string having been input to the input completed box. The data processor transmits to the portable terminal the input completed character string associated with the input completed box. The portable terminal displays the received input completed character string, edits the input completed character string as displayed, and transmits the edited character string to the data processor.

Accordingly, since the portable terminal displays the input completed character string, the effect is achieved that the character string having been input can be efficiently edited by the portable terminal.

In an input system according to the present invention, a portable terminal and a data processor perform short-range communication with each other. The portable terminal transmits to the data processor an input completed character that is a character having been input, each time the character is input. The data processor stores a plurality of character strings in advance, retrieves an inclusion character string that is a character string including the received input completed character, among a plurality of character strings, and transmits the retrieved inclusion character string to the portable terminal. The portable displays the received inclusion character string.

Thus, in the case where displayed inclusion character strings include a desired character string, it is unnecessary to perform the manipulation of inputting the desired character string. Accordingly, the effect that a character string can be efficiently input is achieved.

In an input system according to the present invention, a portable terminal and a data processor perform short-range communication with each other. The data processor stores a character string type that is a type of a character string requested to be input to a corresponding one of a plurality of input boxes, and the data processor stores the character string type in association with the corresponding input box. The data processor transmits to the portable terminal a plurality of character string types associated respectively with a plurality of input boxes, and a plurality of box identifying information pieces for specifying a plurality of input boxes respectively. The portable terminal receives a plurality of character string types and a plurality of box identifying information pieces, and stores each of not less than one input character string that is a character string having been input, among character strings of a plurality of character string types, and the character string type of the input character string, and the portable terminal stores the input character string and the character string type in association with each other. The portable terminal transmits to the data processor not less than one input character string, and the box identifying information piece among a plurality of box identifying information pieces, for specifying an input box among a plurality of input boxes, to which input of the input character string is requested.

Accordingly, the effect is achieved that a character string of the type requested to be input to at least one input box among a plurality of input boxes can be easily input.

In an input system according to the present invention, a portable terminal and a data processor perform short-range communication with each other. The data processor stores an input data capacity that is a data size of a character that can be input to a corresponding one of not less than one input box, and the data processor stores the input data capacity in association with the corresponding input box. The data processor transmits to the portable terminal the input data capacity associated with a character input enabled input box. The portable terminal sets a data size of a character to be input, to a data size of not more than the input data capacity, and transmits to the data processor an input character that is of not more than the set input data capacity.

Accordingly, the effect is achieved that characters of not more than the data size that can be input to an input box of the data processor can be easily input by the portable terminal.

A portable terminal according to the present invention performs short-range communication with a data processor. The data processor stores an input permitted character type that is a type of characters permitted to be input to a corresponding one of not less than one input box, and the data processor stores the input permitted character type in association with the corresponding input box. The data processor transmits to the portable terminal the input permitted character type associated with a character input enabled input box. The portable terminal receives the input permitted character type associated with the character input enabled input box. The portable terminal sets a type of characters to be input, to the input permitted character type, and transmits to the data processor an input character that is of the input permitted character type as set.

Accordingly, the effect is achieved that characters of the type permitted to be input to a character input enabled input box can be easily input.

A portable terminal according to the present invention performs short-range communication with a data processor. The data processor stores a character string type that is a type of a character string requested to be input to a corresponding one of not less than one input box, the data processor stores the character string type in association with the corresponding input box. The data processor transmits to the portable terminal the character string type associated with a character input enabled input box. The portable terminal receives the character string type transmitted from the data processor, and stores the received character string type and an input character string that is a character string having been input, in association with each other. In a case where the input character string associated with the received character string type is stored, the portable terminal transmits the input character string to the data processor.

Accordingly, the effect is achieved that a character string of the type requested to be input to a character input enabled input box can be easily input.

A portable terminal according to the present invention performs short-range communication with a data processor. The data processor stores, in association with an input completed box that is an input box to which a character string has been input, an input completed character string that is the character string having been input to the input completed box. The data processor transmits to the portable terminal the input completed character string associated with the input completed box. The portable terminal receives the input completed character string and displays the received input completed character string. The portable terminal edits the input completed character string, and transmits the edited character string to the data processor.

Accordingly, since the portable terminal displays the input completed character string, the effect is achieved that the character string having been input can be efficiently edited by the portable terminal.

A portable terminal according to the present invention performs short-range communication with a data processor storing a plurality of character strings. The portable terminal transmits to the data processor an input completed character that is a character having been input, each time the character is input. The data processor receives from the portable terminal the input completed character that is a character having been input, retrieves an inclusion character string that is a character string including the received input completed character, among a plurality of character strings, and transmits the retrieved inclusion character string to the portable terminal. The portable terminal displays the received inclusion character string.

Thus, in the case where displayed inclusion character strings include a desired character string, it is unnecessary to perform the manipulation of inputting the desired character string. Accordingly, the effect that a character string can be efficiently input is achieved.

A portable terminal according to the present invention performs short-range communication with a data processor. The data processor stores a character string type that is a type of a character string requested to be input to a corresponding one of a plurality of input boxes, and the data processor stores the character string type in association with the corresponding input box. The data processor transmits to the portable terminal a plurality of character string types associated respectively with a plurality of input boxes, and a plurality of box identifying information pieces for specifying a plurality of input boxes respectively. The portable terminal receives a plurality of character string types and a plurality of box identifying information pieces, and stores each of not less than one input character string that is a character string having been input, among character strings of a plurality of character string types, and the character string type of the input character string, in association with each other. The portable terminal transmits to the data processor not less than one input character string, and the box identifying information piece among a plurality of box identifying information pieces, for specifying an input box among a plurality of input boxes, to which input of the input character string is requested.

Accordingly, the effect is achieved that a character string of the type requested to be input to at least one input box among a plurality of input boxes can be easily input.

A portable terminal according to the present invention performs short-range communication with a data processor. The data processor stores an input data capacity that is a data size of a character that can be input to a corresponding one of not less than one input box, the data processor storing the input data capacity in association with the corresponding input box. The portable terminal receives from the data processor the input data capacity associated with a character input enabled input box. The portable terminal sets a data size of a character to be input, to a data size of not more than the input data capacity. The portable terminal transmits to the data processor an input character of not more than the set input data capacity.

Accordingly, the effect is achieved that characters of not more than the data size that can be input to an input box of the data processor can be easily input by the portable terminal.

A data processor according to the present invention displays not less than one input box. The data processor stores an input permitted character type that is a type of characters permitted to be input to a corresponding one of not less than one input box, the data processor storing the input permitted character type in association with the corresponding input box. The data processor transmits to a portable terminal the input permitted character type associated with a character input enabled input box. The portable terminal receives the input permitted character type, sets a type of characters to be input, to the input permitted character type, and transmits to the data processor a character that is input by the portable terminal and is of the set input permitted character type. The data processor receives the displayed character from the portable terminal.

Accordingly, the effect is achieved that characters of the type permitted to be input to a character input enabled input box can be easily input.

A data processor according to the present invention displays not less than one input box. The data processor stores a character string type that is a type of a character string requested to be input to a corresponding one of not less than one input box, the data processor storing the character string type in association with the corresponding input box. The data processor transmits to a portable terminal the character string type associated with a character input enabled input box. The portable terminal receives the character string type, and stores the character string type and an input character string that is a character string input by the portable terminal, in association with each other. In a case where the portable terminal stores the input character string associated with the received character string type, the portable terminal transmits the input character string to the data processor. The data processor receives the input character string from the portable terminal.

Accordingly, the effect is achieved that a character string of the type requested to be input to a character input enabled input box can be easily input.

A data processor according to the present invention stores an input completed character string that is a character string having been input to an input completed box, the data processor storing the input completed character string in association with the input completed box. The data processor transmits to a portable terminal the input completed character string associated with the input completed box. The portable terminal receives the input completed character string, displays the input completed character string, and transmits to the data processor a character string generated by editing the input completed character string. The data processor receives from the portable terminal the character string generated by editing the input completed character string.

Accordingly, since the portable terminal displays the input completed character string, the effect is achieved that the character string having been input can be efficiently edited by the portable terminal.

A data processor according to the present invention performs short-range communication with a portable terminal. The portable terminal transmits to the data processor an input completed character that is a character having been input, each time the character is input by the portable terminal. The data processor stores a plurality of character strings in advance, retrieves from a plurality of character strings an inclusion character string that is a character string including the received input completed character, and transmits the retrieved inclusion character string to the portable terminal. The portable terminal displays the received inclusion character string.

Thus, in the case where displayed inclusion character strings include a desired character string, it is unnecessary to perform the manipulation of inputting the desired character string. Accordingly, the effect that a character string can be efficiently input is achieved.

A data processor according to the present invention displays a plurality of input boxes. The data processor stores a character string type that is a type of a character string requested to be input to a corresponding one of a plurality of input boxes, the data processor storing the character string type in association with the corresponding input box. The data processor transmits to a portable terminal a plurality of character string types associated respectively with a plurality of input boxes, and a plurality of box identifying information pieces for specifying a plurality of input boxes respectively. The portable terminal receives a plurality of character string types that are each a type of a character string requested to be input to a corresponding one of a plurality of input boxes and receives a plurality of box identifying information pieces for specifying a plurality of input boxes respectively, and stores each of not less than one input character string that is input by the portable terminal, among character strings of a plurality of character string types and stores the character string type of the input character string, in association with each other. The portable terminal transmits to the data processor not less than one input character string, and a box identifying information piece among a plurality of box identifying information pieces, for specifying an input box among a plurality of input boxes, to which the input character string is requested to be input. The data processor receives from the portable terminal not less than one input character string, and the box identifying information piece among a plurality of box identifying information pieces, for specifying an input box among a plurality of input boxes, to which the input character string is requested to be input.

Accordingly, the effect is achieved that a character string of the type requested to be input to at least one input box among a plurality of input boxes can be easily input.

A data processor according to the present invention displays not less than one input box. The data processor transmits to a portable terminal an input data capacity that is a data size of a character that can be input. The portable terminal receives the input data capacity, sets a data size of a character to be input by the portable terminal, to a data size of not more than the input data capacity, and transmits to the data processor a character that is input by the portable terminal and is of a data size not more than the set input data capacity. The data processor receives the displayed character from the portable terminal.

Accordingly, the effect is achieved that characters of not more than the data size that can be input to an input box of the data processor can be easily input by the portable terminal.

According to an input method of the present invention, a data processor stores an input permitted character type that is a type of characters permitted to be input to a corresponding one of not less than one input box, in association with the corresponding input box, and transmits to a portable terminal the input permitted character type associated with a character input enabled input box among not less than one input box. The portable terminal receives the input permitted character type transmitted from the data processor. The portable terminal sets a type of a character to be input by the portable terminal to the input permitted character type. The portable terminal transmits to the data processor a character that is input by the portable terminal and is of the set input permitted character type.

Accordingly, the effect is achieved that characters of the type permitted to be input to a character input enabled input box can be easily input.

According to an input method of the present invention, a data processor stores a character string type that is a type of a character string requested to be input to a corresponding one of not less than one input box, in association with the corresponding input box, and transmits to a portable terminal the character string type associated with a character input enabled input box among not less than one input box. The portable terminal receives the character string type transmitted from the data processor. The portable terminal stores in a storage unit the received character string type and an input character string that is a character string input by the portable terminal, in association with each other. In a case where the input character string associated with the received character string type is stored in the storage unit, the portable terminal transmits the input character string to the data processor.

Accordingly, the effect is achieved that a character string of the type requested to be input to a character input enabled input box can be easily input.

According to an input method of the present invention, a data processor stores an input completed character string that is a character string having been input to an input completed box, in association with the input completed box, and transmits to a portable terminal the input completed character string associated with the input completed box. The portable terminal receives the input completed character string transmitted from the data processor. The portable terminal displays the received input completed character string on a display unit. The portable terminal edits the input completed character string as displayed. The portable terminal transmits the edited character string to the data processor.

Accordingly, since the portable terminal displays the input completed character string, the effect is achieved that the character string having been input can be efficiently edited by the portable terminal.

According to an input method of the present invention, a portable terminal including a display unit transmits to a data processor storing a plurality of character strings in advance, an input completed character that is a character having been input, each time the portable terminal inputs the character. The data processor retrieves from a plurality of character strings an inclusion character string that is a character string including the received input completed character, and transmits the retrieved inclusion character string to the portable terminal. The portable terminal displays the received inclusion character string on the display unit.

Thus, in the case where displayed inclusion character strings include a desired character string, it is unnecessary to perform the manipulation of inputting the desired character string. Accordingly, the effect that a character string can be efficiently input is achieved.

According to an input method of the present invention, a data processor stores a character string type that is a type of a character string requested to be input to a corresponding one of a plurality of input boxes, in association with the corresponding input box, and transmits to a portable terminal a plurality of character string types associated respectively with a plurality of input boxes and a plurality of box identifying information pieces for specifying a plurality of input boxes respectively. The portable terminal receives a plurality of character string types and a plurality of box identifying information pieces transmitted from the data processor. The portable terminal stores in a storage unit each of not less than one input character string that is a character string input by the portable terminal, among character strings of a plurality of character string types, and the character string type of the input character string, in association with each other. The portable terminal transmits to the data processor not less than one input character string, and a box identifying information piece among a plurality of box identifying information pieces, for specifying an input box among a plurality of input boxes, to which the input character string is requested to be input.

Accordingly, the effect is achieved that a character string of the type requested to be input to at least one input box among a plurality of input boxes can be easily input.

According to an input method of the present invention, a data processor stores an input data capacity that is a data size of a character that can be input to a corresponding one of not less than one input box, in association with the corresponding input box, and transmits to a portable terminal the input data capacity associated with a character input enabled input box among not less than one input box. The portable terminal receives the input data capacity transmitted from the data processor. The portable terminal sets a data size of a character to be input by the portable terminal to a data size of not more than the input data capacity. The portable terminal transmits to the data processor a character that is input by the portable terminal and is of a data size of not more than the set input data capacity.

Accordingly, the effect is achieved that characters of not more than the data size that can be input to an input box of the data processor can be easily input by the portable terminal.

BRIEF DESCRIPTION OF THE DRAWINGS

FIG. 8 shows an exemplary web page image.
FIG. 9 shows an exemplary input box data table.
FIG. 10 shows an exemplary label description table.
FIG. 13 shows exemplary input box data.
FIG. 15 shows exemplary input box character data.
FIG. 16 shows an exemplary inhibited character type adapted data table.
FIG. 17 shows an exemplary input box data table.
FIG. 18 shows an exemplary label description table.
FIG. 21 shows exemplary input box data.
FIG. 22 shows an exemplary character string data table.
FIG. 23 shows an exemplary character string data table.
FIG. 24 shows an exemplary web page image.
FIG. 25 shows an exemplary input completed character string data table.
FIG. 28 shows exemplary input box data.
FIG. 29 shows exemplary input box character data.
FIG. 32 shows exemplary input character data.
FIG. 33 shows an exemplary selection candidate character data table.
FIG. 35 shows exemplary selection data.
FIG. 36 shows exemplary input character data.
FIG. 37 shows an exemplary selection candidate character data table.

FIG. 41 shows an exemplary input box data table.

FIG. 42 shows an exemplary web page image.

FIG. 43 shows an exemplary input box character data table.

FIG. 44 shows an exemplary web page image.

FIG. 49 is a functional block diagram of two different control units in a fifth embodiment.

Figure 1:
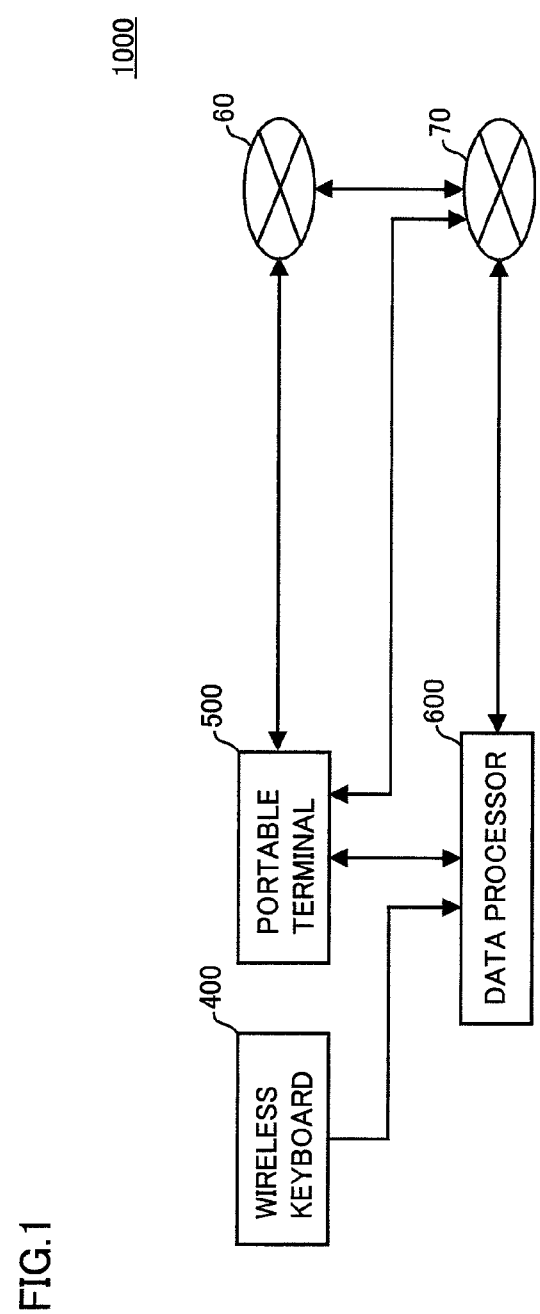
FIG. 1 shows a configuration of a network system of the present embodiment.

DESCRIPTION OF THE REFERENCE SIGNS 70 network; 180, 180A program; 500 portable terminal; 510, 610 control unit; 520, 620 storage unit; 530, 630 display unit; 540 input unit; 555 recording medium; 600 data processor; 1000 network system

BEST MODES FOR CARRYING OUT THE INVENTION

Embodiments of the present invention will be described hereinafter with reference to the drawings. In the following description, like components are denoted by like reference characters. These components have like names and like functions as well. Therefore, a detailed description thereof will not be repeated.

First Embodiment

System Configuration

FIG. 1 shows a configuration of a network system 1000 of the present embodiment. Referring to FIG. 1, network system 1000 includes a portable terminal 500, a wireless keyboard 400 and a data processor 600.

Portable terminal 500 is a mobile phone. Here, portable terminal 500 is not limited to the mobile phone, and may be any device as long as the device is a portable device having a communication function (PDA (Personal Digital Assistance), PC (Personal Computer) for example).

Portable terminal 500 is able to communicate data with a telephone network 60 in a wireless manner. Telephone network 60 is, for example a telephone network for the mobile telephone.

Data processor 600 is a device controlled by a signal transmitted from portable terminal 500. An example of data processor 600 is a television receiver. Here, data processor 600 is not limited to the television receiver, and may be any device as long as the device is controlled by a signal transmitted from portable terminal 500. Data processor 600 may be any device such as video recording and reproducing device, music reproducing device, and PC for example.

Portable terminal 500 communicates data with data processor 600 in a wireless or wired manner. Portable terminal 500 has a function of communicating data with a network 70 in a wireless or wired manner. Network 70 is a wide area network such as the Internet.

Data processor 600 also has a function of communicating data with network 70 in a wireless or wired manner. Network 70 can communicate data with telephone network 60 in a wireless or wired manner. Portable terminal 500 can therefore communicate data with network 70 via telephone network 60.

Wireless keyboard 400 has a function of communicating data with data processor 600 in a wireless manner. Wireless keyboard 400 transmits character data representing information about characters or the like that are input by a user, to data processor 600 in a wireless manner.

Portable Terminal

Portable terminal 500 will now be described in detail.

Figure 2:
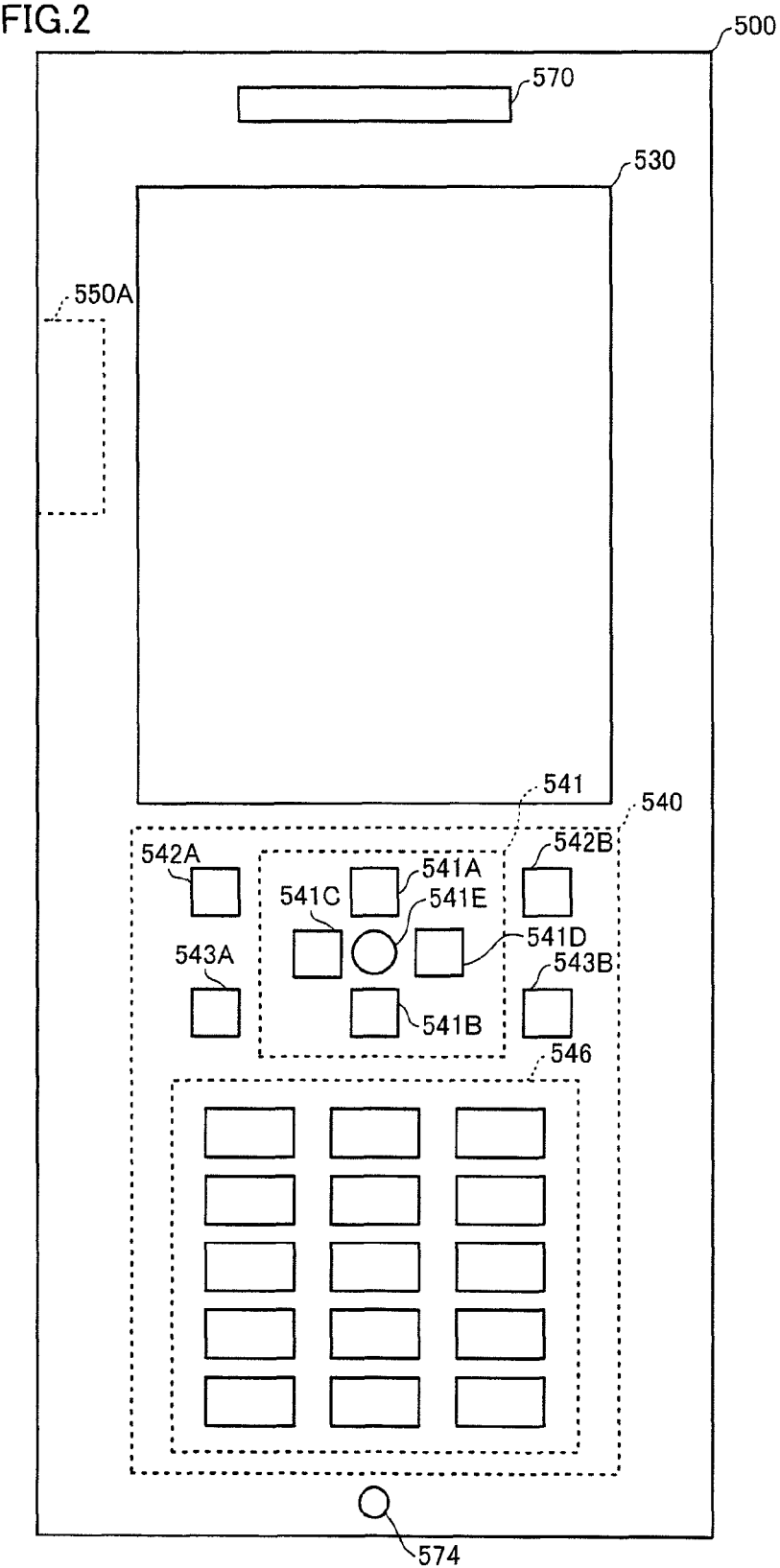
FIG. 2 shows an exterior appearance of a portable terminal as seen from the front side.

FIG. 2 shows an external appearance of portable terminal 500 as seen from the front side. Referring to FIG. 2, portable terminal 500 includes a display unit 530 and an audio output unit 570.

Display unit 530 has a function of displaying characters and images for example. Display unit 530 has a display surface provided for displaying characters and images for example. Display unit 530 is a device using an LCD panel (Liquid Crystal Display Panel). Here, display unit 530 may be a device using a panel adapted to any display system other than the above-described one.

The display surface of display unit 530 has a resolution of 480 (dots) in width×800 (dots) in length. The resolution of the display surface of display unit 530 is not limited to 480 (dots) in width×800 (dots) in length, and may be any resolution other than the above-described one.

Display unit 530 further has a touch panel function of allowing a user to input information by directly touching the display surface. Display unit 530 transmits positional information about the position of the display surface where the user touches, to a control unit 510 as described later. Control unit 510 performs predetermined processing based on the positional information as received.

Audio output unit 570 has a function of outputting sound from the phone. Audio output unit 570 includes a speaker from which sound is output. Audio output unit 570 receives audio data from control unit 510 as described later to output from the speaker the sound based on the audio data.

Portable terminal 500 further includes an input unit 540. Input unit 540 includes a group of buttons 541. Button group 541 includes direction buttons 541A, 541B, 541C, 541D and an enter button 541E. Direction buttons 541A, 541B, 541C, and 541D are buttons that are used, while an image is displayed on display unit 530, for moving an object (such as a cursor for example) to be moved in the image, toward the top, bottom, left, and right, in response to user's pressing of the buttons for a short period of time (less than one second for example) (hereinafter also referred to as short pressing).

Specifically, direction buttons 541A, 541B, 541C, and 541D are buttons for moving a cursor for example upward, downward, leftward, and rightward, respectively, in response to short pressing of the buttons. Direction buttons 541A, 541B, 541C, and 541D can also scroll a screen for example upward, downward, leftward, and rightward, respectively, in response to user's pressing of the buttons for a long period of time (one second or more for example) (hereinafter also referred to as long pressing).

Enter button 541E is a button for entering an item or the like selected by short pressing of direction buttons 541A, 541B, 541C, 541D, for example, in response to short pressing of the enter button.

Input unit 540 further includes function buttons 542A, 542B, 543A, and 543B. Function buttons 542A, 542B are each a button for starting a program or the like set in advance by a user, for example, in response to user's short pressing of the button.

Function button 543A is a button for making a call. For example, after a telephone number is input by short pressing of buttons in a character button group 546 as described later, function button 543A is short-pressed for making a call to the portable terminal with the input telephone number. Function button 543A is also a button short-pressed for answering a call made to portable terminal 500. Function button 543B is a button that is short-pressed, while portable terminal 500 is answering a call, for ending the call. Function button 543B is also a button for switching portable terminal 500 on and off in response to user's pressing of the button for a long period of time (one second or more for example) (hereinafter also referred to as long pressing).

Figure 3:
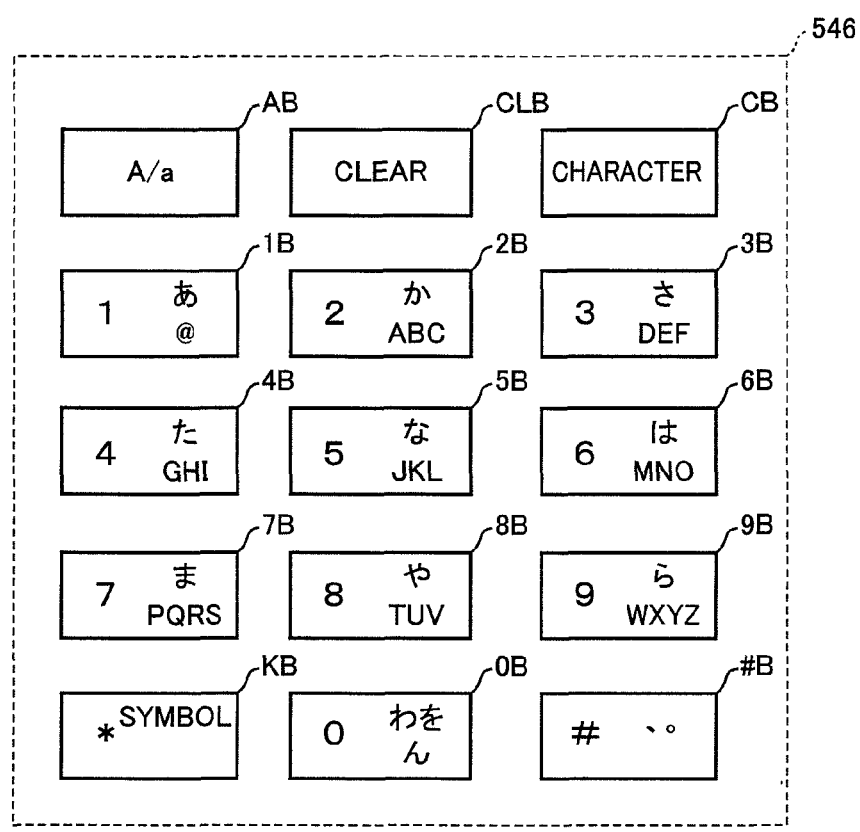
FIG. 3 shows an exemplary group of character buttons.

Input unit 540 further includes a group of character buttons 546. FIG. 3 shows an exemplary character button group 546. Referring to FIG. 3, character button group 546 includes character buttons AB, CLB, CB, 1B, 2B, 3B, 4B, 5B, 6B, 7B, 8B, 9B, KB, 0B, #B. Character buttons AB, CLB, CB, 1B, 2B, 3B, 4B, 5B, 6B, 7B, 8B, 9B, KB, 0B, #B are each a button that is short-pressed to input a number, character, symbol or the like. Here, the number of character buttons included in character button group 546 is not limited to 15.

Character button AB is a button for switching an uppercase letter input mode to a lowercase letter input mode and vise versa in response to each short pressing of the button. Character button CLB is a button for deleting an already input character in response to short pressing of the button. Character button CB is a button for changing the type of characters to be input in response to each short pressing of the button. Character buttons 1B, 2B, 3B, 4B, 5B, 6B, 7B, 8B, 9B, KB, 0B, #B are each a button for inputting a character or the like as indicated within the corresponding button. For example, character button 3B is a button for inputting any of characters such as "3", さ, し, す, せ, そ, D, E, F in response to short pressing of the button.

Referring again to FIG. 2, input unit 540 transmits to control unit 510 as descried later a button signal corresponding to a short-pressed or long-pressed button among a plurality of buttons included in input unit 540. Namely, input unit 540 serves as an interface for allowing a user to manipulate portable terminal 500. In the following, user's manipulation of input unit 540 or user's touch on display unit 530 is also referred to as interface manipulation M.

Portable terminal 500 further includes an audio input unit 574 and a recording medium insert section 550A. Audio input unit 574 has a function of allowing sound to be input during a call. Audio input unit 574 includes a microphone to which sound is input. Audio input unit 574 converts the sound collected by the microphone into audio data, and transmits the audio data to control unit 510 as described later in portable terminal 500. Recording medium insert section 550A is a portion for inserting a recording medium as described later into portable terminal 500.

Figure 4:
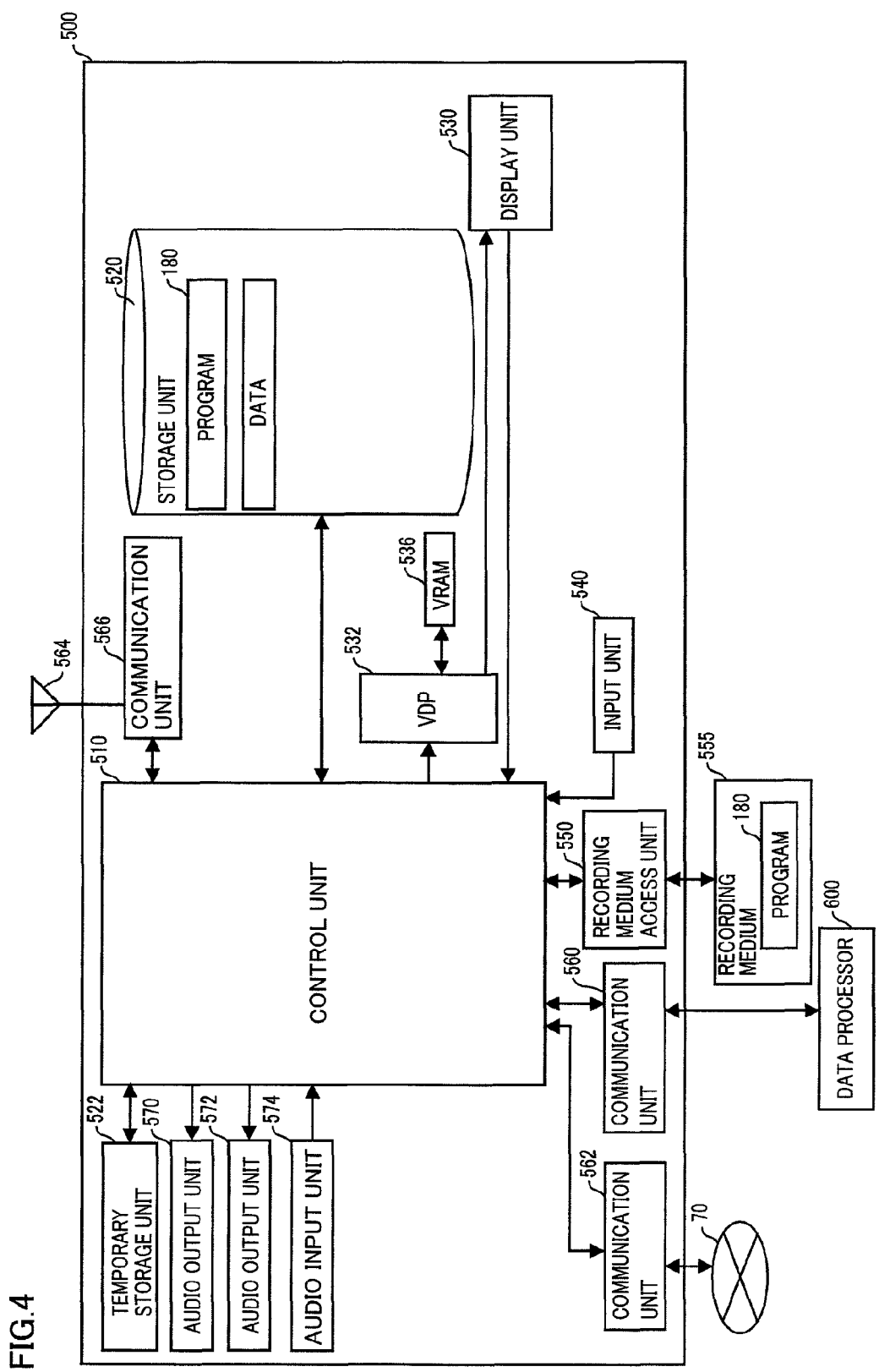
FIG. 4 is a block diagram showing an internal configuration of a portable terminal.

FIG. 4 is a block diagram showing an internal configuration of portable terminal 500. In FIG. 4, a recording medium 555 is shown together for the purpose of illustration. A program 180 as described later is recorded on recording medium 555. Namely, program 180 recorded on a medium or the like is distributed as a program product in the market. Recording medium 555 is also distributed as a program product in the market.

Referring to FIG. 4, portable terminal 500 further includes control unit 510, a temporary storage unit 522 and a storage unit 520.

Storage unit 520 has a function of storing data in a nonvolatile manner. The data in storage unit 520 is accessed by control unit 510. Storage unit 520 is a medium (such as flash memory) capable of holding data in a nonvolatile manner even without being supplied with electric power. Storage unit 520 stores program 180 and other various types of data, for example.

Control unit 510 has a function of performing various types of processing for each component in portable terminal 500, or operations, for example, in accordance with program 180 stored in storage unit 520. Control unit 510 is a CPU (Central Processing Unit). Here, control unit 510 is not limited to the CPU and may be any of other circuits having an operational function.

Data in temporary storage unit 522 is accessed by control unit 510, and temporary storage unit 522 is used as a work memory where data is temporarily stored. Temporary storage unit 522 is a DRAM (Dynamic Random Access Memory). Here, temporary storage unit 522 is not limited to the DRAM and may be any of other circuits capable of storing data in a volatile manner.

Portable terminal 500 further includes a VDP (Video Display Processor) 532 and a VTRAM (Video Random Access Memory) 536.

VRAM 536 has a function of temporarily storing image data. Control unit 510 gives a drawing instruction to VDP 532 in accordance with program 180 stored in storage unit 520. The drawing instruction refers to an instruction for generating an image and causing display unit 530 to display the image.

VDP 532 is connected to display unit 530. In response to the drawing instruction from control unit 510, VDP 532 reads font data, graphic data for example from program 180 as described later in storage unit 520, and generates an image using VRAM 536. VDP 532 reads image data stored in VRAM 536 and causes display unit 530 to display the image based on the image data.

Portable terminal 500 further includes input unit 540 and a recording medium access unit 550.

Control unit 510 receives from input unit 540 a button signal corresponding to a short-pressed or long-pressed button among above-described multiple buttons included in input unit 540. Control unit 510 performs processing appropriate for the received button signal.

Recording medium access unit 550 becomes able to access data of recording medium 555 when recording medium 555 is inserted (mounted) from above-described recording medium insert section 550A to portable terminal 500. Thus, recording medium access unit 550 can read program 180 from recording medium 555 where program 180 is recorded.

Program 180 stored on recording medium 555 is read by recording medium access unit 550 through an install process of control unit 510, and control unit 510 causes program 180 to be stored in storage unit 520. A program for this install process is stored in advance in storage unit 520, and control unit 510 performs the install process based on the program for the install process.

Here, program 180 may not be installed in storage unit 520. In this case, control unit 510 reads program 180 stored on recording medium 555 via recording medium access unit 550, and performs predetermined processing based on program 180. On recording medium 555, contents data or the like is further recorded. Contents data refers to, for example, music data, moving image data and the like.

Recording medium 555 is an SD (Secure Digital) memory card. Here, recording medium 555 is not limited to the SD memory card and may be any of other media where data can be recorded in a nonvolatile manner.

Portable terminal 500 further includes a communication unit 560 and a communication unit 562. Communication unit 560 transmits and receives data to and from control unit 510. Communication unit 560 also has a function of transmitting and receiving data to and from data processor 600 in a wired or wireless manner.

Communication unit 560 has a communication interface function for performing serial transfer based on the USB® (Universal Serial Bus) 2.0 standard. Here, the communication interface standard for performing serial transfer is not limited to the USB 2.0 and may be any of other standards.

Communication unit 560 may have a communication interface function for performing parallel transfer. The communication interface for performing parallel transfer is, for example, an interface complying with the Centronics standard. Communication unit 560 may have a communication interface function based on the 1394 or SCSI standard.

Further, communication unit 560 has a radio data communication function. The radio data communication function refers to a function for communicating data in a wireless manner by means of Bluetooth®. Here, the radio data communication is not limited to the system using Bluetooth® and may be another communication system using the infrared radiation for example. In response to a control instruction from control unit 510, communication unit 560 communicates data with data processor 600 in a wireless manner.

Thus, portable terminal 500 uses communication unit 560 to perform short-range communication of data with data processor 600. Here, "to perform short-range communication of data" refers to performing wired communication or wireless communication limited to the communication chiefly made within premises such as house where communication can be made in a range of approximately 1 m to 100 m (line-of-sight distance for wireless communication).

Communication unit 562 transmits and receives data to and from control unit 510. Communication unit 562 has a function of communicating data with network 70 using a wired technology. The wired technology is, for example, a technology based on Ethernet®. In this case, communication unit 562 can communicate data with network 70 via a LAN cable for example. Here, the wired technology is not limited to the Ethernet®-based technology and may be any of other wired technologies.

Communication unit 562 also has a function of communicating data with network 70 using a wireless technology. The wireless technology is, for example, a technology based on IEEE 802.11g. Here, the wireless technology is not limited to the IEEE 802.11g-based technology and may be any of other wireless technologies. Communication unit 562 can thus communicate data with network 70 in a wireless manner.

Portable terminal 500 further includes an antenna 564 and a communication unit 566. Antenna 564 is connected to communication unit 566. Communication unit 566 has a function of transmitting and receiving a radio communication signal by means of antenna 564. Communication unit 566 receives via antenna 564 a radio communication signal of a frequency specified by control unit 510. The radio communication signal is a signal including audio data, character data and image data for example.

Communication unit 566 uses antenna 564 to communicate a radio communication signal with the nearest base station (not shown). The nearest base station can communicate with telephone network 60. Therefore, communication unit 566 uses antenna 564 to communicate a radio communication signal with telephone network 60 via the nearest base station. In the case where communication unit 566 has received a radio communication signal, communication unit 566 demodulates the radio communication signal and transmits data based on the demodulated radio communication signal to control unit 510. In the case where communication unit 566 is to transmit a radio communication signal, communication unit 566 receives data (such as audio data) from control unit 510 and converts the data based on a predetermined protocol into the radio communication signal. Communication unit 566 then uses antenna 564 to transmit the converted radio communication signal via the nearest base station (not shown) to telephone network 60.

Communication unit 566 can also obtain information representing the position of the nearest base station (hereinafter also referred to as base station positional information) by communicating with the nearest base station. In response to a control instruction from control unit 510, communication unit 566 transmits the obtained base station positional information to control unit 510. Based on the received base station positional information, control unit 510 can roughly ascertain the position of portable terminal 500.

Communication unit 566 has a GPS (Global Positioning System) function. The GPS function refers to a function of communicating with artificial satellites to obtain information about the position (position based on the latitude, longitude, altitude for example) of portable terminal 500 (hereinafter also referred to as GPS positional information). In response to a control instruction from control unit 510, communication unit 566 obtains the GPS positional information and transmits the information to control unit 510.

Portable terminal 500 can also download a program from network 70 via telephone network 60 and store the program in storage unit 520, through a download process by control unit 510 and communication unit 566. In this case, the downloaded program is program 180.

In accordance with the program (program 180) downloaded from network 70, control unit 510 performs predetermined processing. A downloading program for this downloading is stored in advance in storage unit 520, and the download process is performed by control unit 510 based on the downloading program.

Portable terminal 500 further includes an audio output unit 572. Audio output unit 572 is placed on the outside of portable terminal 500. Audio output unit 572 has a function of outputting sound associated with processing performed by control unit 510. Audio output unit 572 includes a speaker from which sound is output. Audio output unit 572 outputs sound from the speaker based on audio data received from control unit 510.

Control unit 510 communicates data with audio output unit 570 and audio input unit 574 as described above. When control unit 510 transmits audio data to audio output unit 570, audio output unit 570 outputs sound from the speaker based on the audio data received from control unit 510.

When a user utters voice into the microphone included in audio input unit 574, audio input unit 574 converts the voice collected by the microphone into audio data, and transmits the audio data to control unit 510.

Data Processor

Data processor 600 will now be described in detail.

Figure 5:
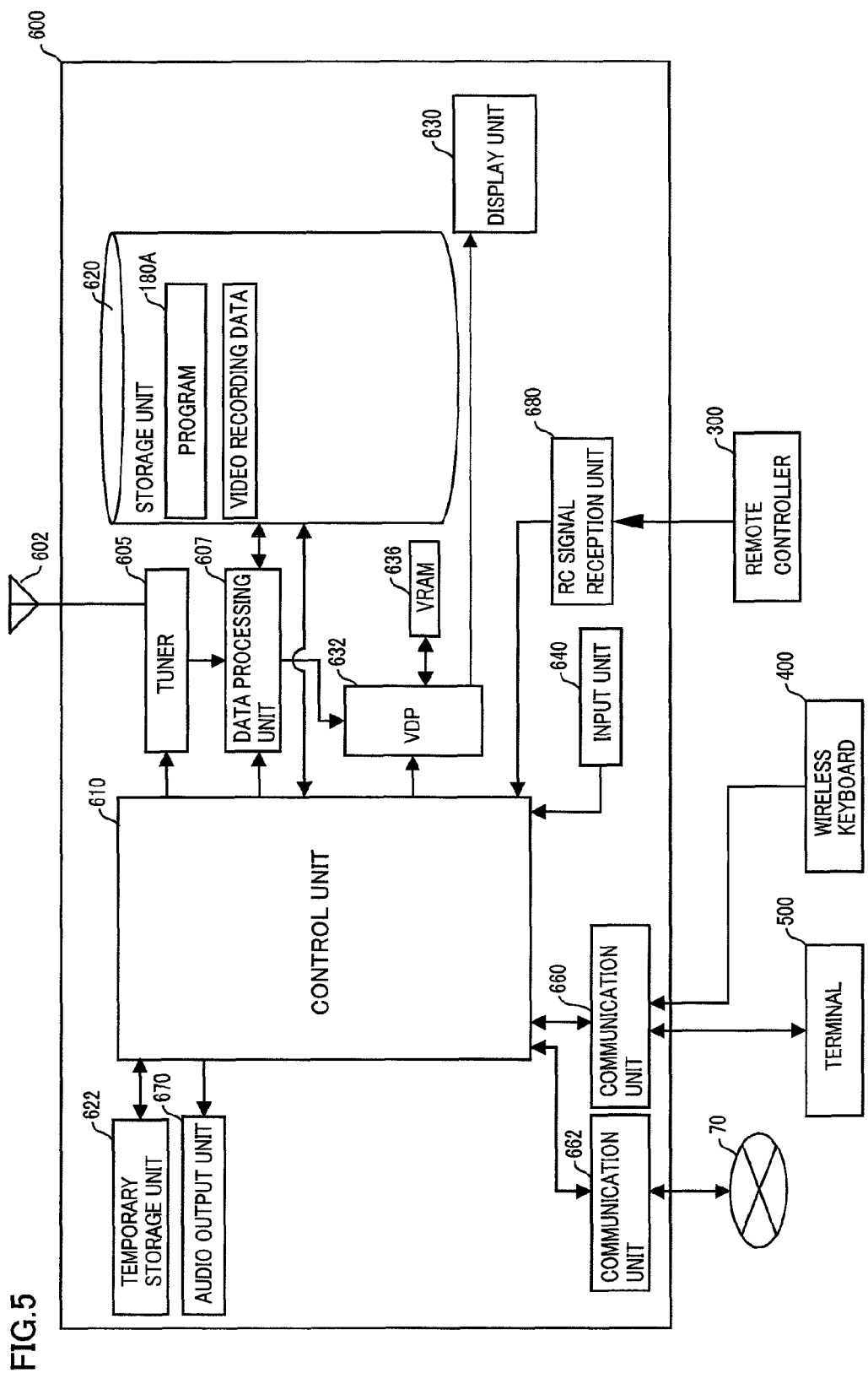
FIG. 5 is a block diagram showing an internal configuration of a data processor.

FIG. 5 is a block diagram showing an internal configuration of data processor 600. Referring to FIG. 5, data processor 600 includes a display unit 630 and an audio output unit 670. Display unit 630 has a function of displaying characters and images for example. Display unit 630 is a device using an LCD panel (Liquid Crystal Display panel). Here, display unit 530 may be a device using a panel adapted to any display system other than the above-described one.

The size of an image that can be displayed by display unit 630 is larger than the size of an image that can be displayed by display unit 530. The resolution of display unit 630 is higher than that of display unit 530. For example, display unit 630 has a resolution of 1920 (dots) in width×1080 (dots) in length. Here, the resolution of display unit 630 is not limited to 1920 (dots) in width×1080 (dots) in length, and may be any resolution other than the above-described one.

Audio output unit 670 is placed on the outside of data processor 600. Audio output unit 670 has a function of outputting sound associated with processing performed by a control unit 610 as described later. Audio output unit 670 includes a speaker from which sound is output. Audio output unit 670 outputs from the speaker sound based on audio data received from control unit 610 as described later.

Data processor 600 further includes control unit 610, a temporary storage unit 622 and storage unit 620.

Storage unit 620 has a function of storing data in a nonvolatile manner. The data in storage unit 620 is accessed by control unit 610. Storage unit 620 is a hard disk capable of storing a large volume of data. Here, storage unit 620 is not limited to the hard disk and may be any medium (such as flash memory) capable of holding data in a nonvolatile manner even without being supplied with electric power. Storage unit 620 stores a program 180A, video recording data as described later, and other various types of data, for example.

Control unit 610 has a function of performing various types of processing for each component in data processor 600, or operations, for example, in accordance with program 180A stored in storage unit 620. Control unit 610 is similar to above-described control unit 510, and the detailed description thereof will not be repeated.

Data in temporary storage unit 622 is accessed by control unit 610, and temporary storage unit 622 is used as a work memory where data is temporarily stored. Temporary storage unit 622 is similar to above-described temporary storage unit 522, and the detailed description thereof will not be repeated.

Data processor 600 further includes an antenna 602, a tuner 605 and a data processing unit 607.

Antenna 602 is connected to tuner 605. Tuner 605 receives via antenna 602 a broadcast signal of a frequency specified by control unit 610. Tuner 605 has a function of receiving a broadcast signal based on digital broadcasting and a broadcast signal based on analog broadcasting. Tuner 605 transmits a received broadcast signal to data processing unit 607.

When data processing unit 607 receives from control unit 610 a display instruction for causing display unit 630 to display an image, data processing unit 607 obtains image data from the received broadcast signal, and transmits the image data to a VDP 632 as described later. When VDP 632 receives the image data, VDP 632 causes display unit 630 to display an image (moving image or still image) based on the image data. In the following, an image that is based on a broadcast signal received by tuner 605 and is displayed on display unit 630 is also referred to as TV image.

In the case where the broadcast signal received by data processing unit 607 is a signal based on analog broadcasting and where data processing unit 607 receives from control unit 610 a video recording instruction for performing video recording, data processing unit 607 compresses image data and audio data obtained from the broadcast signal and causes storage unit 620 to store the data as video recording data. In the case where the broadcast signal received by data processing unit 607 is a signal based on digital broadcasting and where data processing unit 607 receives from control unit 610 a video recording instruction for performing video recording, data processing unit 607 causes storage unit 620 to store image data and audio data obtained from the broadcast signal as video recording data.

The video recording data stored in storage unit 620 is data compressed in accordance with the MPEG-2 standard. Here, the video recording data is not limited to the data compressed in accordance with the MPEG-2 standard, and may be data compressed in accordance with any of other standards. Here, other standards include the H.264 standard for example. In the following, video recording data stored in storage unit 620 is also referred to as contents.

Data processor 600 further includes VDP 632 and a VRAM 636. VRAM 636 has a function of temporarily storing image data.

Control unit 610 gives a drawing instruction to VDP 632 in accordance with program 180A stored in storage unit 620. The drawing instruction refers to an instruction for generating an image and causing display unit 630 to display the image.

VDP 632 is connected to display unit 630. In response to the drawing instruction from control unit 610, VDP 632 reads font data, graphic data for example from program 180A as described later in storage unit 620, and generates an image using VRAM 636. VDP 632 reads image data stored in VRAM 636 and causes display unit 630 to display the image based on the image data.

Data processor 600 further includes an input unit 640. Input unit 640 includes a plurality of buttons (not shown). A plurality of buttons is provided on the outside of data processor 600. When a user presses any of these buttons, input unit 640 transmits to control unit 610 a button signal corresponding to the pressed button. Based on the received button signal, control unit 610 performs predetermined pressing. In the following, user's pressing of a button of input unit 640 is also referred to as interface manipulation T.

Data processor 600 further includes a communication unit 660 and a communication unit 662. Communication unit 660 transmits and receives data to and from control unit 610. Communication unit 660 also has a function of transmitting and receiving data to and from portable terminal 500 in a wired or wireless manner. Communication unit 660 is configured and functions similarly to above-described communication unit 560, and the detailed description thereof will not be repeated.

Communication unit 660 further has a function of communicating with wireless keyboard 400 in a wireless manner. Communication unit 660 receives in a wireless manner from wireless keyboard 400 character data representing information about characters for example as input by a user. Communication unit 660 transmits to control unit 610 the information represented by the character data received from wireless keyboard 400.

Communication unit 662 transmits and receives data to and from control unit 610. Communication unit 662 has a function of communicating data with network 70 by means of a wired technology. The wired technology is, for example, a technology based on Ethernet®. In this case, communication unit 662 can communicate data with network 70 via a LAN cable for example. Here, the wired technology is not limited to the Ethernet®-based technology and may be any of other wired technologies.

Communication unit 662 also has a function of communicating data with network 70 by means of a wireless technology. The wireless technology is, for example, a technology based on IEEE 802.11g. Here, the wireless technology is not limited to the IEEE 802.11g-based technology and may be any of other wireless technologies. Communication unit 662 can thus communicate data with network 70 in a wireless manner.

Thus, data processor 600 of the present embodiment can also download a program from network 70 via communication unit 662 and store the program in storage unit 620, through a download process. In this case, the downloaded program is program 180A.

Control unit 610 performs predetermined processing in accordance with the program (program 180A) downloaded from network 70. A downloading program for this downloading is stored in advance in storage unit 620, and control unit 610 performs the download process based on the downloading program.

Data processor 600 further includes an RC signal reception unit 680. RC signal reception unit 680 has a function of receiving a remote control signal (hereinafter also referred to as RC signal) that is output from a remote controller 300 for controlling data processor 600. RC signal reception unit 680 transmits the received RC signal to control unit 610. In response to the RC signal as received, control unit 610 performs appropriate processing.

In the following, a remote control signal transmitted from communication unit 560 of portable terminal 500 for controlling data processor 600 is also referred to as RC signal. In this case, communication unit 660 receives the RC signal transmitted from portable terminal 500, and transmits the received RC signal to control unit 610. In response to the received RC signal, control unit 610 performs appropriate processing.

Control unit 610 communicates data with audio output unit 670 as described above. When control unit 610 transmits audio data to audio output unit 670, audio output unit 670 outputs from the speaker the sound based on the audio data received from control unit 610.

Control of the Data Processor

A description will now be given of a process for using portable terminal 500 as a remote controller to control data processor 600. Here, program 180 stored in storage unit 520 includes a remote control program. When interface manipulation M is performed on portable terminal 500 for executing the remote control program, control unit 510 accordingly executes the remote control program. When the remote control program is executed, the operation mode of portable terminal 500 is a remote control mode (hereinafter also referred to as RC mode) in which data processor 600 can be controlled. In the following, an operation mode of portable terminal 500 in which data processor 600 cannot be controlled is referred to as normal mode.

Display unit 530 of portable terminal 500 in the RC mode displays a control image MG100 as described below. It is supposed here that display unit 630 of data processor 600 displays a TV image based on a broadcast signal.

Figure 6:
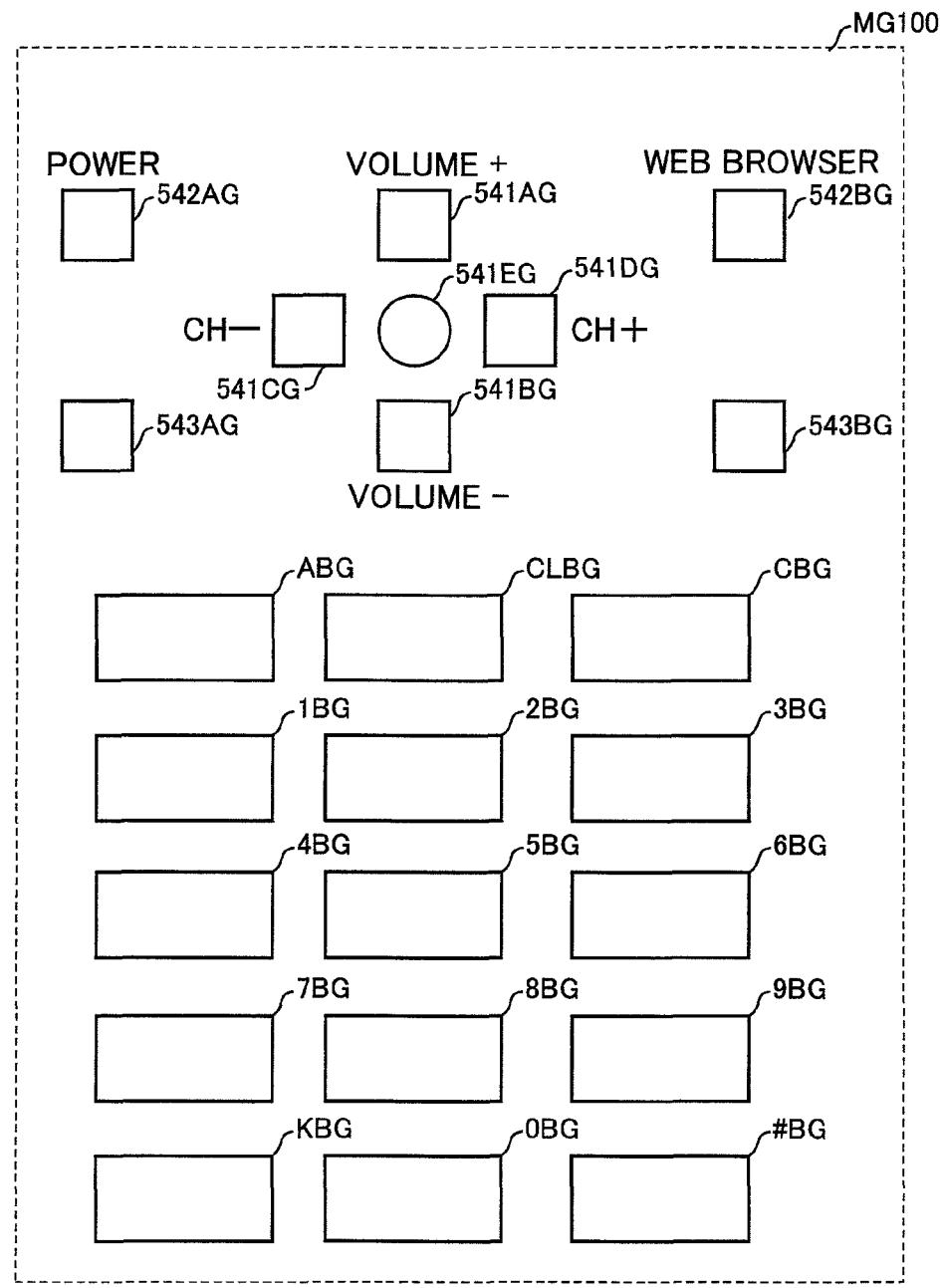
FIG. 6 shows an exemplary control image.

FIG. 6 shows an exemplary control image MG100. Referring to FIG. 6, in control image MG100, direction button images 541AG, 541BG, 541CG, and 541DG corresponding respectively to direction buttons 541A, 541B, 541C, and 541D are displayed.

In the following, a state where portable terminal 500 is in the RC mode and display unit 530 displays control image MG100 is also referred to as State M.

In State M, direction button 541A corresponding to direction button image 541AG serves as a button pressed for transmitting to data processor 600 an RC signal for raising the sound volume for the TV image displayed on display unit 630 of data processor 600. In State M, direction button 541B corresponding to direction button image 541BG serves as a button pressed for transmitting to data processor 600 an RC signal for lowering the sound volume for the TV image displayed on display unit 630 of data processor 600.

In State M, direction button 541C corresponding to direction button image 541CG serves as a button for transmitting to data processor 600 an RC signal for decrementing by "1" the channel number of the TV image displayed on display unit 630 of data processor 600. In State M, direction button 541D corresponding to direction button image 541DG serves as a button for transmitting to data processor 600 an RC signal for incrementing by "1" the channel number of the TV image displayed on display unit 630 of data processor 600.

In control image MG100, an enter button image 541EG corresponding to enter button 541E is also displayed. In State M, enter button 541E corresponding to enter button image 541EG is an invalid button. The invalid button is a button that causes no process to be performed even if the button is pressed.

In control image MG100, function button images 542AG, 542BG, 543AG, and 543BG corresponding respectively to function buttons 542A, 542B, 543A, and 543B are also displayed. In State M, function button 542A corresponding to function button image 542AG serves as a button pressed for transmitting to data processor 600 an RC signal for switching the operation mode of data processor 600 to a standby mode or normal mode (hereinafter also referred to as power RC signal).

The standby mode refers to a state where display unit 630 displays no image and an RC signal can be received. The normal mode refers to a state in which display unit 630 displays an image. When data processor 600 in the normal mode receives the power RC signal, data processor 600 changes to the standby mode. When data processor 600 in the standby mode receives the power RC signal, data processor 600 changes to the normal mode.

In State M, function button 542B corresponding to function button image 542BG is a button pressed for transmitting to data processor 600 an RC signal for activating the Web browser in State M (hereinafter also referred to as Web-RC signal). In State M, function buttons 543A and 543B corresponding respectively to function button images 543AG and 543BG are invalid buttons.

In control image MG100, character button images ABG, CLBG, CBG, 1BG, 2BG, 3BG, 4BG, 5BG, 6BG, 7BG, 8BG, 9BG, KBG, 0BG, and #BG corresponding respectively to character buttons AB, CLB, CB, 1B, 2B, 3B, 4B, 5B, 6B, 7B, 8B, 9B, KB, 0B, and #B are further displayed. In State M, the buttons corresponding respectively to character button images ABG, CLBG, CBG, 1BG, 2BG, 3BG, 4BG, 5BG, 6BG, 7BG, 8BG, 9BG, KBG, 0BG, and #BG are invalid buttons.

It is supposed here that a web page display manipulation for displaying a web page is performed in State M. The web page display manipulation is the manipulation of pressing function button 542B corresponding to function button image 542BG. In this case, control unit 510 transmits a Web-RC signal to data processor 600. When control unit 610 of data processor 600 receives the Web-RC signal, control unit 610 executes a web browser program to activate the web browser and cause display unit 630 to display a web page registered in advance.

As for portable terminal 500, when the web page display manipulation is done in State M, control unit 510 uses VDP 532 to generate a control image MG100A as described below, and causes display unit 530 to display control image MG100A.

Figure 7:
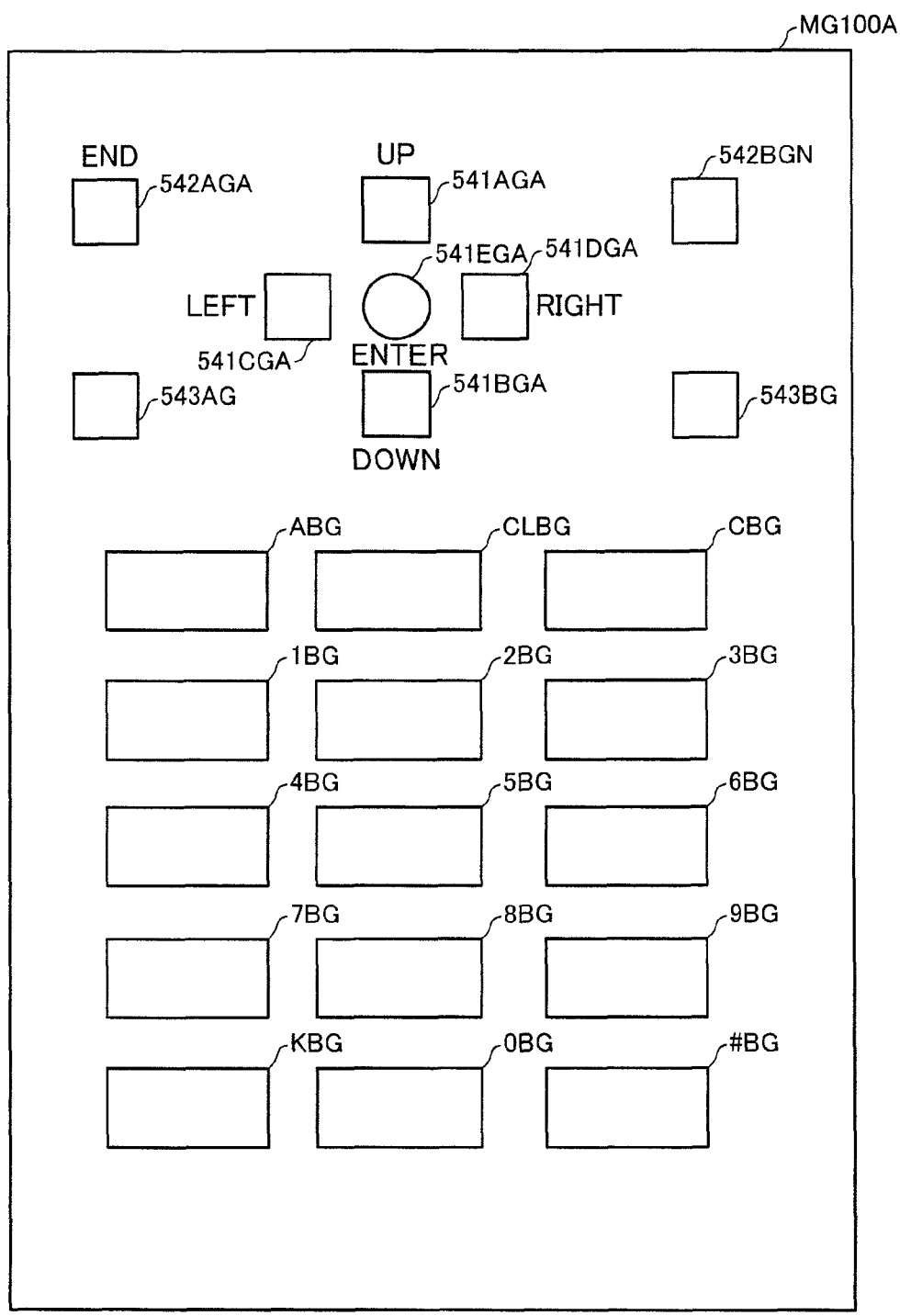
FIG. 7 shows an exemplary control image.

FIG. 7 shows an exemplary control image MG100A. Referring to FIG. 7, control image MG100A differs from control image MG100 of FIG. 6 in that direction button images 541AGA, 541BGA, 541CGA, and 541DGA are displayed instead of direction button images 541AG, 541BG, 541CG, and 541DG, that an enter button image 541EGA is displayed instead of enter button image 541EG and that function button images 542AGA and 542BGN are displayed instead of function button images 542AG and 542BG. Control image MG100A is similar to control image MG100 in other respects, and the detailed description thereof will not be repeated.

Direction button images 541AGA, 541BGA, 541CGA, and 541DGA are button images corresponding respectively to direction buttons 541A, 541B, 541C, and 541D. Enter button image 541EGA is a button image corresponding to enter button 541E. Function button images 542AGA and 542BGN are button images corresponding respectively to function buttons 542A and 542B.

In the following, a state where portable terminal 500 is in the RC mode and display unit 530 displays control image MG100A is also referred to as State MA. It is supposed here that display unit 630 of data processor 600 displays a web page. In the following, an object to be selected that is displayed within the web page is also referred to as selection target. The selection target includes, for example, a box in which a character is to be input (hereinafter also referred to as character input box), and a character string or image linked (hyperlinked) to another web page or the like (hereinafter also referred to as link content).

In State MA, function button 542A corresponding to function button image 542AGA is a button pressed for transmitting an END-RC signal to data processor 600. The END-RC signal is an RC signal for ending a program being executed by control unit 610 of data processor 600. In State MA, function button 542A corresponding to function button image 542AGA also serves as a button pressed for ending a remote control program executed by control unit 510. In State MA, function button 542B corresponding to function button image 542BGN is an invalid button.

In State MA, direction button 541A corresponding to direction button image 541AGA is a button pressed for transmitting an UP-RC signal to data processor 600. The UP-RC signal is, for example, an RC signal for changing the selection target to be selected in a web page displayed if any on display unit 630, from a currently selected selection target to a selection target located above the currently selected selection target.

In State MA, direction button 541B corresponding to direction button image 541BGA is a button pressed for transmitting a DOWN-RC signal to data processor 600. The DOWN-RC signal is, for example, an RC signal for changing the selection target to be selected in a web page displayed if any on display unit 630, from a currently selected selection target to a selection target located below the currently selected selection target.

In State MA, direction button 541C corresponding to direction button image 541CGA is a button pressed for transmitting a LEFT-RC signal to data processor 600. The LEFT-RC signal is, for example, an RC signal for changing the selection target to be selected in a web page displayed if any on display unit 630, from a currently selected selection target to a selection target located on the left side of the currently selected selection target.

In State MA, direction button 541D corresponding to direction button image 541DGA is a button pressed for transmitting a RIGHT-RC signal to data processor 600. The RIGHT-RC signal is, for example, an RC signal for changing the selection target to be selected in a web page displayed if any on display unit 630, from a currently selected selection target to a selection target located on the right side of the currently selected selection target.

In State MA, enter button 541E corresponding to enter button image 541EGA is a button pressed for transmitting an ENTER-RC signal to data processor 600. The ENTER-RC signal is, for example, an RC signal for determining that a selection target to be selected in a web page displayed if any on display unit 630 is the currently selected selection target. In the case where display unit 630 displays a currently selected selection target, where data processor 600 receives the ENTER-RC signal and where the selection target is a character input box, data processor 600 is set in a mode for allowing a character to be input in the character input box. In the following, a currently selected character input box is also referred to as selected character input box.

A description will now be given of a process performed by portable terminal 500 while portable terminal 500 is in the RC mode (hereinafter also referred to as manipulation determination process M). Manipulation determination process M is performed independently of other processes. Data processor 600 performs a control signal process T independently of other processes as described below.

It is supposed here that display unit 530 of portable terminal 500 displays control image MG100A of FIG. 7. Namely, the state of portable terminal is State MA. It is also supposed that, in State MA, direction buttons 541A, 541B, 541C, 541D and enter button 541E are manipulated to display a web page image G200 as described below on display unit 630 of data processor 600.

FIG. 8 shows an exemplary web page image G200. Referring to FIG. 8, in web page image G200, character input boxes IW212, IW214, IW222, IW224, IW232, IW234, IW236, IW242, IW244, TW252, IW262, IW264, IW266, IW272, and IW282 are arranged.

Character input boxes IW212, IW214 are boxes where a full name is to be input. Character input boxes IW222, IW224 are boxes where a kana reading of a kanji character, namely how a kanji character is read is represented in kana, is to be input. Character input boxes IW232, IW234, IW236 are boxes where a date of birth is to be input. Character input boxes IW242, IW244 are boxes where a postal code is to be input. Character input box IW252 is a box where an address is to be input. Character input boxes IW262, IW264, IW266 are boxes where a telephone number is to be input. Character input box IW272 is a box where a user ID (identification) is to be input. Character input box IW282 is a box where a password is to be input.

Web page image G200 further displays a selection box SL205 for selecting a character input box or link content. Here, in an initial state where web page G200 is first displayed on display unit 630, selection box SL205 is placed to enclose, for example, character input box IW212. In this case, character input box IW212 is a selected box.

Control unit 610 allocates an ID to a character input box for identifying the character input box (hereinafter also referred to as input box ID). The input box ID is associated with various types of information. In the following, a data table indicating information associated with the input box ID is also referred to as input box data table. Here, a plurality of character input boxes shown in web page image G200 are each associated with information as indicated by a data table TD100 described below.

FIG. 9 shows an exemplary input box data table TD100. Referring to FIG. 9, input box TDs "TX01", "TX02", "TX03", "TX04", "TX05", "TX06", "TX07", "TX08", "TX09", "TX10", "TX11", "TX12", "TX13", "TX14", "TX15" are IDs for identifying character input boxes IW212, IW214, IW222, IW224, IW232, IW234, IW236, IW242, IW244, IW252, IW262, IW264, IW266, IW272, IW282, respectively.

In input box data table TD100, "permitted character type" refers to a type of characters permitted to be input in a character input box identified by the associated input box ID.

Under the item "permitted character type", a label represented in alphabet is indicated. Labels indicated under the item "permitted character type" will be described with reference to a label description table T110 as follows.

FIG. 10 shows an exemplary label description table T110. Referring to FIG. 10, "description" in label description table T110 refers to a description of an associated label. For example, the label "KANJI" means kanji. In this case, in a character input box identified by an input box ID associated with the label "KANJI" under the item "permitted character type" in input box data table TD100 of FIG. 9, kanji that is a permitted character type is permitted to be input. In this case, in character input box IW212 identified by input box ID "TX01", for example, kanji, which is the permitted character type, is permitted to be input.

In label description table T110, the label "HIRAGANA" for example means hiragana. In this case, in a character input box identified by an input box ID associated with the label "HIRAGANA" under the item "permitted character type" in input box data table TD100, hiragana that is the permitted character type is permitted to be input.

Further, in label description table T110, the label "HALF-ALPH-LOWER" for example means half width alphabet lowercase. In this case, in a character input box identified by an input box ID associated with the label "HALF-ALPH-LOWER" under the item "permitted character type" in input box data table TD100, half width alphabet lowercase that is the permitted character type is permitted to be input.

In the case where a plurality of labels are indicated in a cell under the item "permitted character type" in input box data table TD100 of FIG. 9, characters of respective types corresponding to these labels are permitted to be input in a character input box identified by an associated input box ID. For example, in character input box IW252 identified by input box ID "TX10" associated with the labels "KANJI", "HIRAGANA" and "NUMERAL" under the item "permitted character type" in input box data table TD100, kanji, hiragana and full width numeral that are permitted character types are permitted to be input.

Further, the label "PASSWORD" in label description table T110 means password. In the case where the character string "[PASSWORD]" is indicated under the item "permitted character type" in input box data table TD100, a character to be input in the character input box identified by the input box ID associated with the character string "[PASSWORD]" is replaced for example with "*" and displayed in the character input box.

For example, in character input box IW282 identified by input box ID "TX15" in input box data table TD100, half width alphabet uppercase, half width alphabet lowercase and half width numeral that are permitted character types are permitted to be input. In this case, a character to be input to character input box IW282 is replaced with "*" and displayed in character input box IW282.

Referring again to FIG. 9, "input data capacity" in input box data table TD100 refers to the data size of characters that are of the associated permitted character type and can be input to the character input box identified by the associated input box ID. For example, in character input box IW232 identified by input box ID "TX05", half width numerals can be input up to total 4 bytes in data size. Here, the data size of a half width numeral is 1 byte. In this case, half width numerals can be input up to 4 bytes in total in character input box IW232.

Further, in character input box IW252 identified by input box ID "TX10", for example, kanji, hiragana and full width numeral can be input up to 60 bytes in total in data size. Here, respective data sizes of a kanji, a hiragana and a full width numeral are each 2 bytes. In this case, in character input box IW252, kanji, hiragana and full width numeral can be input up to 30 characters in total.

In the following, the information associated with a character input box is also referred to as input box associated information. The input box associated information is, for example, the information of the permitted character type and the information of the input data capacity, for example, as shown in input box data table TD100.

Here, data processor 600 accesses for example a server providing a web site (hereinafter also referred to as web server) to directly obtain the input box associated information from the web server. Data processor 600 may obtain the input box associated information from a program or the like based on ECMA (European Computer Manufacturer Association) Script as obtained from the web server, instead of directly obtaining the input box associated information from the web server.

Control unit 610 of data processor 600 uses the obtained input box associated information to generate for example input box data table TD100 of FIG. 9, and causes storage unit 620 to store input box data table TD100 as generated.

The input box associated information may be stored in advance in storage unit 620. Namely, storage unit 620 may store input box data table TD100 in advance. In this case, in data processor 600 displaying web page image G200 of FIG. 8 on display unit 630, storage unit 620 stores the data about the web site including web page image G200.

According to the description above, input box data table TD100 (see FIG. 9) is configured to have the item "input data capacity". Input box data table TD100 is not . limited to this configuration, and may have the item "number of characters" instead of the item "input data capacity".

Figure 11:
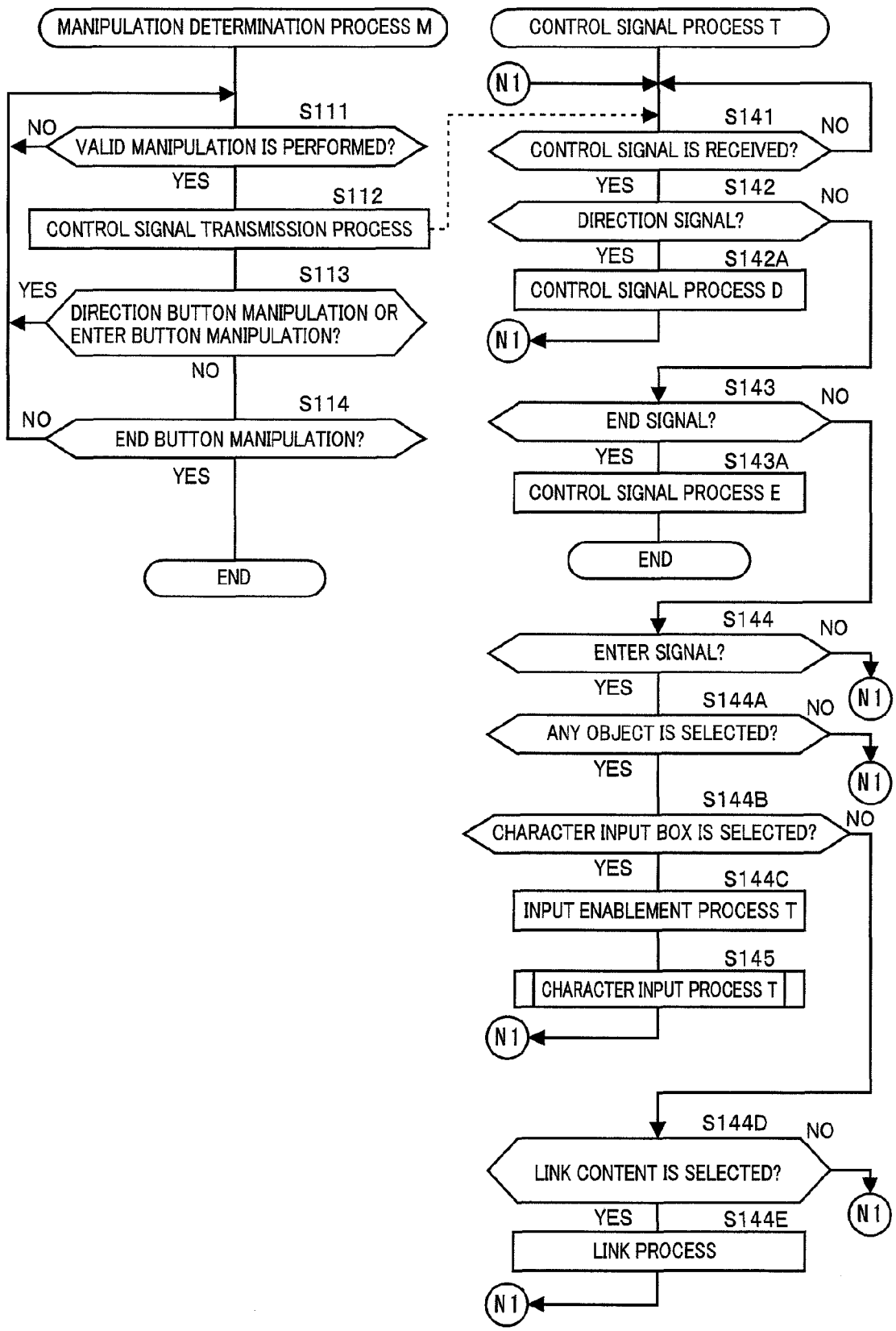
FIG. 11 is a flowchart for a manipulation determination process M and a control signal process T.

FIG. 11 is a flowchart for manipulation determination process M and control signal process T. Referring to FIG. 11, in manipulation determination process M, step S111 is performed first.

In step S111, control unit 510 determines whether or not valid manipulation is performed. Here, display unit 530 displays control image MG100A of FIG. 7. In this case, the valid manipulation refers here to the manipulation of pressing a button corresponding to any of direction button images 541AGA, 541BGA, 541CGA, 541DGA, enter button image 541EGA, and function button image 542AGA. If YES in step S111, the flow proceeds to step S112. If NO in step S111, step S111 is performed again. Here, it is determined that the valid manipulation is performed, and the flow proceeds to step S112. The valid manipulation performed here is the manipulation of pressing direction button 541B corresponding to direction button image 541BGA displayed in control image MG100A.

In step S112, a control signal transmission process is performed. In the control signal transmission process, control unit 510 uses communication unit 560 to transmit to data processor 600 an RC signal corresponding to the valid manipulation as performed and serving as a control signal. The RC signal transmitted by control unit 510 and serving as a control signal includes a device ID that is information for identifying a device. Here, the device ID of portable terminal 500 is "11MA".

The valid manipulation performed here is the manipulation of pressing direction button 541B corresponding to direction button image 541BGA displayed in control image MG100A. In this case, the RC signal transmitted to data processor 600 is the DOWN-RC signal including device ID "11MA".

Here, the device ID for identifying the above-described wireless keyboard 400 is "11KB". In this case, an RC signal transmitted from wireless keyboard 400 to data processor 600 includes device ID "11KB". The RC signal serving as a control signal is transmitted, and then step S112 is ended.

In data processor 600, control signal process T is performed. Control signal process T is, as descried above, a process performed independently of other processes. In control signal process T, step S141 is performed first.

In step S141, control unit 610 determines whether or not a control signal is received. If YES in step S141, the flow proceeds to step S142. If NO in step S141, step S141 is performed again. Here, control unit 610 receives the DOWN-RC signal serving as a control signal. In this case, the determination in step S141 is YES, and the flow proceeds to step S142.

In step S142, it is determined whether or not the received control signal is a direction signal. Specifically, control unit 610 determines whether or not the received RC signal serving as a control signal is any of the UP-RC signal, DOWN-RC signal, LEFT-RC signal, and RIGHT-RC signal. If YES in step S142, the flow proceeds to step S142A. If NO in step S142, the flow proceeds to step S143 as described later. Here, the received RC signal serving as a control signal is the DOWN-RC signal, and the flow proceeds to step S142A.

In step S142A, a control signal process D is performed. In control signal process D, control unit 610 performs a process for the received RC signal serving as a control signal. Here, display unit 630 displays web page image G200 of FIG. 8. Further, the received RC signal serving as a control signal is the DOWN-RC signal. In this case, control unit 610 uses VDP 632 to move selection box SL205 downward so that selection box SL205 displayed in web page image G200 is located at the position enclosing for example character input box IW222. In this case, character input box IW222 is a selected box. Then, step S141 is performed again.

As for manipulation determination process M, the flow proceeds to step S113 after step S112. In step S113, control unit 510 determines whether the performed valid manipulation is the direction button manipulation or enter button manipulation. Here, display unit 530 displays control image MG100A of FIG. 7. In this case, the direction button manipulation refers to the manipulation of pressing a button corresponding to any of direction button images 541AGA, 541BGA, 541CGA, 541DGA. The enter button manipulation will be described later.

If YES in step S113, step S111 is performed again. If NO in step S113, the flow proceeds to step S114 as described later. Here, the performed valid manipulation is the direction button manipulation of pressing direction button 541B corresponding to direction button image 541BGA displayed in control image MG100A. In this case, the determination in step S113 is YES, and step S111 is performed again.

Next, while control image MG100A of FIG. 7 is displayed on display unit 530, function button 542A corresponding to function button image 542AGA displayed in control image MG100A is pressed. In this case, the determination in step S111 is YES, and the flow proceeds to step S112.

Through the control signal transmission process in step S112, the END-RC signal serving as a control signal is transmitted to data processor 600.

Data processor 600 receives the END-RC signal serving as a control signal Then, the determination in step S141 is YES, and the flow proceeds to step S142. The determination in step S142 is NO, and the flow proceeds to step S143.

In step S143, it is determined whether or not the received control signal is an end signal. Specifically, control unit 610 determines whether or not the received RC signal serving as s control signal is the END-RC signal. If YES in step S143, the flow proceeds to step S143A. If NO in step S143, the flow proceeds to step S144 as described later. Here, the received RC signal serving as a control signal is the END-RC signal, and the flow proceeds to step S143A.

In step S143A, a control signal process E is performed. In control signal process E, control unit 610 ends the program having been executed. Here, the program having been executed by control unit 610 is a web browser program. In this case, control unit 610 clears web page image G200 displayed on display unit 630, and ends this control signal process T As for manipulation determination process M, the flow proceeds to step S113 after step S112. In step S113, the process to be performed is similar to the above-described one, and the detailed description thereof will not be repeated. Here, the performed valid manipulation is the manipulation of pressing function button 542A corresponding to function button image 542AGA displayed in control image MG100A. In this case, the determination in step S113 is NO, and the flow proceeds to step S114.

In step S114, control unit 510 determines whether or not the performed valid manipulation is the end button manipulation. The end button manipulation here refers to the manipulation of pressing function button 542A corresponding to function button image 542AGA while display unit 530 displays control image MG100A of FIG. 7. If YES in step S114, this manipulation determination process M is ended. If NO in step S114, step S111 is performed again. Here, the valid manipulation as performed is the end button manipulation, and this manipulation determination process M is ended.

Next, while display unit 530 displays control image MG100A of FIG. 7, enter button 541E corresponding to enter button image 541EGA displayed in control image MG100A is pressed. In this case, the determination in step S111 is YES, and the flow proceeds to step S112.

Through the control signal transmission process in step S112, the ENTER-RC signal serving as a control signal is transmitted to data processor 600. The transmitted ENTER-RC signal includes device ID "11MA" of portable terminal 500.

In data processor 600, the ENTER-RC signal serving as a control signal is received. The determination in step S141 is thus YES and the flow proceeds to step S142. Then, the determination in step S142 is NO, and the flow proceeds to step S143. The determination in step S143 is NO, and the flow proceeds to step S144.

In step S144, it is determined whether or not the received control signal is an enter signal. Specifically, control unit 610 determines whether or not the received RC signal serving as a control signal is the ENTER-RC signal. If YES in step S144, the flow proceeds to step S144A. If NO in step S144, step S141 is performed again. Here, the received RC signal serving as a control signal is the ENTER-RC signal, and the flow proceeds to step S144A.

In step S144A, control unit 610 determines whether or not there is a selected object. If YES in step S144A, the flow proceeds to step S144B. If NO in step S144A, step S141 is performed again. Here, display unit 630 displays, in web page image G200 of FIG. 8, a web page image where selection box SL205 is located to enclose character input box IW224. Namely, character input box IW224 is selected. In other words, character input box IW224 is a selected character input box. In this case, the determination in step S144A is YES, and the flow proceeds to step S144B.

In step S144B, control unit 610 determines whether or not a character input box is selected. If YES in step S144B, the flow proceeds to step S144C. If NO in step S144B, the flow proceeds to step S144D as described later. Here, the character input box is selected, and the flow proceeds to step S144C.

In step S144C, an input enablement process T is performed. In input enablement process T, control unit 610 sets a selected character input box in a state where a character can be input to the character input box (hereinafter also referred to input enabled state). The flow then proceeds to step S145.

In step S145, a character input process T is performed. Details of character input process T will be given later.

If NO in step S144B, the flow proceeds to step S144D. In step S144D, control unit 610 determines whether or not a link content as described above is selected. If YES in step S144D, the flow proceeds to step S144E. If NO in step S144D, step S141 is performed again.

In step S144E, a link process is performed. In the link process, control unit 610 performs a process based on a link content. In the case where the link content is a character string liked to another web page, for example, control unit 610 performs a process for displaying the other web page on display unit 630. Then, step S141 is performed again.

As for manipulation determination process M, the flow proceeds to step S113 after step S112. In step S113, the process to be performed is similar to the above-described one, and the detailed description thereof will not be repeated. Here, the enter button manipulation refers to the manipulation of pressing enter button 541E corresponding to enter button image 541EGA displayed in control image MG100A while display unit 530 displays control image MG100A of FIG. 7. The valid manipulation performed as determined in step S111 is the enter button manipulation. In this case, the determination in step S113 is YES, and step S111 is performed again.

Character input process T will now be described. Character input process T is a process performed when a character input box displayed on display unit 630 is in the input enabled state. The input enabled character input box is an input box that is set in the input enabled state. At portable terminal 500, a character input process M as described below is performed independently of other processes.

Figure 12:
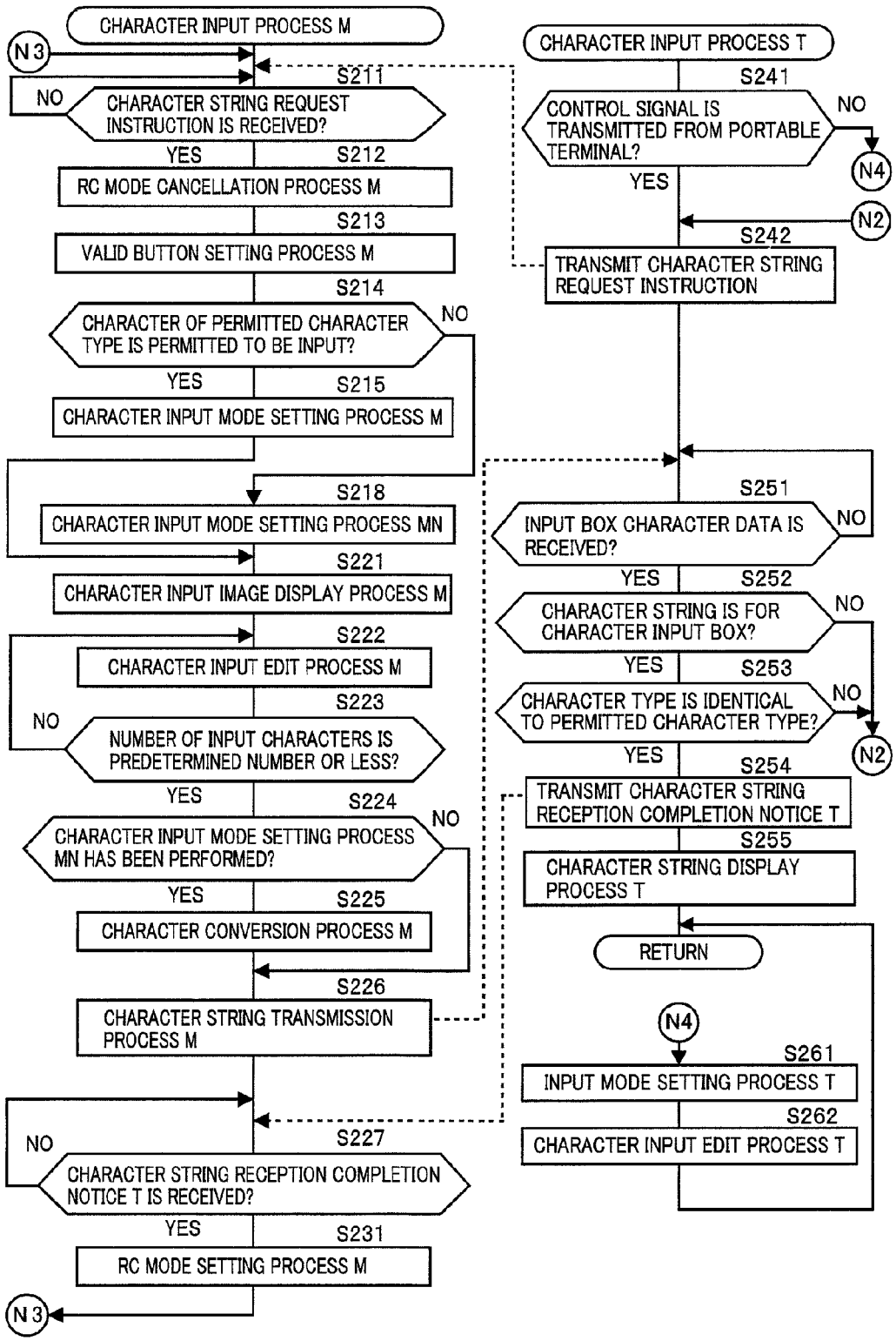
FIG. 12 is a flowchart for a character input process M and a character input process T.

FIG. 12 is a flowchart for character input process M and character input process T. Referring to FIG. 12, in character input process T, step S241 is performed first.

In step S241, it is determined whether or not the received control signal is transmitted from a portable terminal. Specifically, control unit 610 determines whether or not the device ID included in the received RC signal serving as a control signal is the device ID of a portable terminal.

If YES in step S241, the flow proceeds to step S242. If NO in step S241, the flow proceeds to step S261 as described later. Here, the device ID of portable terminal 500 is "11MA". It is supposed that control unit 610 receives the ENTER-RC signal serving as a control signal and including device ID "11MA". In this case, the determination in step S241 is YES, and the flow proceeds to step S242.

In step S242, control unit 610 uses communication unit 660 to transmit to portable terminal 500 character string request data serving as a character string request instruction that is an instruction for requesting a character string. The character string request data as transmitted includes the device ID of the transmitter device itself, and input box data. It is supposed here that the device ID of the transmitter device (data processor 600) is "11TA". The input box data is the data showing information about the input enabled character input box. The input box data shows the input box ID identifying the input enabled character input box, and input box associated information associated with the input box ID in an input box data table. The character string request data serving as a character string request instruction is transmitted, and then step S242 is ended.

In the case where the determination in step S252 or step S253 of FIG. 12 as described later is NO and step S242 is performed again, control unit 610 transmits in step S242 the character string request data including an error message in addition to the device ID of the transmitter device and the input box data, to portable terminal 500. The error message is for example as follows. "Error occurred. Please perform manipulation again."

It is supposed here that display unit 630 displays web page image G200 of FIG. 8 where selection box SL205 is located to enclose character input box IW224, and character input box IW224 is in the input enabled state. It is also supposed that the input box data table used in step S242 is input box data table TD100 of FIG. 9. In this case, the input box data included in the character string request data is input box data TD200 as described below.

FIG. 13 shows exemplary input box data TD200. Referring to FIG. 13, input box data TD200 shows input box ID "TX04" identifying character input box IW224 in the input enabled state. Input box data TD200 also shows the permitted character type and the input data capacity associated with input box ID "TX04" in input box data table TD100 of FIG. 9.

Here, it is seen from the permitted character type shown in input box data TD200 and label description table T110 of FIG. 10 that hiragana is permitted to be input to input enabled character input box IW224. Namely, the permitted character type shown in input box data TD200 is the type of characters permitted to be input to input enabled character input box IW224.

Referring again to FIG. 12, in character input process M, step S211 is performed first.

In step S211, control unit 510 determines whether or not character string request data serving as a character string request instruction is received. If YES in step S211, the flow proceeds to step S212. If NO in step S211, step S211 is performed again. Here, the character string request data serving as a character string request instruction is received, and the flow proceeds to step S212.

In the case where the received character string request data includes an error message, control unit 510 causes display unit 530 to display the error message for a predetermined time (two seconds for example). The flow then proceeds to step S212.

In step S212, an RC mode cancellation process M is performed. In RC mode cancellation process M, control unit 510 changes the operation mode of portable terminal 500 from the RC mode to the normal mode. Since the operation mode of portable terminal 500 is set to the normal mode, the control signal will not be transmitted to data processor 600 even if step S112 in manipulation determination process M of FIG. 11 that is performed independently of character input process M is carried out.

Further, control unit 510 sets direction buttons 541A, 541B, 541C, 541D and enter button 541E of portable terminal 500 in the normal mode to respective states of the buttons for input of characters or edit of characters as described later. The flow then proceeds to step S213.

In step S213, a valid button setting process M is performed. Here, a valid button is a button pressed to cause a corresponding process to be performed. In valid button setting process M, control unit 510 sets a button that is used for input of a character and is now invalid (hereinafter also referred to as character input invalid button) to a valid button. Here, character input invalid buttons are character buttons AB, CLB, CB, 1B, 2B, 3B, 4B, 5B, 6B, 7B, 8B, 9B, KB, 0B, #B included in character button group 546. In this case, control unit 510 sets character buttons AB, CLB, CB, 1B, 2B, 3B, 4B, 5B, 6B, 7B, 8B, 9B, KB, 0B, #B to valid buttons. In the following, a character button that is set to a valid button is also referred to as valid character button. Then, the flow proceeds to S214.

In step S214, it is determined whether or not input of a character of the permitted character type is permitted. Specifically, control unit 510 determines whether or not the permitted character type shown in the input box data included in the received character string request data is input permitted character type M. Here, input permitted character type M is the type of characters for which input is permitted at portable terminal 500. It is supposed here that input permitted character type M includes, for example, kanji, hiragana, full width katakana, half width alphabet uppercase, half width alphabet lowercase, and half width numeral. In other words, at portable terminal 500, input of half width katakana, full width alphabet uppercase, full width alphabet lowercase, and full width numeral for example is not permitted. In the following, the type of characters for which input is not permitted at portable terminal 500 is also referred to as input inhibited character type M. Namely, half width katakana, full width alphabet uppercase, full width alphabet lowercase, and full width numeral are of input inhibited character type M.

If YES in step S214, the flow proceeds to step S215. If NO in step S214, the flow proceeds to step S218 as described later. Here, the input box data included in the received character string request data is input box data TD200 of FIG. 13. In this case, the input permitted character type shown in input box data TD200 included in the character string request data is hiragana, which is input permitted character type M. Therefore, the determination in step S214 is YES and the flow proceeds to step S215.

In step S215, a character input mode setting process M is performed. In character input mode setting process M, control unit 510 sets the type of a character to be input by pressing of a valid character button, to the permitted character type shown in the input box data included in the received character string request data. By this setting, the character input mode is set to an appropriate mode. Here, the permitted character type shown in the input box data included in the received character string request data is hiragana. In this case, the type of a character to be input by pressing of a valid character button (such as character buttons 1B, 2B) is set to hiragana.

In the following, a character input mode in which the type of a character to be input by pressing of a valid character button is set to kanji or hiragana is also referred to as kanji-hiragana input mode.

It should be noted that, in the case where the type of a character to be input by pressing of a valid character button is set to kanji, the character that is input first by pressing of the valid character button is a hiragana letter. Then, while a character string constituted of a plurality of hiragana letters is input, manipulation is performed for conversion to kanji (hereinafter also referred to as conversion to kanji manipulation), so that the whole or a part of the input character string is converted to kanji. The conversion to kanji manipulation is, for example, pressing of direction button 541B. In the case where the conversion to kanji manipulation is performed while one hiragana letter is input, the hiragana letter is converted to kanji.

Further, a character input mode in which the type of a character to be input by pressing of a valid character button is set to full width katakana is also referred to as katakana input mode. A character input mode in which the type of a character to be input by pressing of a valid character button is set to one of half width alphabet uppercase and half width alphabet lowercase is also referred to as alphabet input mode. A character input mode in which the type of a character to be input by pressing of a valid character button is set to half width numeral is also referred to as numeral input mode. Then, the flow proceeds to step S221.

In step S221, a character input image display process M is performed. In character input image display process M, control unit 510 uses VDP 532 to generate a character input image and causes display unit 530 to display the generated character input image. It is supposed here that the generated character input image is a character input image MG300 as follows where a character string "あ…" is not displayed (hereinafter also referred to as character input image N). Then, step S221 is ended.

Figure 14:
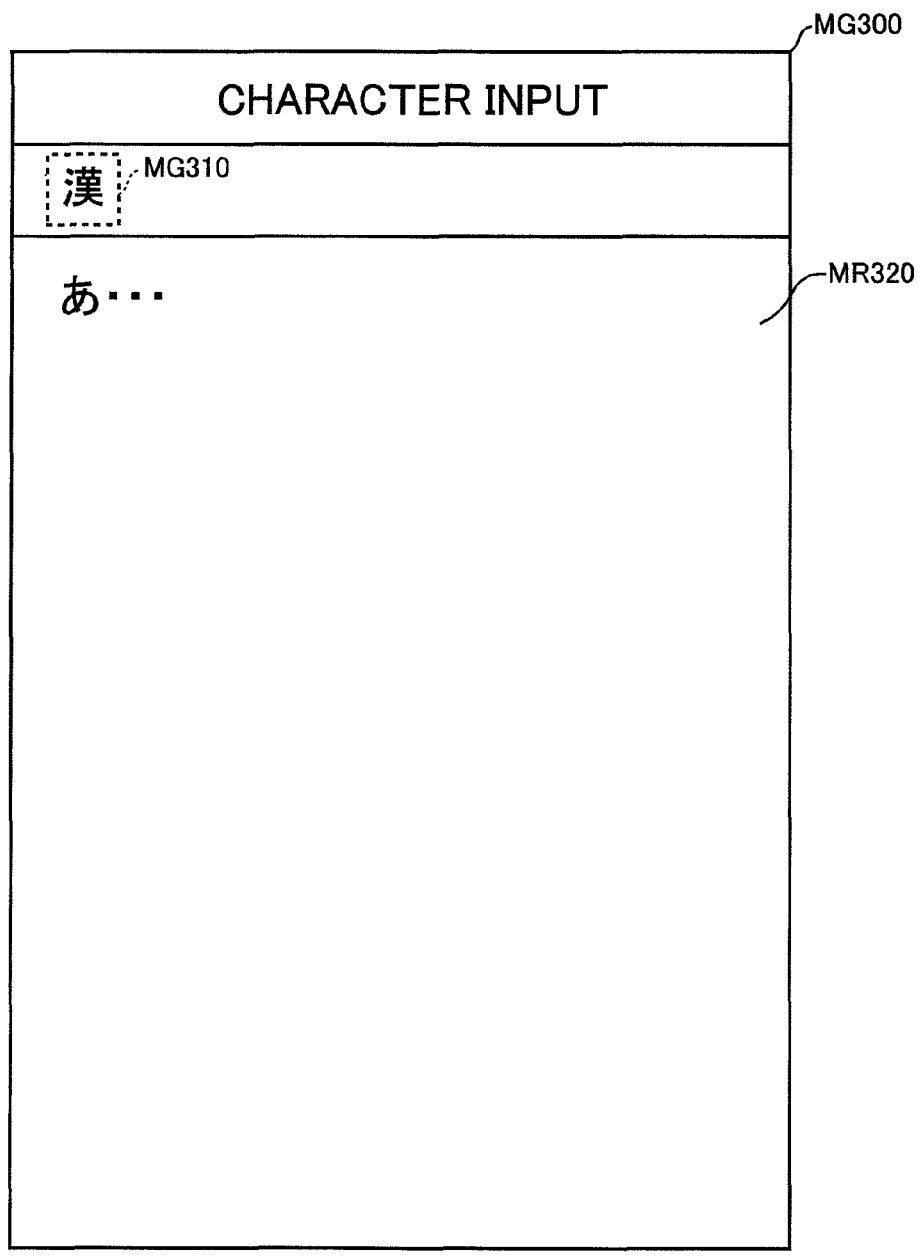
FIG. 14 shows an exemplary character input image.

FIG. 14 shows an exemplary character input image MG300. Referring to FIG. 14, a mode character MG310 is displayed in character input image MG300. The mode character is a character for indicating the character input mode being set.

In the case where the set character input mode is the kanji-hiragana input mode, "漢" representing kanji as indicated by mode character MG310 is shown in a character input image (character input image MG300 for example). In the case where the set character input mode is the katakana input mode, a katakana letter "ア" is displayed in the character input image. In the case where the set character input mode is the alphabet input mode, an alphabet letter "A" is displayed in the character input image. In the case where the set character input mode is the numeral input mode, a numeral "1" is displayed in the character input image.

In character input image MG300, a character input region MR320 is also arranged. In character input image MG300, a character that is input by pressing of a valid character button is displayed. The character string "あ…" shown in character input region MR320 of character input image MG300 is an example of the character string that is input and displayed.

Referring again to FIG. 12, the flow proceeds to step S222 after step S221. In step S222, a character input edit process M is performed. In character input edit process M, control unit 510 performs a process in response to user's pressing of a valid character button if any for displaying the character corresponding to the pressed valid character button in character input region MR320.

Specifically, when a valid character button is pressed, control unit 510 performs a process for displaying in character input region MR320 the character that is of the type corresponding to the set character input mode and corresponds to the pressed valid character button.

For example, when the character input mode is the kanji-hiragana input mode and character button 1B of FIG. 3 is pressed as a valid character button, control unit 510 performs a process for displaying a hiragana letter "あ" in character input region MR320.

In the case where the same valid character button is pressed multiple times successively, control unit 510 performs a process for displaying the character corresponding to the pressed valid character button and corresponding to the number of times the button is pressed. For example, in the case where the character input mode is the kanji-hiragana input mode and character button 1B of FIG. 3 that is a valid character button is pressed multiple times successively, control unit 510 causes hiragana letters "あ", "い", "う", "え", "お" to be displayed in turn in character input region MR320 each time character button 1B is pressed.

In the case where a character string constituted of a plurality of hiragana letters is displayed in character input region MR320 and the above-described conversion to kanji manipulation is performed, control unit 510 performs a process for displaying in character input region MR320 the character string that is entirely or partially converted to kanji.

Further, in the case for example where the character input mode is the alphabet input mode and character button 2B of FIG. 3 that is a valid character button is pressed multiple times successively, control unit 510 causes alphabet letters "A", "B", "C" to be displayed in turn in character input region MR320 each time character button 2B is pressed.

In the case where a character or characters are displayed in character input region MR320 and character button CLB that is a valid character button is pressed, control unit 510 clears the character that is displayed last in character input region MR320.

In the case where a plurality of characters are displayed in character input region MR320 and direction buttons 541C, 541D are pressed, a character to be edited can be changed.

Further, in character input edit process M, a character string confirmation process is performed independently of other processes. In the character string confirmation process, control unit 510 determines whether or not character confirmation manipulation is performed. The character confirmation manipulation is the manipulation of pressing enter button 541E twice successively, for example, while a character or characters are displayed in character input region MR320. When the character confirmation manipulation is performed, control unit 510 ends character input edit process M. In the following, a character string displayed in character input region MR320 at the time when the character confirmation manipulation is performed is also referred to as confirmed character string. Then, the flow proceeds to step S223.

In step S223, it is determined whether or not the number of input characters is equal to or less than a predetermined number. Specifically, control unit 510 determines whether or not the total data size of the confirmed character string is equal to or less than the input data capacity shown in the input box data included in the received character string request data. If YES in step S223, the flow proceeds to step S224. If NO in step S223, control unit 510 causes display unit 530 to display an error message for a predetermined time, and step S222 is performed again. The error message is for example as follows. "The number of input characters exceeds the number of characters that can be input to the selected character input box". The predetermined time is, for example, three seconds.

It is supposed here that the confirmed character string is "たろう" (hiragana letters). In this case, the total data size of the confirmed character string "たろう" is 6 bytes. Here, the input box data included in the received character string request data is input box data TD200. In this case, the determination in step S223 is YES, and the flow proceeds to step S224.

In step S224, control unit 510 determines whether or not a character input mode setting process MN as described later has been performed. Namely, it is determined whether or not character input mode setting process MN has been performed in response to the fact that the permitted character type shown in the input box data included in the received character string request data is not input permitted character type M but input inhibited character type M. If YES in step S224, the flow proceeds to step S225 as described later. If NO in step S224, the flow proceeds to step S226. Here, character input mode setting process MN has not been performed, and the flow proceeds to step S226.

In step S226, a character string transmission process M is performed. In character string transmission process M, control unit 510 uses communication unit 560 to transmit input box character data to the device identified by the device ID included in the received character string request data. Here, the input box character data is the data showing a character string to be input to the input enabled character input box as identified by the input box ID shown in the input box data included in the received character string request data.

Here, the input box character data to be transmitted is the data showing the input box ID indicated in the input box data included in the received character string request data, the confirmed character string and the data size of the confirmed character string.

Here, the input box data included in the received character string request data is input box data TD200 of FIG. 13. The confirmed character string is "たろう". The device ID included in the character string request data is "11TA". In this case, the input box character data is input box character data MD300 as follows. Input box character data MD300 is transmitted to data processor 600 identified by device ID "11TA". Then, step S226 is ended.

FIG. 15 shows exemplary input box character data MD300. Referring to FIG. 15, in input box character data MD300, "input character string" refers to characters to be input to the input enabled character box identified by the input box ID. "Input character string" is the above-described confirmed character string. "Data size" refers to the data size of "input character string".

Referring again to FIG. 12, in character input process T, the flow proceeds to step S251 after step S242.

In step S251, control unit 610 determines whether or not the input box character data is received. If YES in step S251, the flow proceeds to step S252. If NO in step S251, step S251 is performed again. Here, input box character data MD300 of FIG. 15 is received, and the flow proceeds to step S252.

It is preferable that a process as described below is performed in step S251. First, data processor 600 determines whether portable terminal 500 to which the character string request data serving as a character string request instruction is transmitted and portable terminal 500 having performed character string transmission process M are the same terminal. When data processor 600 determines that these portable terminals 500 are not the same terminal, data processor 600 determines that the input box character data is not received NO in step S251), and the process returns to step S251. Thus, in the case where a plurality of portable terminals 500 are connected to data processor 600, data processor 600 can perform exclusive control. It is preferable that a similar process is also performed in step S251 of FIGS. 20 and 27, step S251C of FIG. 31 and step S251D of FIG. 40 as described later.

In step S252, it is determined whether or not the input character string shown in the received input box character data is a character string to be input to the input enabled character input box. Specifically, control unit 610 determines whether or not the input box ID shown in the received input box character data is the same as the input box ID shown in the input box data included in the character string request data transmitted to portable terminal 500. If YES in step S252, the flow proceeds to step S253. If NO in step S252, step S242 is performed again.

Here, the received input box character data is input box character data MD300. The input box data included in the character string request data transmitted to portable terminal 500 is input box data TD200 of FIG. 13. In this case, the determination in step S252 is YES, and the flow proceeds to step S253.

In step S253, control unit 610 determines whether or not the character type of the input character string shown in the received input box character data is identical to the permitted character type shown in the input box data included in the character string request data transmitted to portable terminal 500. EYES in step S253, the flow proceeds to step S254. If NO in step S253, step S242 is performed again.

Here, the received input box character data is input box character data MD300. The character type of the input character string shown in input box character data MD300 is hiragana. Further, the input box data included in the character string request data transmitted to portable terminal 500 is input box data TD200 of FIG. 13. In this case, the determination in step S253 is YES and the flow proceeds to step S254.

The determination in step S253 is NO in such a case for example where the permitted character type for the input enabled character input box is hiragana for example, and a user inputs hiragana letters to portable terminal 500 and then erroneously converts some or all of the hiragana letters into kanji and transmits the converted characters to data processor 600.

In step S254, control unit 610 transmits a character string reception completion notice T to portable terminal 500. Here, character string reception completion notice T is a notice that reception of the character string to be input to the input enabled character input box is completed. Then, step S254 is ended.

In character input process M, the flow proceeds to step S227 after step S226. In step S227, control unit 510 determines whether or not character string reception completion notice T is received. If YES in step S227, the flow proceeds to step S231. If NO in step S227, step S227 is performed again. Here, character string reception completion notice T is received and the flow proceeds to step S231.

In step S231, an RC mode setting process M is performed. In RC mode setting process M, control unit 510 changes the operation mode of portable terminal 500 from the normal mode to the RC mode. Then, control unit 510 uses VDP 532 to cause display unit 530 to display control image MG100A of FIG. 7, instead of the image currently displayed on display unit 530 (character input image MG300 of FIG. 14 for example). Then, step S211 is performed again.

In character input process T, the flow proceeds to step S255 after step S254. In step S255, a character string display process T is performed. In character string display process T, control unit 610 uses VDP 632 to cause the input character string shown in the received input box character data to be displayed in the input enabled character input box. Further, control unit 610 causes storage unit 620 to store the input character string shown in the received input box character data, in association with the input enabled character input box.

Here, display unit 630 displays web page image G200 of FIG. 8 where selection box SL205 is located to enclose character input box IW224. Namely, the input enabled character input box is character input box IW224. Further, the received input box character data is input box character data MD300.

In this case, character string display process T is performed to display the character string "たろう" in character input box IW224. Namely, characters are input to the input enabled character input box. Further, storage unit 620 stores the character string "たろう" in association with input box ID "TX04" for identifying character input box IW224.

Then, this character input process T is ended to return to control signal process T of FIG. 11, and step S141 is performed again.

A description will now be given of a process performed when the determination in S214 of FIG. 12 is NO, namely the permitted character type shown in the input box data included in the received character string request data is not above-described input permitted character type M but input inhibited character type M. Here, storage unit 520 stores in advance an inhibited character type adapted data table. The inhibited character type adapted data table is a data table showing an input permitted character type M corresponding to input inhibited character type M.

Here, in the case where input inhibited character type M includes half width katakana, full width alphabet uppercase, full width alphabet lowercase, and full width numeral, the inhibited character type adapted data table stored in storage unit 520 is an inhibited character type adapted data table MD400 as follows.

FIG. 16 shows an exemplary inhibited character type adapted data table MD400. Referring to FIG. 16, in inhibited character type adapted data table MD400, "inhibited character type" refers to above-described input inhibited character type M. "Corresponding character type" refers to input permitted character type M corresponding to "inhibited character type".

In the case for example where the permitted character type shown in the input box data included in the received character string request data is half width katakana, inhibited character type adapted data table MD400 shows that input permitted character type M corresponding to the half width katakana is full width katakana.

Referring again to FIG. 12, when the determination in S214 is NO, the flow proceeds to step S218. In step S218, a character input mode setting process MN is performed. In character input mode setting process MN, control unit 510 uses the inhibited character type adapted data table to set the type of a character to be input by pressing of a valid character button to input permitted character type M corresponding to the permitted character type shown in the input box data included in the received character string request data.

Here, the inhibited character type adapted data table is inhibited character type adapted data table MD400 of FIG. 16. Further, it is supposed that the permitted character type shown in the input box data included in the received character string request data is, for example, full width numeral. In inhibited character type adapted data table MD400, input permitted character type M corresponding to full width numeral that is input inhibited character type M is half width numeral. In this case, the type of a character to be input by pressing of a valid character button is set to half width numeral. In this case, the character input mode of portable terminal 500 is the numeral input mode. Then, the flow proceeds to step S221.

It is supposed that steps S221, S222 and S223 are performed in a similar manner to the above-described one. The determination in step S223 is YES, and the flow proceeds to step S224.

In step S224, control unit 510 determines whether or not character input mode setting process MN has been performed in response to the fact that the permitted character type shown in the input box data included in the received character string request data is not input permitted character type M but input inhibited character type M as described above. Since character input mode setting process MN has been performed, the flow proceeds to step S225.

In step S225, a character conversion process M is performed. In character conversion process M, control unit 510 converts a character (confirmed character string) of input inhibited character type M that is input in the character input mode set by character input mode setting process MN, into a character of the permitted character type shown in the input box data included in the received character string request data.

Here, the character input mode set by character input mode setting process MN is the numeral input mode. Further, it is supposed that the confirmed character string as input is, for example, half width numerals "123". The permitted character type shown in the input box data included in the received character string request data is full width numeral. In this case, character conversion process M converts half width numerals "123" of the confirmed character string into full width numerals "123" as the confirmed character string.

Then, the process from step S226 of FIG. 12 and the process from step S251 of FIG. 12 are performed so that full width numerals "123" is displayed in the input enabled character input box.

Steps S218 and S225 as described above are performed so that a character of the type permitted to be input to the input enabled character input box can be input, even if the permitted character type shown in the input box data included in the received character string request data is not input permitted character type M as described above but input inhibited character type M.

In other words, the effect is achieved that a character of the type permitted to be input to an input enabled character input box can be input even when such a character cannot be directly input by means of portable terminal 500.

A description will now be given of a process performed in the case where the determination in step S241 of FIG. 12 is NO. It is supposed here that the determination in step S241 is NO because data processor 600 receives from wireless keyboard 400 the RC signal serving as a control signal and including device ID "11KB". When the determination in step S241 is NO, the flow proceeds to step S261.

In step S261, an input mode setting process T is performed. In input mode setting process T, control unit 610 sets data processor 600 to a keyboard input mode. The keyboard input mode is a mode in which a character shown in character data received from wireless keyboard 400 is input to the input enabled character input box. The flow then proceeds to step S262.

In step S262, a character input edit process T is performed. In character input edit process T, control unit 610 uses VDP 632 to cause, each time character data is received in response to user's manipulation of wireless keyboard 400, a character shown in the received character data to be displayed in the input enabled character input box.

Further, in character input edit process T, a character string confirmation process T is performed independently of other processes. In character input edit process T, control unit 610 determines whether or not character confirmation manipulation T is performed. Character confirmation manipulation T is the manipulation of pressing "enter key" of wireless keyboard 400, for example, while a character is displayed in the input enabled character input box. When character confirmation manipulation T is performed, control unit 510 ends character input edit process T. Character input process T is thus ended, and the flow returns to control signal process T of FIG. 11 where step S141 is performed again.

According to the present embodiment as heretofore described, when a character input box displayed on display unit 630 of data processor 600 is set to the input enabled state, the type of characters permitted to be input to this character input box (permitted character type) is transmitted to portable terminal 500.

At portable terminal 500, in the case where input of characters of the permitted character type as received is permitted, the type of a character to be input by pressing of a valid character button is set to the permitted character type. Then, a character of the permitted character type as set and input by pressing of the valid character button is transmitted to data processor 600.

Therefore, a user can input characters to portable terminal 500 without being conscious of the character input mode. Accordingly, the effect is achieved that a character of the type permitted to be input to an input enabled character input box can be easily input.

Further, in the case where input of a character of a permitted character type received by portable terminal 500 is not permitted at portable terminal 500, namely the permitted character type is not input permitted character type M but input inhibited character type M, the type of a character to be input by pressing of a valid character button is set to input permitted character type M corresponding to the permitted character type. Then, a character of input permitted character type M as set that is input by pressing of the valid character button is converted to a character of the permitted character type as received (input inhibited character type M). Then, the character of the permitted character type (input inhibited character type M) as converted is transmitted to data processor 600.

Therefore, the effect is achieved that a character of the type permitted to be input to an input enabled character input box can be input even when such a character cannot be directly input by means of portable terminal 500.

Further, according to the present embodiment, when a character input box displayed on display unit 630 of data processor 600 is set to the input enabled state, the input box ID for identifying the character input box is transmitted to portable terminal 500. Portable terminal 500 transmits an input character and the received input box ID to data processor 600.

Thus, the effect is achieved as follows. Data processor 600 determines whether or not the transmitted input box ID and the received input box ID are identical to each other, so that a received character is prevented from being input to a character input box to which the received character should to be input.

Second Embodiment

A process will now be described in which portable terminal 500 uses a character string that has been input once.

A network system of the present embodiment is similar to network system 1000 of the first embodiment, and the detailed description thereof will not be repeated. Portable terminal 500 and data processor 600 are configured similarly to those described in connection with the first embodiment, and the detailed description thereof will not be repeated.

In the present embodiment, while portable terminal 500 is in the RC mode, manipulation determination process M is performed at portable terminal 500. Manipulation determination process M is performed independently of other processes. Further, in the present embodiment, a control signal process TA as described below is performed at data processor 600 independently of other processes.

It is supposed here that display unit 530 of portable terminal 500 displays control image MG100A of FIG. 7. Namely, the state of portable terminal 500 is State MA. It is further supposed that, in State MA, buttons such as direction buttons 541A, 541B, 541C, 541D and enter button 541E are manipulated so that display unit 630 of data processor 600 displays web page image G200 of FIG. 8.

Here, control unit 610 allocates an input box ID to a character input box for identifying the character input box. The input box ID is associated with various types of information. In the following, a data table showing information associated with the input box ID is also referred to as input box data table. Here, a plurality of character input boxes shown in web page image G200 are each associated with the information shown in an input box data table TD100A as follows.

FIG. 17 shows an exemplary input box data table TD100A. Referring to FIG. 17, items "input box ID", "permitted character type" and "input data capacity" in input box data table TD100A are similar to items "input box ID", "permitted character type" and "input data capacity" respectively of input box data table TD100 of FIG. 9, and the detailed description thereof will not be repeated.

In input box data table TD100A, "character string type" refers to the type (category) of a character string requested to be input to the character input box identified by the associated input box ID. Under the item "character string type", a label represented in alphabet is shown. The label shown under the item "character string type" will be described with reference to a label description table T110A as follows.

FIG. 18 shows an exemplary label description table T110A. Referring to FIG. 18, "description" in label description table T110A refers to a description of the associated label. For example, label "NAME-SEI" means family name (surname) represented in kanji. In this case, the type of a character string requested to be input to the character input box identified by the input box ID associated with label "NAME-SEI" under the item "character string type" of input box data table TD100A of FIG. 17 is a family name (surname) represented in kanji.

Label "BIRTHDAY-Y" for example in label description table T110A means the year of birth. In this case, the type of a character string requested to be input to the character input box identified by the input box ED associated with label "BIRTHDAY-Y" under the item "character string type" of input box data table TD100A is the year of birth. Further, label "BIRTHDAY-M" for example in label description table T110A means the month of birth. In this case, the type of a character string requested to be input to the character input box identified by the input box ID associated with label "BIRTHDAY-M" under the item "character string type" of input box data table TD100A is the month of birth.

In the column for "description", regarding an element using a plurality of labels, such as the date of birth, postal code and phone number, a plurality of labels for one element may be regarded as one unit to be treated. For example, regarding the date of birth, labels "BIRTHDAY-Y", "BIRTHDAY-M" and "BIRTHDAY-D" may be regarded as one unit to be treated.

The information about the character string type shown in input box data table TD100A is also the input box associated information as described above.

Here, control unit 610 of data processor 600 obtains the input box associated information, uses the obtained input box associated information to generate an input box data table, and causes storage unit 620 to store the generated input box data table, in a similar manner to the one described in connection with the first embodiment. In the case where display unit 630 displays web page image G200 of FIG. 8, the generated input box data table is input box data table TD100A of FIG. 17. In this case, storage unit 620 stores input box data table TD100A.

Figure 19:
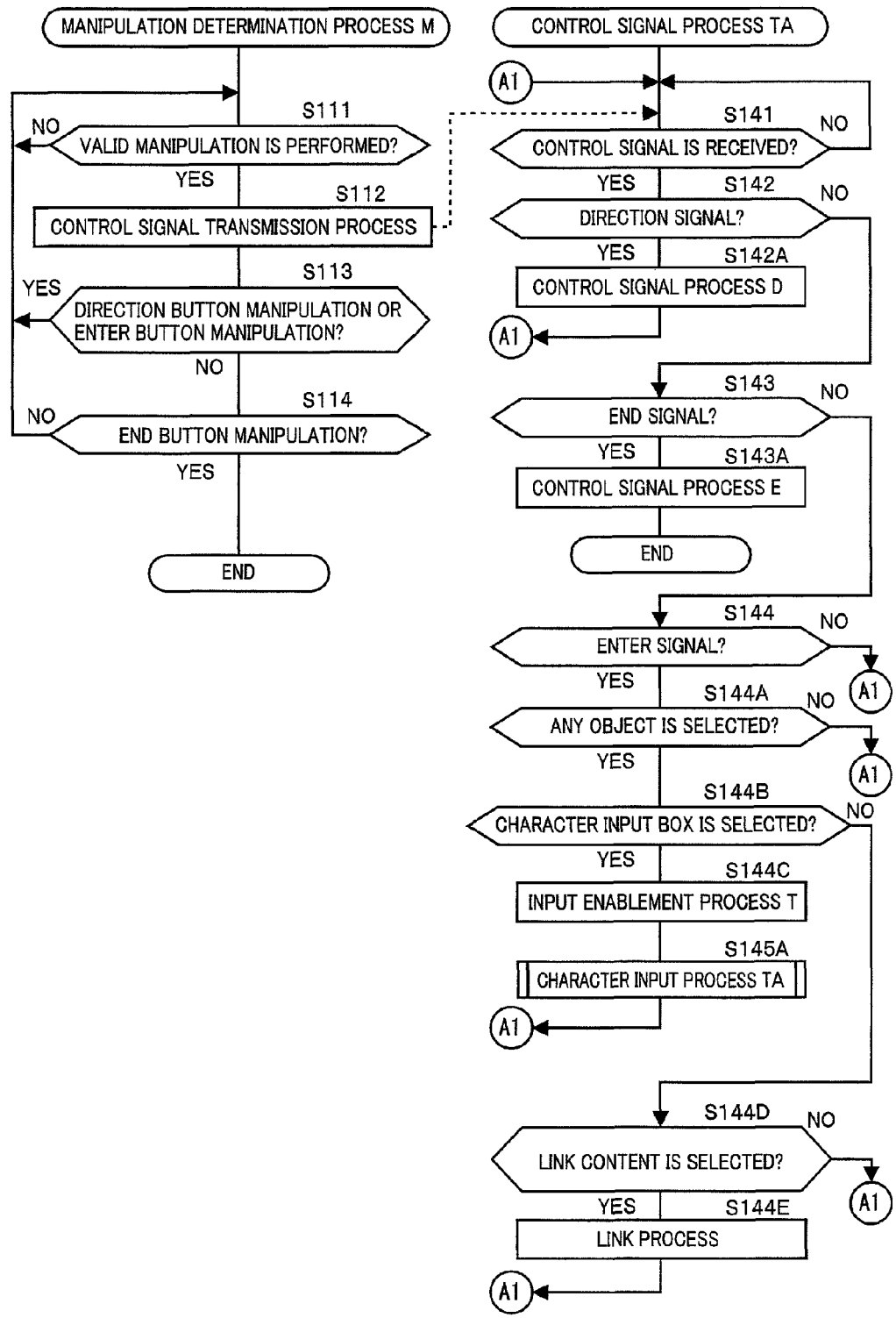
FIG. 19 is a flowchart for a manipulation determination process M and a control signal process TA.

FIG. 19 is a flowchart for a manipulation determination process M and a control signal process TA. In FIG. 19, the process performed in a step of the same step number as that of FIG. 11 is similar to the one described in connection with FIG. 11, and the detailed description thereof will not be repeated. In the following, processes different from those of FIG. 11 will mainly be described.

Referring to FIG. 19, manipulation determination process M is similar to manipulation determination process M of FIG. 11 described in connection with the first embodiment, and the detailed description thereof will not be repeated. Control signal process TA differs from control signal process T of FIG. 11 in that step S145A is performed instead of step S145. Control signal process TA is similar to control signal process T in other respects, and the detailed description thereof will not be repeated.

It is supposed here that the ENTER-RC signal serving as a control signal and including device ID "11MA" is transmitted from portable terminal 500 to data processor 600. It is further supposed that display unit 630 of data processor 600 displays web page image G200 of FIG. 8 where selection box SL205 is located to enclose character input box IW224. Namely, character input box IW224 is selected.

In this case, the determination in step S144B of control signal process TA is YES, and the flow proceeds to step S144C.

In step S144C, a process similar to that described in connection with the first embodiment is performed, and the detailed description thereof will not be repeated. The flow then proceeds to step S145A.

In step S145A, a character input process TA is performed. Character input process TA is a process performed in the case where a character input box displayed on display unit 630 is in the input enabled state. The character input box in the input enabled state refers to an input box set to the input enabled state. At portable terminal 500, a character input process MA is performed independently of other processes as follows.

Figure 20:
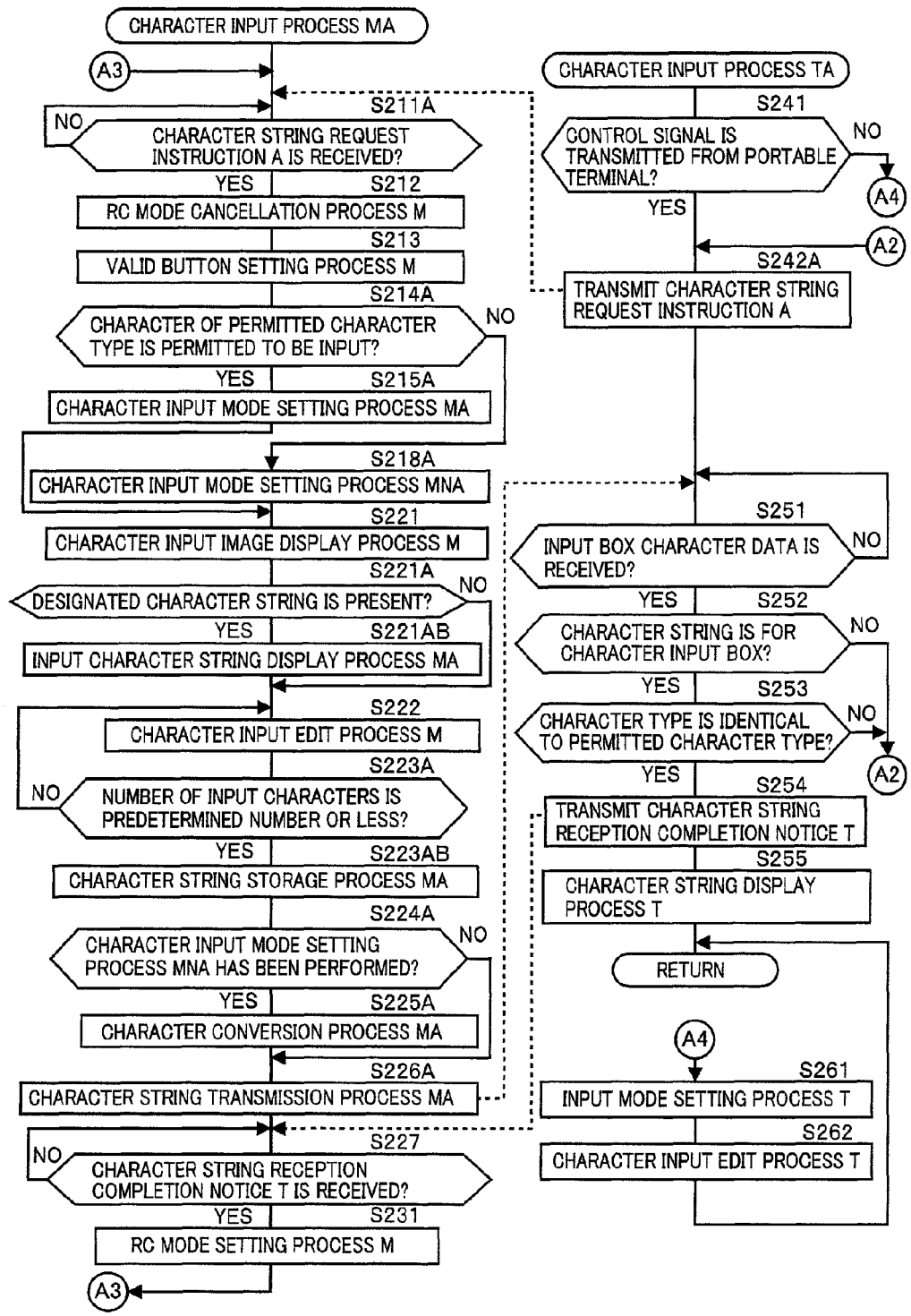
FIG. 20 is a flowchart for a character input process MA and a character input process TA.

FIG. 20 is a flowchart for character input process MA and character input process TA. In FIG. 20, the process in a step of the same step number as that of FIG. 12 is similar to the one described in connection with FIG. 12, and the detailed description thereof will not be repeated. In the following, processes different from those of FIG. 12 will mainly be described.

In step S241, a process similar to that described in connection with the first embodiment is performed, and the detailed description thereof will not be repeated. When the determination in step S241 is YES, the flow proceeds to step S242A. When the determination in step S241 is NO, the flow proceeds to step S261.

In step S242A, control unit 610 uses communication unit 660 to transmit to portable terminal 500 character string request data A serving as a character string request instruction A that is an instruction for requesting a character string. Character string request data A as transmitted includes device ID "11TA" of the transmitter device itself and input box data A. Input box data A shows the input box ID identifying the input enabled character input box and the input box associated information associated with the input box ID in the input box data table. Character string request data A serving as character string request instruction A is transmitted, and step S242A is ended.

In the case where the determination in step S252 or step S253 of FIG. 20 as described later is NO and step S242A is performed again, control unit 610 transmits in step S242A character string request data A including an error message in addition to the device ID of the transmitter device and input box data A. The error message is for example as follows. "Error occurred. Please perform manipulation again."

Here, display unit 630 displays web page image G200 of FIG. 8 where selection box SL205 is located to enclose character input box IW224, and character input box IW224 is in the input enabled state. Further, the input box data table used in the process of step S242A is input box data table TD100A of FIG. 17. In this case, input box data A included in character string request data A is input box data TD200A as follows.

FIG. 21 shows exemplary input box data TD200A. Referring to FIG. 21, input box data TD200A differs from input box data TD200 of FIG. 12 in that the former additionally includes "character string type". Input box data TD200A is similar to input box data TD200 in other respects, and the detailed description thereof will not be repeated.

In input box data TD200A, the permitted character type, data input capacity and character string type associated with input box ID "TX04" in input box data table TD100A of FIG. 17 are shown. Here, it is seen from the character string type (label "NAME-MEI-KANA") shown in input box data TD200A and label description table T110A of FIG. 18 that the type of a character string requested to be input to input enabled character input box IW224 is a kana reading of the first name in kanji.

Referring again to FIG. 20, in character input process MA, step S211A is performed first.

In step S211A, control unit 510 determines whether or not character string request data A serving as character string request instruction A is received. If YES in step S211A, the flow proceeds to step S212. If NO in step S211A, step S211A is performed again. Here, character string request data A serving as character string request instruction A is received, and the flow proceeds to step S212.

When character string request data A as received includes an error message, control unit 510 causes display unit 530 to display the error message for a predetermined time (two seconds for example). The flow then proceeds to step S212.

In step S212, a process similar to that described in connection with the first embodiment is performed, and the detailed description thereof will not be repeated. Through this process, the operation mode of portable terminal 500 is changed from the RC mode to the normal mode.

In step S213, a process similar to that described in connection with the first embodiment is performed, and the detailed description thereof will not be repeated.

In step S214A, a process is performed similarly where the character string request data and the input box data described for the process in step S214 of FIG. 12 are replaced respectively with character string request data A and input box data A, and the detailed description thereof will not be repeated. If YES in step S214A, the flow proceeds to step S215A. If NO in step S214A, the flow proceeds to step S218A.

In step S215A, a character input mode setting process MA is performed similarly where the character string request data and the input box data described for the process in step S215 of FIG. 12 are replaced respectively with character string request data A and input box data A, and the detailed description thereof will not be repeated.

In step S218A, a character input mode setting process MNA is performed. Character input mode setting process MNA is performed similarly where the character string request data and the input box data described for the process in step S218 of FIG. 12 are replaced respectively with character string request data A and input box data A, and the detailed description thereof will not be repeated.

In step S221, a process similar to the one described in connection with the first embodiment is performed, and the detailed description thereof will not be repeated. It is supposed that this process is performed so that character input image MG300 of FIG. 14 where a character input image N without character string "あ…" is shown is displayed. Then, the flow proceeds to step S221A.

In step S221A, it is determined whether or not there is a designated character string. Here, the designated character string refers to a character string of the character string type shown in input box data A included in received character string request data A. Specifically, control unit 510 determines whether or not storage unit 520 stores the designated character string. In the case where step S221A is performed for the first time, storage unit 520 has not stored the designated character string.

If YES in step S221A, the flow proceeds to step S221AB as described later. If NO in step S221A, the flow proceeds to step S222. It is supposed here that storage unit 520 does not store the designated character string, and the flow proceeds to step S222.

In step S222, a process similar to the one described in connection with the first embodiment is performed, and the detailed description thereof will not be repeated. Here, the confirmed character string as input is "たろう", and the flow proceeds to step S223A.

In step S223A, a process is performed similarly where the character string request data and the input box data described for the process in step S223 of FIG. 12 are replaced with character string request data A and input box data A respectively, and the detailed description thereof will not be repeated. The flow then proceeds to step S223AB.

In step S223AB, a character string storage process MA is performed. In character string storage process MA, control unit 510 causes storage unit 520 to store character string data associating the character string type shown in input box data A included in received character string request data A with the confirmed character string as input. In the case where step S223AB is performed for the first time, storage unit 520 stores a character string data table including one character string data piece.

In the case where storage unit 520 has already stored the character string data table, control unit 510 adds the character string data to the character string data table stored in storage unit 520.

In the case where storage unit 520 has already stored the character string data table indicating the character string type shown in input box data A, control unit 510 replaces the confirmed character string (input character string) shown in the character string data table and associated with the character string type shown in input box data A, with the newly input confirmed character string.

Here, the confirmed character string as input is "たろう". Further, input box data A is input box data TD200A of FIG. 21. In this case, storage unit 520 stores a character string data table MD400B as follows. Step S223AB is then ended.

FIG. 22 shows an exemplary character string data table MD400B. Referring to FIG. 22, character string data table MD400B includes one character string data piece. In character string data table MD400B, "number" is the number for identifying the character string data. "Character string type" is the type of the confirmed character string as input. In character string data table MD400B, the character string type is a kana reading of the first name in kanji, as seen from label description table T110A of FIG. 18. "Input character string" is the confirmed character string as input.

Referring again to FIG. 20, the flow proceeds to step S224A after step S223AB.

In step S224A, control unit 510 determines whether or not a character input mode setting process MNA is performed. Namely, it is determined whether or not character input mode setting process MNA is performed in response to the fact that the permitted character type shown in input box data A included in received character string request data A is not input permitted character type M but input inhibited character type M. If YES in step S224A, the flow proceeds to step S225A. If NO in step S224A, the flow proceeds to step S226A.

In step S225A, character conversion process MA is performed. Character conversion process MA is performed similarly where character input mode setting process MN, the character string request data and the input box data described for the process in step S225 of FIG. 12 are replaced respectively with character input mode setting process MNA, character string request data A and input box data A, and the detailed description thereof will not be repeated.

In step S226A, character string transmission process MA is preformed. Character string transmission process MA is performed similarly where the character string request data and the input box data described for the process in step S226 of FIG. 12 are replaced with character string request data A and input box data A respectively, and the detailed description thereof will not be repeated. Here, by way of example, input box character data MD300 of FIG. 15 is transmitted to data processor 600 identified by device ID "11TA".

In character input process TA, step S251 is performed. In steps S251, S252, S253, S254, and S255, a process is performed similarly to the process described in connection with the first embodiment, and the detailed description thereof will not be repeated.

In character input process TA, when the determination in step S252 or step S253 is NO, step S242A is performed. When step S255 is completed, this character input process TA is ended and the flow returns to control signal process TA of FIG. 19 where step S141 is performed again.

Next, it is supposed by way of example that, in order to input character strings respectively to all character input boxes shown in web page image G200 of FIG. 8, manipulation determination process M and control signal process TA of FIG. 19 and character input process MA and character input process TA of FIG. 20 are performed multiple times. It is supposed that storage unit 520 of portable terminal 500 accordingly stores a character string data table MD400A as follows.

FIG. 23 shows an exemplary character string data table MD400A. Referring to FIG. 23, each item in character string data table MD400A is similar to the corresponding item in character string data table MD400B of FIG. 22, and the detailed description thereof will not be repeated.

It is supposed here that display unit 530 of portable terminal 500 displays control image MG100A of FIG. 7. Namely, the state of portable terminal 500 is State MA. Further, it is supposed that, in State MA, direction buttons 541A, 541B, 541C, 541D and enter button 541E for example are manipulated so that web page image G200 of FIG. 8 is displayed on display unit 630 of data processor 600. It is further supposed that control unit 610 generates an input box data table through the above-described process, and storage unit 620 thus stores input box data table TD100A of FIG. 17.

It is further supposed that manipulation determination process M and control signal process TA of FIG. 19 as described above are performed, and thus character input box IW224 shown in web page image G200 of FIG. 8 is set to the input enabled state.

It is supposed that steps S241 and S242A in character input process TA of FIG. 20 are performed so that character string request data A serving as character string request instruction A is transmitted to portable terminal 500.

In step S211A of character input process MA, character string request data A serving as character string request instruction A is received, and the flow proceeds to step S212. Then, steps S212 and S213 are performed as described above.

Step S214A is then performed, step S215A or step S218A is performed, and thereafter the flow proceeds to step S221.

In step S221, a process is performed similarly to the one described in connection with the first embodiment, and the detailed description thereof will not be repeated. It is supposed that this process is performed so that character input image MG300 of FIG. 14 where character input image N without character string "あ···" is shown is displayed.

In step S221A, a process is performed similarly to the above-described one, and the detailed description thereof will not be repeated. Here, it is supposed that input box data A included in received character string request data A is input box data TD200A of FIG. 21. Further, storage unit 620 stores a character string data table MD400A of FIG. 23.

In this case, the designated character string in character string data table MD400A is the input character string "たろう" associated with the character string type (label "NAME-MEI-DANA") shown in input box data TD200A. In this case, the determination in step S221A is YES, and the flow proceeds to step S221AB.

In step S221AB, an input character string display process MA is performed. In input character string display process MA, control unit 510 uses VDP 532 to cause display unit 530 to display the input character string as the designated character string in character input region MR320 displayed on display unit 530. In the case where the designated character string is the input character string "たろう" for example, the input character string "たろう" is displayed in character input region MR320.

Then, in step S222, the character confirmation manipulation is performed, so that the input character string displayed as the designated character string in character input region MR320 becomes the confirmed character string. Here, in step S222, a user may press buttons such as direction buttons 541C, 541D and valid character button as required in order to edit the input character string displayed as the designated character string in character input region MR320. In this case, the edited character string is the confirmed character string.

In step S223AB, a process is performed similarly to the above-described one, and the detailed description thereof will not be repeated.

Then, step S224A is performed. Depending on the result of the determination in step S224A, step S225A is also performed.

In step S226A, a process is performed similarly to the above-described one, and the detailed description thereof will not be repeated. Here, the input box character data indicating the confirmed character string (input character string) as the designated character string is transmitted to data processor 600 identified by device ID "11TA". It is supposed that the transmitted input box character data is input box character data MD300 of FIG. 15.

In character input process TA, step S251 is performed. In steps S251, S252, S253, S254, and S255, a process is performed similarly to the one described in connection with the first embodiment, and the detailed description thereof will not be repeated. Through the processes, in character input box IW224 of the input enabled state as shown in web page image G200 of FIG. 8, for example, the confirmed character string (input character string) as the designated character string is displayed.

According to the present embodiment as heretofore described, when a character input box displayed on display unit 630 of data processor 600 is set to the input enabled state, the type of a character string (character string type) requested to be input to the character input box is transmitted to portable terminal 500.

At portable terminal 500, storage unit 520 stores the character string data in which the character string type shown in input box data A included in received character string request data A is associated with the confirmed character string as input to portable terminal 500.

Further, at portable terminal 500, it is determined whether or not storage unit 520 stores the character string of the character string type (designated character string) shown in input box data A included in received character string request data A. When storage unit 520 stores the designated character string, the designated character string is displayed on display unit 530. In response to user's character confirmation manipulation, the input box character data showing the confirmed character string (input character string) as the designated character string is transmitted to data processor 600.

Thus, in the case where a character string of a character string type shown in input box data A included in received character string request data A has been input at least once to portable terminal 500, the character string of the type requested to be input to the input enabled character input box displayed at data processor 600 can be input, without user's manipulation for input of the character string.

Accordingly, the effect is achieved that a character string of the type requested to be input to an input enabled character input box can be easily input.

Further, in the case where a character string of a character string type shown in input box data A included in received character string request data A has been input at least once to portable terminal 500, the character string of the character string type (designated character string) is displayed on display unit 530. The user can also edit the displayed character string as required.

Further, in the present embodiment, the processes described in connection with the first embodiment are performed as well. Therefore, the present embodiment also achieves the effects of the first embodiment. Specifically, the effect is achieved that a character of the type permitted to be input to an input enabled character input box can be easily input. The effect is also achieved that a character of the type permitted to be input to an input enabled character input box can be input even when such a character cannot be directly input by means of portable terminal 500. The effect is further achieved that a received character can be prevented from being input to a character input box to which the received character should not be input.

Third Embodiment

A description will now be given of a process performed when a character string has been input to data processor 600.

A network system of the present embodiment is similar to network system 1000 of the first embodiment, and the detailed description thereof will not be repeated. Potable terminal 500 and data processor 600 are configured similarly to those described in connection with the first embodiment, and the detailed description thereof will not be repeated.

In the present embodiment, while potable terminal 500 is in the RC mode, manipulation determination process M is performed at portable terminal 500. Manipulation determination process M is performed independently of other processes. Further, in the present embodiment, a control signal process TB is performed as follows independently of other processes at data processor 600.

It is supposed here that display unit 530 of portable terminal 500 displays control image MG100A of FIG. 7. Namely, the state of portable terminal 500 is State MA. It is also supposed that, in State MA, buttons such as direction buttons 541A, 541B, 541C, 541D and enter button 541E are manipulated so that a web page image G200A is displayed on display unit 630 of data processor 600 as follows.

FIG. 24 shows an exemplary web page image G200A. Referring to FIG. 24, web page image G200A differs from web page image G200 of FIG. 8 in that character strings have been input (displayed) respectively in character input boxes IW212, IW214, IW222, IW224, IW232, IW234, IW236, IW242, IW244, IW252, IW262, IW264, IW266, IW272, and IW282. Web page image G200A is similar to web page image G200 in other respects, and the detailed description thereof will not be repeated.

Here, control unit 610 of data processor 600 obtains the input box associated information, uses the obtained input box associated information to generate an input box data table, and causes storage unit 620 to store the generated input box data table, in a similar manner to the one described in connection with the first embodiment. It is supposed that in the case where display unit 630 displays web page image G200A, the generated input box data table is input box data table TD100 of FIG. 9. In this case, storage unit 620 stores input box data table TD100.

Further, it is supposed that, in the case where display unit 630 displays a plurality of character input boxes and a character string has been input to a character input box or character strings have been input to more than one character input box respectively (hereinafter also referred to as input completed box), the character string having been input to the corresponding input completed box (hereinafter also referred to as input completed character string) is stored in storage unit 620 in association with the corresponding input completed box. The input completed character string is stored, for example, by the process in step S225 of FIG. 12 described in connection with the first embodiment.

Here, display unit 630 displays web page image G200A. It is supposed that in this case an input completed character string data table TD500 is stored in storage unit 620 as follows.

FIG. 25 shows an exemplary input completed character string data table TD500. Referring to FIG. 25, in input completed character string data table TD500, "input box ID" is similar to "input box ID" in input box data table TD100 of FIG. 9, and the detailed description thereof will not be repeated. "Input completed character string" refers to a character string having been input to the character input box identified by the associated input box ID.

Figure 26:
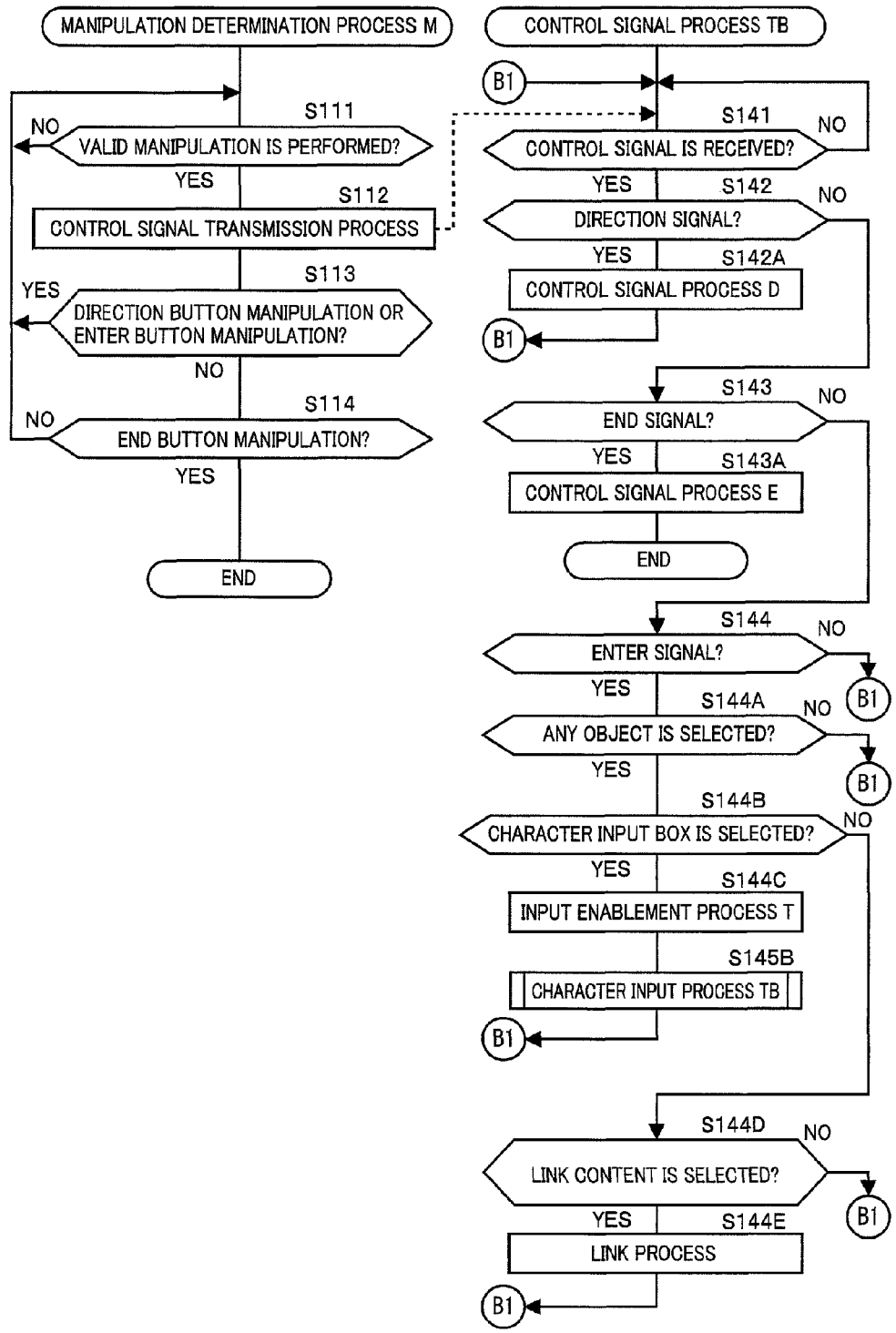
FIG. 26 is a flowchart for a manipulation determination process M and a control signal process TB.

FIG. 26 is a flowchart for manipulation determination process M and control signal process TB. In FIG. 26, a process of the same step number as that of the process described in connection with FIG. 11 is performed similarly to the one as described in connection with FIG. 11, and the detailed description thereof will not be repeated. In the following, processes different from those of FIG. 11 will mainly be described.

Referring to FIG. 26, manipulation determination process M is performed similarly to manipulation determination process M of FIG. 11 described in connection with the first embodiment, and the detailed description thereof will not be repeated. Control signal process TB differs from control signal process T of FIG. 11 in that step S145B is performed instead of step S145. Control signal process TB is similar to control signal process T in other respects, and the detailed description thereof will not be repeated.

Here, it is supposed that the ENTER-RC signal serving as a control signal and including device ID "11MA" is transmitted from portable terminal 500 to data processor 600. It is also supposed that display unit 630 of data processor 600 displays web page image G200A of FIG. 24 where selection box SL205 is located to enclose character input box IW224. Namely, character input box IW224 is selected.

In this case, the determination in step S144B of control signal process TB is YES, and the flow proceeds to step S144C.

In step S144C, a process is performed similarly to the one described in connection with the first embodiment, and the detailed description thereof will not be repeated. The flow then proceeds to step S145B.

In step S145B, a character input process TB is performed. Character input process TB is performed while a character input box displayed on display unit 630 is in the input enabled state. The character input box in the input enabled state is an input box set to the input enabled state. At portable terminal 500, character input process MB is performed as follows independently of other processes.

Figure 27:
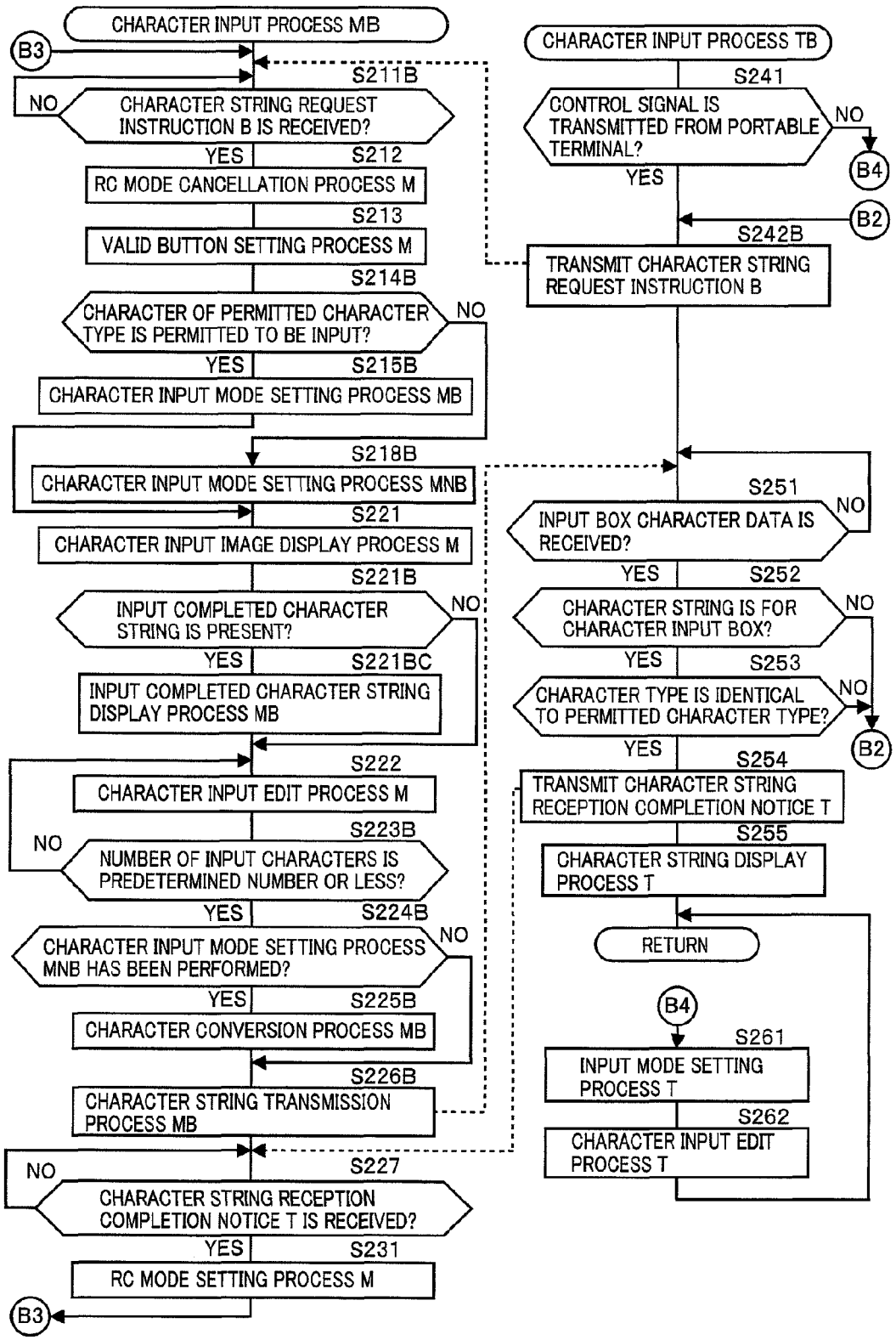
FIG. 27 is a flowchart for a character input process MB and a character input process TB.

FIG. 27 is a flowchart for character input process MB and character input process TB. In FIG. 27, a process of the same step number as that of FIG. 12 is performed similarly to the one described in connection with FIG. 12, and the detailed description thereof will not be repeated. In the following, processes different from those of FIG. 12 will mainly be described.

In step S241, a process is performed similarly to the one described in connection with the first embodiment, and the detailed description thereof will not be repeated. When the determination in step S241 is YES, the flow proceeds to step S242B. When the determination in step S241 is NO, the flow proceeds to step S261.

In step S242B, control unit 610 uses communication unit 660 to transmit to portable terminal 500 character string request data B serving as a character string request instruction B for requesting a character string. The transmitted character string request data B includes device ID "11TA" of the transmitter device and input box data B. Input box data B shows the input box ID identifying the character input box in the input enabled state, input box associated information associated with the input box ID in the input box data table, a character string that is input to the input enabled character input box, and the data size of the character string. Character string request data B serving as character string request instruction B is transmitted, and step S242B is ended.

In the case where the determination in step S252 or step S253 of FIG. 27 as described later is NO and step S242B is performed again, control unit 610 transmits in step S242B character string request data B including an error message in addition to the device ID of the transmitter device and input box data B, to portable terminal 500. The error message is for example as follows. "Error occurred. Please perform manipulation again."

Here, display unit 630 displays web page image G200A of FIG. 24 where selection box SL205 is located to enclose character input box IW224, and character input box IW224 is in the input enabled state. Further, the input box data table used for the process in step S242B is input box data table TD100 of FIG. 9. In this case, input box data B included in character string request data B is input box data TD200B as follows. In the following, a character string having been input to a character input box is also referred to as input completed character string.

FIG. 28 shows exemplary input box data TD200B. Referring to FIG. 28, input box data TD200B differs from input box data TD200 of FIG. 13 in that the former additionally includes items "input character string" and "data size". Input box data TD200B is similar to input box data TD200 in other respects, and the detailed description thereof will not be repeated. "Input completed character string" is a character string having been input to a character string of the input enabled state. "Data size" is the data size of "input completed character string".

In the case where no character string is input to the input enabled character input box, no character string is shown under the item "input completed character string". Further, in the case where no character string is input to the input enabled character input box, the item "data size" is "0".

Referring again to FIG. 27, in character input process MB, step S211B is performed first.

In step S211B, control unit 510 determines whether or not character string request data B serving as character string request instruction B is received. If YES in step S211B, the flow proceeds to step S212. If NO in step S211B, step S211B is performed again. Here, character string request data B serving as character string request instruction B is received, and the flow proceeds to step S212.

In the case where received character string request data B includes an error message, control unit 510 causes display unit 530 to display the error message for a predetermined time (two seconds for example), and the flow proceeds to step S212.

In step S212, a process is performed similarly to the one described in connection with the first embodiment, and the detailed description thereof will not be repeated. The process is performed so that the operation mode of portable terminal 500 is changed from the RC mode to the normal mode.

In step S213, a process is performed similarly to the one described in connection with the first embodiment, and the detailed description thereof will not be repeated.

In step S214B, a process is performed similarly where the character string request data and the input box data are replaced respectively with character string request data B and input box data B in the description of step S214 of FIG. 12, and the detailed description thereof will not be repeated. If YES in step S214B, the flow proceeds to step S215B. If NO in step S214B, the flow proceeds to step S218B.

In step S215B, a character input mode setting process MB is performed. In character input mode setting process MB, a process is performed similarly where the character string request data and the input box data are replaced respectively with character string request data B and input box data B in the description of step S215 of FIG. 12, and the detailed description thereof will not be repeated.

In step S218B, a character input mode setting process MNB is performed. In character input mode setting process MNB, a process is performed similarly where the character string request data and the input box data are replaced respectively with character string request data B and input box data B, and the detailed description thereof will not be repeated.

In step S221, a process is performed similarly to the one described in connection with the first embodiment, and the detailed description thereof will not be repeated. This process is performed so that character input image MG300 of FIG. 14 where character input image N without character string "あ…" is shown is displayed. The flow then proceeds to step S221B.

In step S221B, it is determined whether or not there is an input completed character string. Specifically, control unit 510 determines whether or not input box data B included in received character string request data B shows an input completed character string. If YES in step S221B, the flow proceeds to step S221BC. If NO in step S221B, the flow proceeds to step S222. Here, input box data B included in received character string request data B is input box data TD200B of FIG. 28. In this case, input box data TD200B shows the input completed character string "たろう", and the flow proceeds to step S221BC.

In step S221BC, an input completed character string display process MB is performed. In input completed character string display process MB, control unit 510 uses VDP 532 to display the input completed character string in character input region MR320 displayed on display unit 530. When the input completed character string is "たろう" for example, the input completed character string "たろう" is displayed in character input region MR320.

In step S222, a process is performed similarly to the one described in connection with the first embodiment, and the detailed description thereof will not be repeated. Here, while the input completed character string "たろう" is displayed in character input region MR320, edit manipulation is performed for editing the input completed character string. The edit manipulation refers to pressing of buttons such as direction buttons 541C, 541D and valid character button (such as character button CLB). It is supposed that the edit manipulation is performed to change the input completed character string "たろう" to a character string "こたろう". Then, the character confirmation manipulation is done. In this case, the character string "こたろう" is the confirmed character string. The flow then proceeds to step S223B.

In step S223B, a process is performed similarly where the character string request data and the input box data are replaced respectively with character string request data B and input box data B in the description of step S223 of FIG. 12, and the detailed description thereof will not be repeated. The flow then proceeds to step S224B.

In step S224B, control unit 510 determines whether or not a character input mode setting process MNB is performed. Namely, it is determined whether or not character input mode setting process MNB is performed in response to the fact that the permitted character type shown in input box data B included in received character string request data B is not input permitted character type M but input inhibited character type M. If YES in step S224B, the flow proceeds to step S225B. If NO in step S224B, the flow proceeds to step S226B.

In step S225B, a character conversion process MB is performed. Character conversion process MB is performed similarly where character input mode setting process MN, the character string request data and input box data are replaced respectively with character input mode setting process MNB, character string request data B and input box data B in the description of step S225 of FIG. 12, and the detailed description thereof will not be repeated.

In step S226B, a character string transmission process MB is performed. Character string transmission process MB is performed similarly where the character string request data and the input box data are replaced respectively with character string request data B and input box data B in the description of step S226 of FIG. 12, and the detailed description thereof will not be repeated. It is supposed here by way of example that input box character data MD300A as follows is transmitted to data processor 600 identified by device ID "11TA". Step S226B is then ended.

FIG. 29 shows exemplary input box character data MD300A. Referring to FIG. 29, each item in input box character data MD300A is similar to the corresponding item in input box character data MD300 of FIG. 15, and the detailed description thereof will not be repeated.

Referring again to FIG. 27, in character input process TB, step S251 is performed.

In steps S251, S252, S253, S254, and S255, a process is performed similarly to the one described in connection with the first embodiment, and the detailed description thereof will not be repeated.

In character input process TB, step S242B is performed in the case where the determination in step S252 or step S253 is NO. These processes are performed so that the character string "たろう" displayed in character input box IW224 of web page image G200A of FIG. 24 for example is converted to the character string "こたろう".

According to the present embodiment as heretofore described, in the case where a character input box displayed on display unit 630 of data processor 600 is in the input enabled state and a character string has been input to the character input box in the input enabled state, the input completed character string having been input to the input enabled character input box is transmitted to portable terminal 500.

At portable terminal 500, the input completed character string is displayed on display unit 530. In the case where a user performs the edit manipulation for editing the input completed character string, the character string having been edited (hereinafter also referred to as edited character string) is transmitted to data processor 600.

At data processor 600, the input completed character string displayed in the input enabled character input box is changed to the edited character string as received.

Therefore, the user can edit an input completed character string by manipulating portable terminal 500 while watching the input completed character string displayed on display unit 530 of portable terminal 500. Accordingly, the effect is achieved that an input completed character string having been input to a character input box can be efficiently edited.

Further, in the present embodiment, the processes described in connection with the first embodiment are performed as well. Therefore, the present embodiment also achieves the effects of the first embodiment. Specifically, the effect is achieved that a character of the type permitted to be input to an input enabled character input box can be easily input. The effect is also achieved that a character of the type permitted to be input to an input enabled character input box can be input even when such a character cannot be directly input by means of portable terminal 500. The effect is further achieved that a received character can be prevented from being input to a character input box to which the received character should not be input.

Fourth Embodiment

A description will now be given of a process for data processor 600 to assist in input of a character string by means of portable terminal 500.

A network system of the present embodiment is similar to network system 1000 of the first embodiment, and the detailed description thereof will not be repeated. Portable terminal 500 and data processor 600 are configured similarly to those described in connection with the first embodiment, and the detailed description thereof will not be repeated.

In the present embodiment, while portable terminal 500 is in the RC mode, manipulation determination process M is performed at portable terminal 500. Manipulation determination process M is a process performed independently of other processes. Further, in the present embodiment, data processor 600 performs a control signal process TC as follows independently of other processes.

It is supposed here that display unit 530 of portable terminal 500 displays control image MG100A of FIG. 7. Namely, the state of portable terminal 500 is State MA. It is also supposed that, in State MA, buttons such as direction buttons 541A, 541B, 541C, 541D and enter button 541E are manipulated so that web page image G200 of FIG. 8 is displayed on display unit 630 of data processor 600.

Here, control unit 610 of data processor 600 obtains the input box associated information, uses the obtained input box associated information to generate an input box data table, and causes storage unit 620 to store the generated input box data table, in a similar manner to the one described in connection with the first embodiment. It is supposed that, in the case where display unit 630 displays web page image G200, the generated input box data table is input box data table TD100 of FIG. 9. In this case, storage unit 620 stores input box data table TD100.

Figure 30:
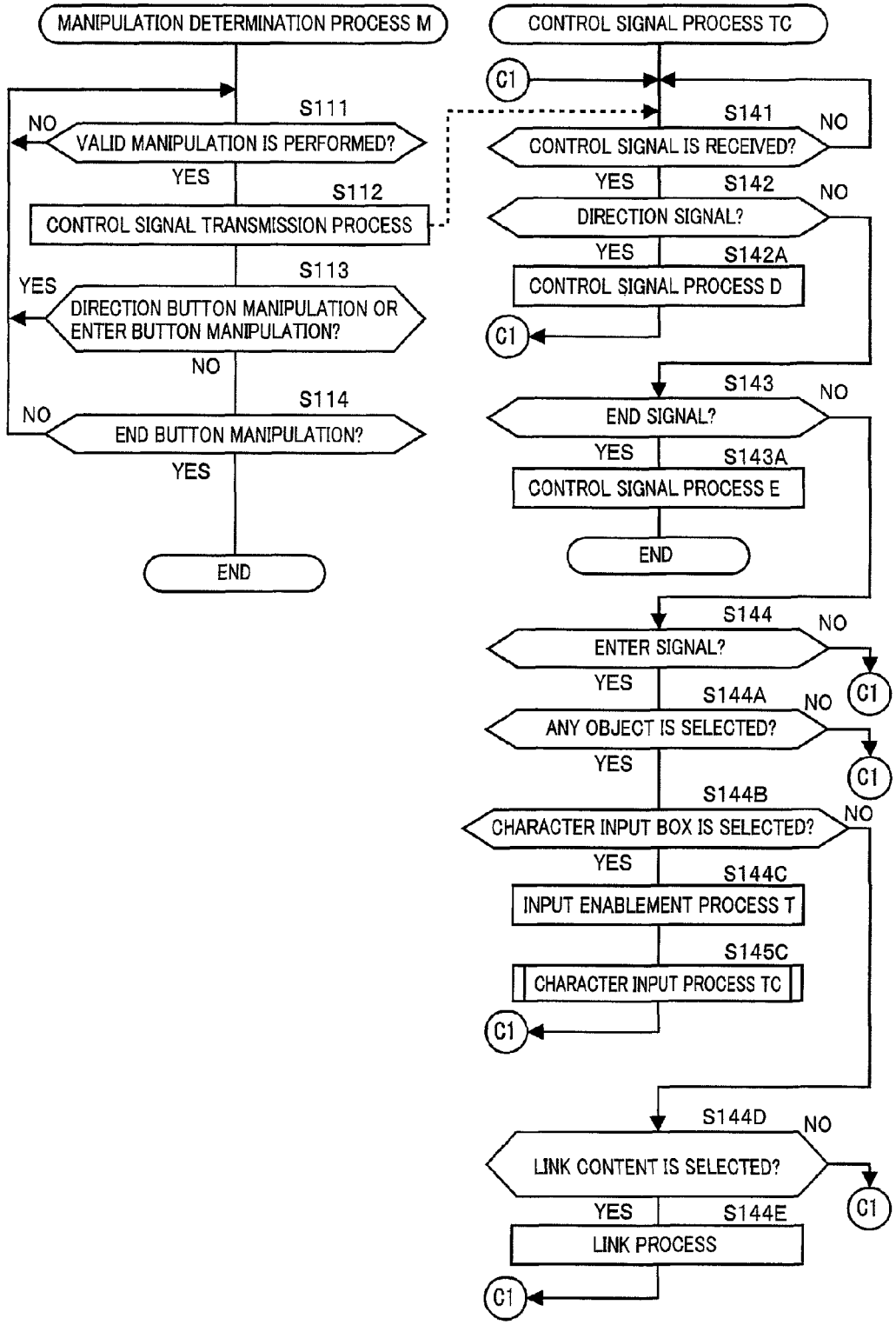
FIG. 30 is a flowchart for a manipulation determination process M and a control signal process TC.

FIG. 30 is a flowchart for manipulation determination process M and control signal process TC. In FIG. 30, the process performed in a step of the same step number as that of FIG. 11 is similar to the one described in connection with FIG. 11, and the detailed description thereof will not be repeated. In the following, processes different from those of FIG. 11 will mainly be described.

Referring to FIG. 30, manipulation determination process M is similar to manipulation determination process M of FIG. 11 described in connection with the first embodiment, and the detailed description thereof will not be repeated. Control signal process TC differs from control signal process T of FIG. 11 in that step S145C is performed instead of step S145. Control signal process TC is similar to control signal process T in other respects, and the detailed description thereof will not be repeated.

It is supposed here that the ENTER-RC signal serving as a control signal and including device ID "11MA" is transmitted from portable terminal 500 to data processor 600. It is also supposed that display unit 630 of data processor 600 displays web page image G200 of FIG. 8 where selection box SL205 is located to enclose character input box IW224. Namely, character input box IW224 is selected.

In this case, the determination in step S144B of control signal process TC is YES, and the flow proceeds to step S144C.

In step S144C, a process similar to that described in connection with the first embodiment is performed, and the detailed description thereof will not be repeated. The flow then proceeds to step S145C.

In step S145C, a character input process TC is performed. Character input process TC is a process performed in the case where a character input box displayed on display unit 630 is in the input enabled state. The character input box in the input enabled state refers to an input box set to the input enabled state. At portable terminal 500, a character input process MC is performed independently of other processes as follows.

Figure 31:
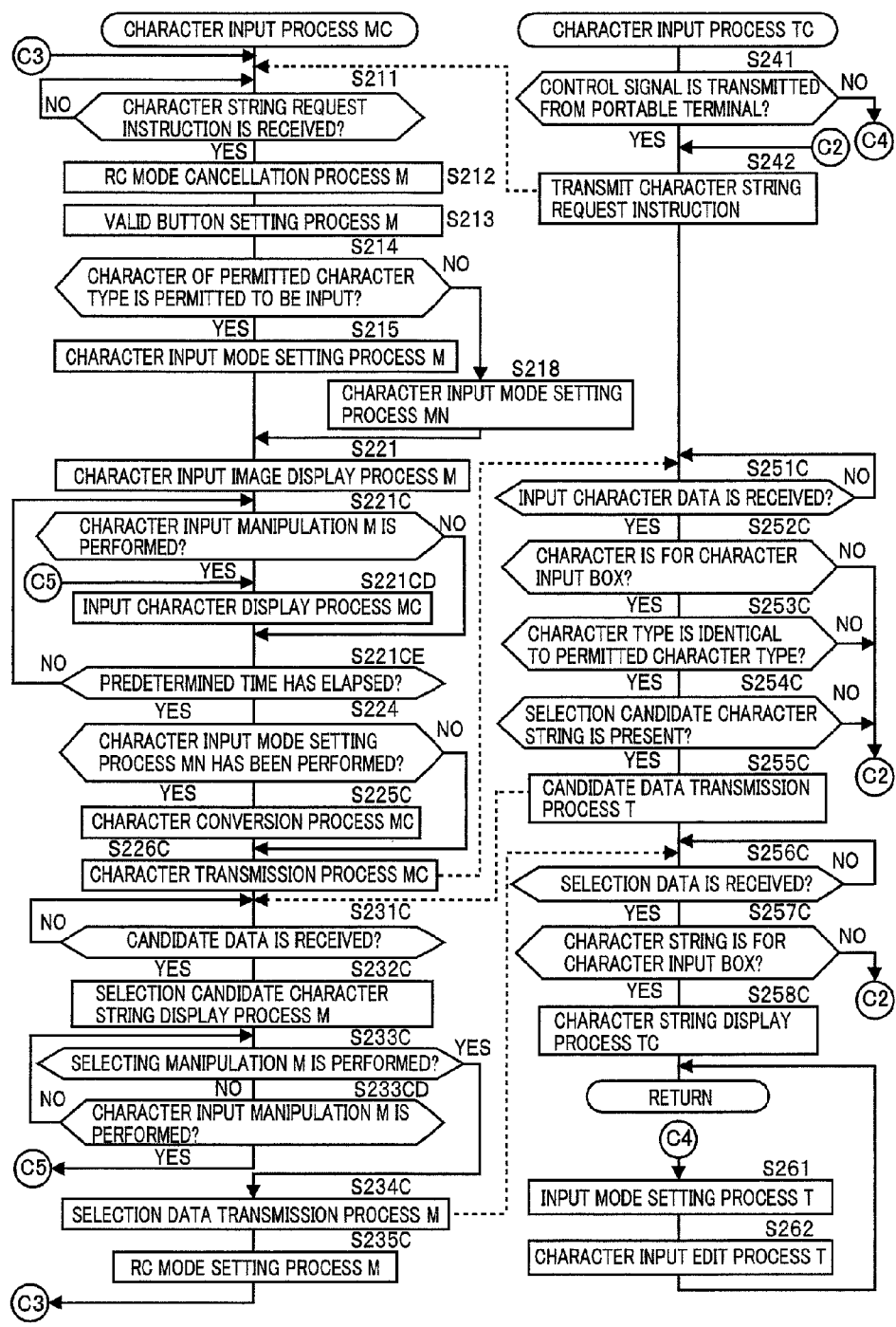
FIG. 31 is a flowchart for a character input process MC and a character input process TC.

FIG. 31 is a flowchart for character input process MC and character input process TC. In FIG. 31, the process in a step of the same step number as that of FIG. 12 is similar to the one described in connection with FIG. 12, and the detailed description thereof will not be repeated. In the following, processes different from those of FIG. 12 will mainly be described.

In step S241, a process similar to that described in connection with the first embodiment is performed, and the detailed description thereof will not be repeated. When the determination in step S241 is YES, the flow proceeds to step S242. When the determination in step S241 is NO, the flow proceeds to step S261.

In step S242, a process similar to that described in connection with the first embodiment is performed, and the detailed description thereof will not be repeated. This process is performed so that character string request data serving as a character string request instruction is transmitted. The transmitted character string request data includes device ID "11TA" of the transmitter device itself and input box data. The character string request data serving as a character string request instruction is transmitted, and step S242 is ended.

Here, display unit 630 displays web page image G200 of FIG. 8 where selection box SL205 is located to enclose character input box IW224, and character input box IW224 is in the input enabled state. The input box data table used in step S242 is input box data table TD100 of FIG. 9. In this case, the input box data included in the character string request data is input box data TD200 of FIG. 13.

In character input process MC, step S211 is performed first. In step S211, a process similar to the one described in connection with the first embodiment is performed, and the detailed description thereof will not be repeated. Here, the character string request data serving as a character string request instruction is received, and the flow proceeds to step S212.

In step S212, a process similar to the one described in connection with the first embodiment is performed, and the detailed description thereof will not be repeated. This process is performed so that the operation mode of portable terminal 500 is changed from the RC mode to the normal mode.

In step S213, a process similar to the one described in connection with the first embodiment is performed, and the detailed description thereof will not be repeated.

In step S214, a process similar to the one described in connection with the first embodiment is performed, and the detailed description thereof will not be repeated.

In step S215, a process similar to the one described in connection with the first embodiment is performed, and the detailed description thereof will not be repeated.

In step S218, a process similar to the one described in connection with the first embodiment is performed, and the detailed description thereof will not be repeated.

In step S221, a process similar to the one described in connection with the first embodiment is performed, and the detailed description thereof will not be repeated. It is supposed that this process is performed so that character input image MG300 of FIG. 14 where character input image N without character string "あ…" is shown is displayed. The flow then proceeds to step S221C.

In step S221C, control unit 510 determines whether or not character input manipulation M is performed. Character input manipulation M is pressing of a valid character button so as to input a character. If YES in step S221C, the flow proceeds to step S221CD. If NO in step S221C, the flow proceeds to step S221CE as described later.

It is supposed here that the character input mode as set is the kanji-hiragana input mode, and character input manipulation M of pressing character button 4B of FIG. 3 that is a valid character button is performed. In this case, character input manipulation M is the manipulation performed so as to input the hiragana letter "た". In this case, the determination in step S221C is YES, and the flow proceeds to step S221CD.

In step S221CD, an input character display process MC is performed. In input character display process MC, control unit 510 uses VDP 532 to display the character input by character input manipulation M in character input region MR320 displayed on display unit 530.

It is supposed here that storage unit 520 stores a counter K. Counter K is used for counting the number. The initial value of counter K is "1".

In input character display process MC, in the case where characters are displayed in character input region MR320 and where the number of the characters displayed in character input region MR320 is less than the number indicated by counter K, the character input by character input manipulation M is displayed in character input region MR320 in addition to the characters having been displayed in character input region MR320.

In the case where the number of characters displayed in character input region MR320 is equal to the number indicated by counter K, the character input by character input manipulation M is displayed in character input region MR320 instead of the last displayed character. The flow then proceeds to step S221CE.

In step S221CE, control unit 510 determines whether or not a predetermined time has elapsed from the first character input manipulation M. The predetermined time is three seconds for example. Character input manipulation M performed after step S232C as described later is also the first character input manipulation M.

If YES in step S221CE, the flow proceeds to step S224. If NO in step S221CE, step S221C is performed again. In the case where the first character input manipulation M has not been performed, the determination is NO and step S221C is performed again. Here, when the predetermined time has elapsed, the flow proceeds to step S224.

In the case where the predetermined time has not elapsed or the first character input manipulation M has not been performed, step S221C is performed again and, when character input manipulation M is performed, step S221CD is then performed. In other words, each time a valid character button is pressed within a predetermined time, the latest character displayed in character input region MR320 is changed. In the following, a character that is being displayed in character input region MR320 at the time when the determination in step S221CE is YES is also referred to as confirmed character.

In step S224, a process similar to the one described in connection with the first embodiment is performed, and the detailed description thereof will not be repeated. If YES in step S224, the flow proceeds to step S225C. If NO in step S224, the flow proceeds to step S226C.

In step S225C, a character conversion process MC is performed similarly to step S225 of FIG. 12. In character conversion process MC, control unit 510 converts the character (confirmed character) having been input in the character input mode set by character input mode setting process MN, to the character of the permitted character type shown in the input box data included in the received character string request data.

In step S226C, a character transmission process MC is performed. In character transmission process MC, control unit 510 uses communication unit 560 to transmit the input character data to the device identified by the device ID included in the received character string request data. Here, the input character data is the data showing the input box ID shown in input box data C included in received character string request data C as well as the confirmed character.

Here, the input box data included in the received character string request data is input box data TD200 of FIG. 13, and the confirmed character is "た". The device ID included in the character string request data is "11TA". In this case, the input character data is input character data MD600 as follows. Input box character data MD600 is transmitted to data processor 600 identified by the device ID "11TA". The process of step S226C is then ended.

FIG. 32 shows exemplary input character data MD600. Referring to FIG. 32, input character data MD600 differs from input box character data MD300 of FIG. 15 in that "input character" is displayed instead of "input character string". Input character data MD600 is similar to input box character data MD300 in other respects, and the detailed description thereof will not be repeated. In input character data MD600, "input character" is the character input by character input manipulation M.

Referring again to FIG. 31, in character input process TC, the flow proceeds to step S251C after step S242.

In step S251C, control unit 610 determines whether or not the input character data is received. If YES in step S251C, the flow proceeds to step S252C. If NO in step S251C, step S251C is performed again. Here, input character data MD600 of FIG. 32 is received, and the flow proceeds to step S252C.

In step S252C, it is determined whether or not the input character shown in the received input character data is a character to be input to the character input box in the input enabled state. Specifically, control unit 610 determines whether or not the input box ID shown in the received input character data is the same as the input box ID shown in the input box data included in the transmitted character string request data. If YES in step S252C, the flow proceeds to step S253C. If NO in step S252C, step S242 is performed again.

Here, the received input character data is input character data MD600. The input box data included in the character string request data transmitted to portable terminal 500 is input box data TD200 of FIG. 13. In this case, the determination in step S252C is YES, and the flow proceeds to step S253C.

In step S253C, control unit 610 determines whether or not the type of the input character shown in the received input character data is the same as the permitted character type shown in the input box data included in the transmitted character string request data. If YES in step S253C, the flow proceeds to step S254C. If NO in step S253C, step S242 is performed again.

Here, the received input character data is input character data MD600. The type of the input character shown in the received input character data is hiragana. In this case, the determination in step S253C is YES, and the flow proceeds to step S254C.

In the present embodiment, control unit 610 of data processor 600 causes storage unit 620 to store character strings that have been input from a device such as portable terminal 500 or wireless keyboard 400 to data processor 600. The character strings are stored as selectable character strings, up to a predetermined number of character strings. The predetermined number is 300 for example. In the case where the number of selectable character strings stored in storage unit 620 is equal to the predetermined number and a new selectable character string is to be stored, control unit 610 deletes the oldest selectable character string stored in storage unit 620 and causes storage unit 620 to store the new selectable character string. The selectable character string to be deleted is not limited to the selectable character string satisfying the above-described condition. For example, in the case where the number of selectable character strings stored in storage unit 620 is equal to the predetermined number and a new selectable character string is to be stored, control unit 610 may delete a selectable character string that is stored in storage unit 620 and least frequently used.

A part or all of a plurality of selectable character strings stored in storage unit 620 is not limited to character strings input to data processor 600. A part or all of a plurality of selectable character strings stored in storage unit 620 may be character strings obtained from an external server for example via the Internet.

In step S254C, it is determined whether or not there is a selection candidate character string. Namely, a selection candidate character string is retrieved. The selection candidate character string is a character string in which the leading character is the input character shown in the received input character data and all characters of the character string are of the same type as the permitted character type shown in the input box data included in the transmitted character string request data. The selection candidate character string may be a character string in which a part of the characters of the selection candidate character string is of the same type as the permitted character type shown in the input box data included in the transmitted character string request data.

Specifically, control unit 610 determines whether or not a selection candidate character string is included in a plurality of selectable character strings stored in storage unit 620. If YES in step S254C, the flow proceeds to step S255C. If NO in step S254C, control unit 610 causes display unit 630 to display an error message C for a predetermined time and step S242 is performed again. An example of error message C is "there is no character string including the input character". The predetermined time is three seconds for example.

Here, the received input character data is input character data MD600. It is supposed that storage unit 620 stores a plurality of selection candidate character strings each having the leading character that is the input character "た" shown in input character data MD600. In this case, the determination in step S254C is YES and the flow proceeds to step S255C. In this case, a plurality of selection candidate character strings each stored in storage unit 620 and having the leading character that is the input character "た" are character strings retrieved by control unit 610.

In step S255C, a candidate data transmission process T is performed. In candidate data transmission process T, control unit 610 uses communication unit 660 to transmit candidate data to portable terminal 500. Here, the candidate data is data showing at least one selection candidate character string (hereinafter also referred to as selection candidate character data table). It is supposed here that the selection candidate character data table that is the candidate data to be transmitted is a selection candidate character data table TD700 as follows. Step S255C is then ended.

FIG. 33 shows an exemplary selection candidate character data table TD700. Selection candidate character data table TD700 includes a plurality of selection candidate character data pieces. Referring to FIG. 33, a plurality of selection candidate character data pieces each show "character string number" and "selection candidate character string".

"Selection candidate character string" is the one as described above, and the detailed description thereof will not be repeated. "Character string number" is the number for identifying the corresponding "selection candidate character string".

Referring again to FIG. 31, in character input process MC, the flow proceeds to step S231C after step S226C.

In step S231C, control unit 510 determines whether or not candidate data is received. If YES in step S231C, the flow proceeds to step S232C. If NO in step S231C, step S231C is performed again. Here, selection candidate character data table TD700 that is the candidate data is received, and the flow proceeds to step S232C.

In step S232C, a selection candidate character string display process M is performed. In selection candidate character string display process M, control unit 510 uses VDP 532 to cause display unit 530 to display selection candidate character strings shown in the selection candidate character data table that is received as the candidate data. Here, the selection candidate character data table received as the candidate data is selection candidate character data table TD700 of FIG. 33. In this case, display unit 530 displays a character input image MG300A as follows. Then, step S232C is ended.

Figure 34:
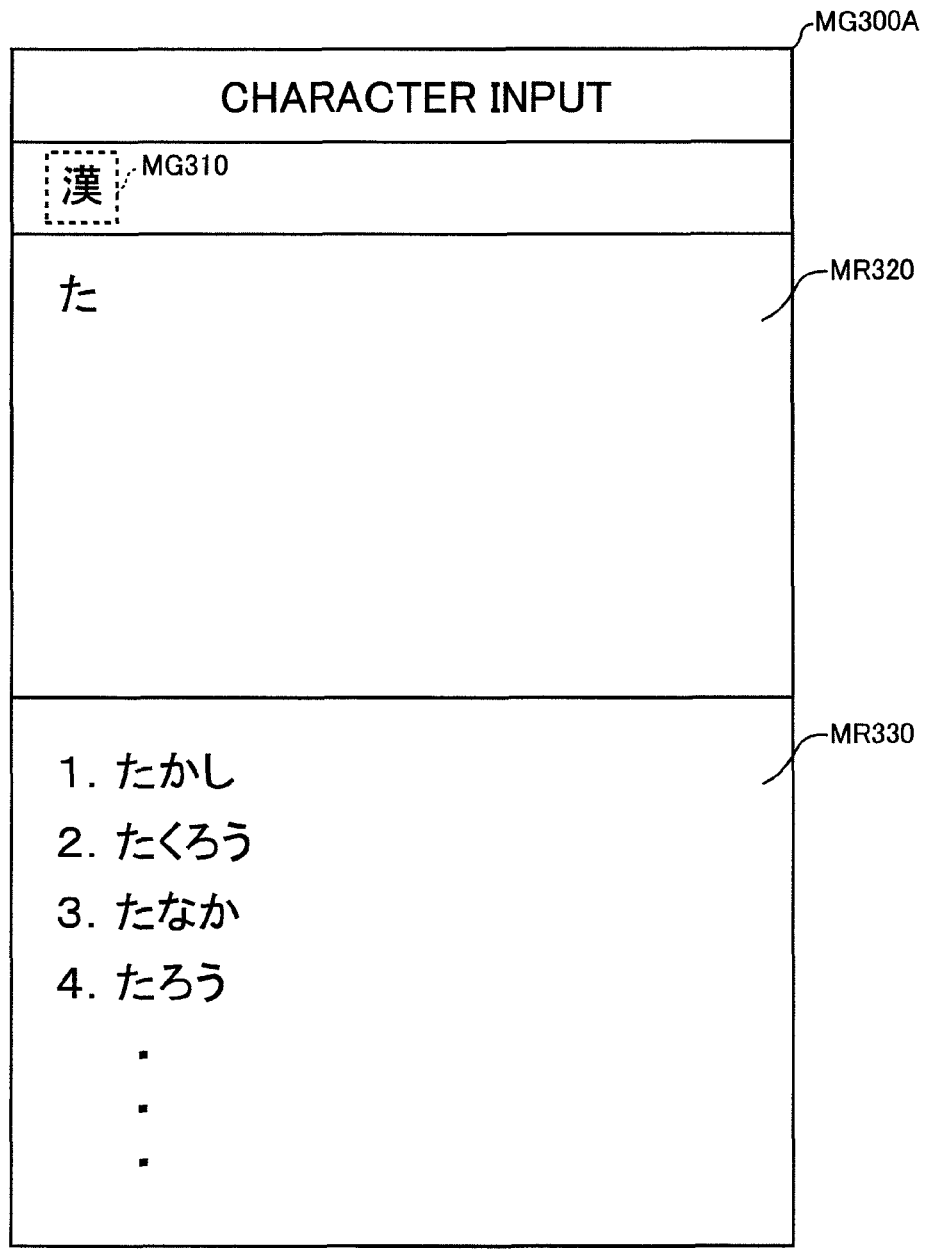
FIG. 34 shows an exemplary character input image.

FIG. 34 shows an exemplary character input image MG300A. Referring to FIG. 34, character input image MG300A differs from character input image MG300 of FIG. 14 in that a selection candidate character string display region MR330 is added. Character input image MG300A is similar to character input image MG300 in other respects, and the detailed description thereof will not be repeated.

In character input image MG300A, the selection candidate character strings shown in selection candidate character data table TD700 that is the candidate data are displayed in selection candidate character string display region MR330. The numbers indicated on the left side of the selection candidate character strings respectively are the character string numbers for identifying the selection candidate character strings respectively in selection candidate character data table TD700.

Referring again to FIG. 31, in selection candidate character string display process M, control unit 510 sets function button 542A to function as a button for setting portable terminal 500 to a character string selection mode (hereinafter also referred to as selection mode setting button). In this case, when function button 542A set to function as the selection mode setting button is pressed, control unit 510 sets portable terminal 500 to the character string selection mode. The character string selection mode is a mode for selecting a selection candidate character string. While portable terminal 500 is in the character string selection mode, character buttons 1B, 2B, 3B, 4B, 5B, 6B, 7B, 8B, 9B, 0B are each used to input the corresponding number shown in FIG. 3 regardless of the set character input mode. Then, the flow proceeds to step S233C.

In step S233C, control unit 510 determines whether or not selecting manipulation M is performed. Selecting manipulation M includes the manipulation of pressing function button 542A set to function as the selection mode setting button, and number input manipulation M. When function button 542A set to function as the selection mode setting button is pressed, control unit 510 sets portable terminal 500 to the character string selection mode. Number input manipulation M is the manipulation of pressing a button to input a number while portable terminal 500 is set in the character string selection mode. Buttons used to input numbers are character buttons 1B, 2B, 3B, 4B, 5B, 6B, 7B, 8B, 9B, 0B while portable terminal 500 is set to the character string selection mode.

If YES in step S233C, control unit 510 sets the value of counter K to "1" and the flow proceeds to step S234C. If NO in step S233C, the flow proceeds to step S233CD as described later. Here, selecting manipulation M is performed, and control unit 510 sets the value of counter K to "1" and the flow process to step S234C. It is supposed that selecting manipulation M as performed includes the manipulation of pressing function button 542A that is set to function as the selection mode setting button, and the manipulation to input number "4" while portable terminal 500 is in the character string selection mode.

In step S234C, a selection data transmission process M is performed. In selection data transmission process M, control unit 510 uses communication unit 560 to transmit selection data to the device identified by the device ID included in the received character string request data. Then, control unit 510 uses VDP 532 to delete selection candidate character string display region MR330 displayed on display unit 530, as well as the character string numbers and selection candidate character strings displayed in selection candidate character string display region MR330. Control unit 510 cancels the character string selection mode of portable terminal 500.

Here, the selection data is the data showing the number that is input by selecting manipulation M. Here, the number input by selecting manipulation M is "4", and the device ID included in the character string request data is "11TA". In this case, the selection data is selection data MD800 as described below. Selection data MD800 is transmitted to data processor 600 identified by device ID "11TA". Step S234C is then ended.

FIG. 35 shows exemplary selection data MD800. Referring to FIG. 35, "input box ID" in selection data MD800 is the input box ID shown in the input box data included in the received character string request data. "Selected number" is the number input by selecting manipulation M.

Referring again to FIG. 31, in character input process TC, the flow proceeds to step S256C after step S255C.

In step S256C, control unit 610 determines whether or not selection data is received. If YES in step S256C, the flow proceeds to step S257C. If NO in step S256C, step S256C is performed again. Here, selection data MD800 of FIG. 35 is received, and the flow proceeds to step S257C.

In step S257C, it is determined whether or not the selection candidate character string identified by the character string number that is the same as the selected number shown in the received selection data is a character string to be input to the input enabled character input box. Specifically, control unit 610 determines whether or not the input box ID shown in the received selection data is identical to the input box ID shown in the input box data included in the character string request data transmitted to portable terminal 500. If YES in step S257C, the flow proceeds to step S258C. If NO in step S257C, step S242 is performed again.

Here, the received selection data is selection data MD800, and the input box data included in the character string request data transmitted to portable terminal 500 is input box data TD200 of FIG. 13. In this case, the determination in step S257C is YES and the flow proceeds to step S258C.

In step S258C, a character string display process TC is performed. In character string display process TC, control unit 610 uses VDP 632 to display, in the input enabled character input box, the selection candidate character string identified by the character string number that is one of a plurality of character string numbers shown in the candidate data transmitted to portable terminal 500 and identical to the selected number shown in the received selection data. Control unit 610 also causes storage unit 620 to store the selection candidate character string displayed in the character input box, in association with the input enabled character input box.

Here, display unit 630 displays web page image G200 of FIG. 8 where selection box SL205 is located to enclose character input box IW224. Namely, the input enabled character input box is character input box IW224. The received selection data is selection data MD800. Namely, the selected number is "4". The candidate data transmitted to portable terminal 500 is selection candidate character data table TD700 of FIG. 33.

In this case, character string display process TC is performed so that the character string "たろう" is displayed in character input box IW224. Namely, the characters are input in the input enabled character input box. Further, storage unit 620 stores the character string "たろう" in association with input box ID "TX04" for identifying character input box IW224.

Then, character input process TC is ended, the flow returns to control signal process TC of FIG. 30 and step S141 is performed again.

In character input process MC, the flow proceeds to step S235C after step S234C. In step S235C, RC mode setting process M is performed. RC mode setting process M is similar to RC mode setting process M in step S231 of FIG. 12, and the detailed description thereof will not be repeated. Step S211 is then performed again.

A description will now be given of a process performed when the determination in step S233C is NO. When the determination in step S233C is NO, the flow proceeds to step S233CD.

In step S233CD, a process similar to the one in step S221C is performed, and the detailed description thereof will not be repeated. If YES in step S233CD, control unit 510 increments the value of counter K by one, and step S221CD is performed again. If NO in step S233CD, step S233C is performed again.

Here, character input manipulation M is performed, and control unit 510 increments the value of counter K by one, and step S221CD is performed again. It is supposed that character input manipulation M performed here is the manipulation of pressing character button 9B of FIG. 3 that is a valid character button. In this case, character input manipulation M is the manipulation performed to input the hiragana letter "ら". As this process is performed, the value indicated by counter K is "2". In this case, two characters can be displayed in character input region MR320.

In step S221CD, a process similar to the above-described one is performed, and the detailed description thereof will not be repeated. Here, the hiragana letter "た" is displayed in character input region MR320 displayed on display unit 530. In this case, hiragana letters "たら" are displayed in character input region MR320.

In step S221CE, a process similar to the above-described one is performed, and the detailed description thereof will not be repeated. Here, the first character input manipulation M used as a reference when control unit 510 determines whether or not a predetermined time has elapsed is character input manipulation M performed after step S232C. Here, the predetermined time has not elapsed, and step S221C is performed again.

It is supposed that character input manipulation M of pressing character button 9B of FIG. 3 that is a valid character button is performed multiple times, and steps S221C and S221CD are performed multiple times. It is supposed that these processes are performed so that the last letter "ら" of the hiragana letters "たら" is changed and accordingly the hiragana letters "たろ" are displayed in character input region MR320.

Then, determination in step S221CE is YES, and the flow proceeds to step S224. Here, the confirmed characters are hiragana letters "たろ".

In step S224, a process similar to the one as described in connection with the first embodiment is performed, and the detailed description thereof will not be repeated.

In step S225C, a process similar to the above-described one is performed, and the detailed description thereof will not be repeated.

In step S226C, a process similar to the above-described one is performed, and the detailed description thereof will not be repeated. This process is performed so that input character data MD600A as described below is transmitted to data processor 600 identified by device ID "11TA".

FIG. 36 shows exemplary input character data MD600A. Referring to FIG. 36, each item of input character data MD600A is similar to the corresponding item in input character data MD600 of FIG. 32, and the detailed description thereof will not be repeated.

Referring again to FIG. 31, in character input process TC, a process similar to the above-described one is performed in step S251C, and the detailed description thereof will not be repeated. Here, input character data MD600A is received, and the flow proceeds to step S252C.

In step S252C, a process similar to the above-described one is performed, and the detailed description thereof will not be repeated.

In step S253C, a process similar to the above-described one is performed, and the detailed description thereof will not be repeated.

In step S254C, a process similar to the above-described one is performed, and the detailed description thereof will not be repeated. The input character data received here is input character data MD600A. It is supposed that storage unit 620 stores a plurality of selection candidate character strings each having the leading letters that are the input characters "たろ" shown in input character data MD600A. In this case, the determination in step S254C is YES, and the flow proceeds to step S255C. In this case, a plurality of selection candidate character strings stored in storage unit 620 and each including the input characters "たろ" as the leading characters are the character strings retrieved by control unit 610.

In step S255C, a process similar to the above-described one is performed, and the detailed description thereof will not be repeated. This process is performed so that a selection candidate character data table TD700A as described below is transmitted as candidate data to portable terminal 500.

FIG. 37 shows an exemplary selection candidate character data table TD700A. Referring to FIG. 37, each item in selection candidate character data table TD700A is similar to the corresponding item in selection candidate character data table TD700 of FIG. 33, and the detailed description thereof will not be repeated.

Referring again to FIG. 31, in character input process MC, step S231C is performed.

In step S231C, a process similar to the above-described one is performed, and the detailed description thereof will not be repeated. Here, selection candidate character data table TD700A is received as the candidate data, and the flow proceeds to step S232C.

In step S232C, a process similar to the above-described one is performed, and the detailed description thereof will not be repeated. This process is performed so that display unit 530 displays a character input image MG300B as described below. Then, step S232C is ended.

Figure 38:
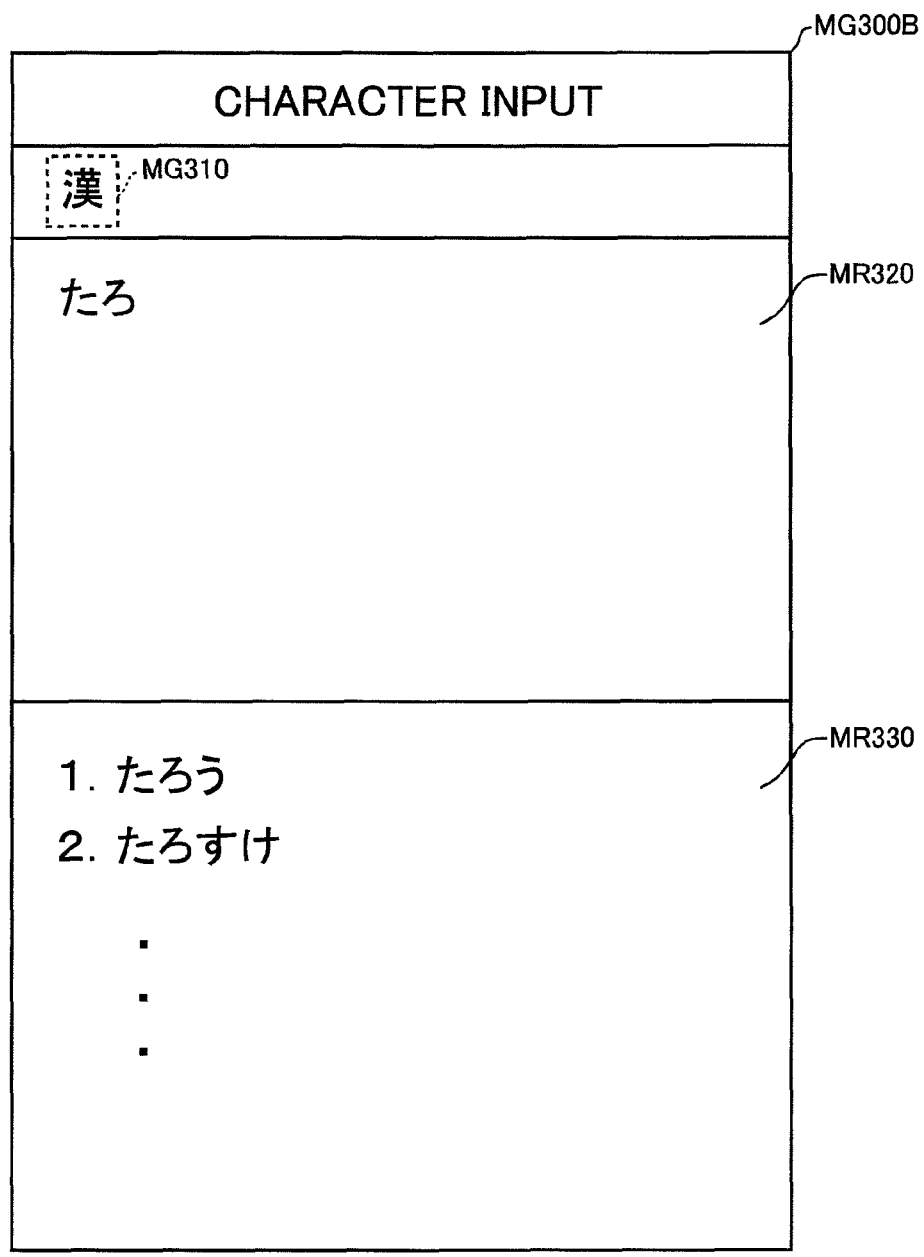
FIG. 38 shows an exemplary character input image.

FIG. 38 shows an exemplary character input image MG300B. Referring to FIG. 38, character input image MG300B differs from character input image MG300A of FIG. 34 in that selection candidate character strings shown in selection candidate character data table TD700A as well as the character string numbers corresponding to the selection candidate character strings respectively are displayed in selection candidate character string display region MR330. Character input image MG300B is similar to character input image MG300A in other respects, and the detailed description thereof will not be repeated. In this case, the selection candidate character strings each including the two characters as input are displayed. Therefore, as compared with the case where the selection candidate character strings each including one character as input are displayed like character input image MG300A of FIG. 34, the probability that a character string as desired by a user is displayed is higher.

Referring again to FIG. 31, a process similar to the above-described one is performed in step S233C, and the detailed description thereof will not be repeated. Here, selecting manipulation M is performed, and control unit 510 sets the value of counter K to "1" and the flow proceeds to step S234C. It is supposed that selecting manipulation M as performed includes the manipulation of pressing function button 542A set to function as the selection mode setting button and the manipulation to input the number "1" while portable terminal 500 is in the character string selection mode.

In step S234C, a process similar to the above-described one is performed, and the detailed description thereof will not be repeated. This process is performed so that selection data corresponding to selection data MD800 of FIG. 35 in which the selected number is "1" is transmitted to data processor 600.

In character input process TC, steps S256C, S257C and S258C are performed similarly to the above described ones. These steps are performed so that the character string "たろう" is displayed in character input box IW224.

Character input manipulation M for which the determination is made in steps S221C and S233CD may be the manipulation of deleting or changing a part of a plurality of characters displayed in character input region MR320. In this case, after the determination YES is made in step S221CE, step S226 is performed, so that the input characters as changed are transmitted to data processor 600. Steps S251C, S252C, S253C, S254C, and S255C as described above are then performed so that control unit 610 transmits to portable terminal 500 the selection candidate character data table that is the candidate data showing a plurality of selection candidate character strings each having the changed input character as the leading character.

Steps S231C and S232C as described above are then performed. Namely, at portable terminal 500, each time a part of a plurality of characters having been input is deleted or changed, a plurality of selection candidate character strings including the changed character are displayed on display unit 530. Then, steps S233C, S234C, S256C, S257C, and S258C as described above are performed. These steps are performed so that, even when a part of a plurality of characters having been input is deleted or changed, selection candidate characters including the changed character are selected, and the selection candidate characters selected and including the changed character can be displayed in a character input box displayed on display unit 630.

According to the present embodiment as heretofore described, when a character input box displayed on display unit 630 of data processor 600 is set to the input enabled state, the type of characters permitted to be input to the character input box (permitted character type) is transmitted to portable terminal 500.

A character is then input by means of portable terminal 500, and the character as input (input character) is transmitted to data processor 600.

Data processor 600 determines whether or not storage unit 620 stores a selection candidate character string. The selection candidate character string is a character string in which the leading character is the input character shown in the received input character data and all characters of the candidate character string are of the same type as the permitted character type shown in the input box data included in the transmitted character string request data. In the case where one or more selection candidate character strings are present, the one or more selection candidate character strings and the character string numbers identifying the one or more selection candidate character strings respectively are transmitted to portable terminal 500.

At portable terminal 500, the received one or more selection candidate character strings and the character string numbers identifying the one or more selection candidate character strings respectively are displayed on display unit 530 of portable terminal 500 manipulated by the user.

Therefore, in the case where a user's desired character string is included in one or more selection candidate character strings including the character input by means of portable terminal 500 and displayed on display unit 530, it is unnecessary to perform the manipulation to input the desired character string.

With the simple manipulation of inputting the number for specifying the desired character string by means of portable terminal 500, the desired selection candidate character string can be efficiently input to data processor 600. Accordingly, the character string can be input efficiently.

Further, in the present embodiment, as the number of characters input by means of portable terminal 500 is larger, it is more likely that a desired character string and a character string closer to the desired character string are displayed on display unit 530. Namely, as the number of characters input by means of portable terminal 500 is larger, it is more probable that a desired character string is displayed on display unit 530. Accordingly, as the number of characters input by means of portable terminal 500 is larger, it is more probable that the manipulation of inputting a desired character string is unnecessary.

The simple manipulation of inputting the number for specifying the desired character string by means of portable terminal 500 can be used to more efficiently input the desired selection candidate character string to data processor 600. Accordingly, the character string can be input efficiently.

Further, in the present embodiment, it is unnecessary to store in storage unit 520 of portable terminal 500 a large number of character strings including characters input by means of portable terminal 500, and therefore, the storage area of storage unit 520 can be effectively used for other purposes.

Further, in the present embodiment, the processes described in connection with the first embodiment are performed as well. Therefore, the present embodiment also achieves the effects of the first embodiment. Specifically, the effect is achieved that a character of the type permitted to be input to an input enabled character input box can be easily input. The effect is also achieved that a character of the type permitted to be input to an input enabled character input box can be input even when such a character cannot be directly input by means of portable terminal 500. The effect is further achieved that a received character can be prevented from being input to a character input box to which the received character should not be input.

Fifth Embodiment

A description will now be given of another example of the process in which portable terminal 500 uses a character string that has been input once.

A network system of the present embodiment is similar to network system 1000 of the first embodiment, and the detailed description thereof will not be repeated. Portable terminal 500 and data processor 600 are configured similarly to those described in connection with the first embodiment, and the detailed description thereof will not be repeated.

In the present embodiment, while portable terminal 500 is in the RC mode, manipulation determination process M is performed at portable terminal 500. Manipulation determination process M is performed independently of other processes. Further, in the present embodiment, a control signal process TD as described below is performed at data processor 600 independently of other processes.

It is supposed here that display unit 530 of portable terminal 500 displays control image MG100A of FIG. 7. Namely, the state of portable terminal 500 is State MA. It is further supposed that, in State MA, buttons such as direction buttons 541A, 541B, 541C, 541D and enter button 541E are manipulated so that display unit 630 of data processor 600 displays web page image G200 of FIG. 8.

Here, control unit 610 of data processor 600 obtains the input box associated information, uses the obtained input box associated information to generate an input box data table, and causes storage unit 620 to store the generated input box data table, in a similar manner to the one described in connection with the second embodiment. It is supposed that, in the case where display unit 630 displays web page image G200, the generated input box data table is input box data table TD100A of FIG. 17. In this case, storage unit 620 stores input box data table TD100A.

Figure 39:
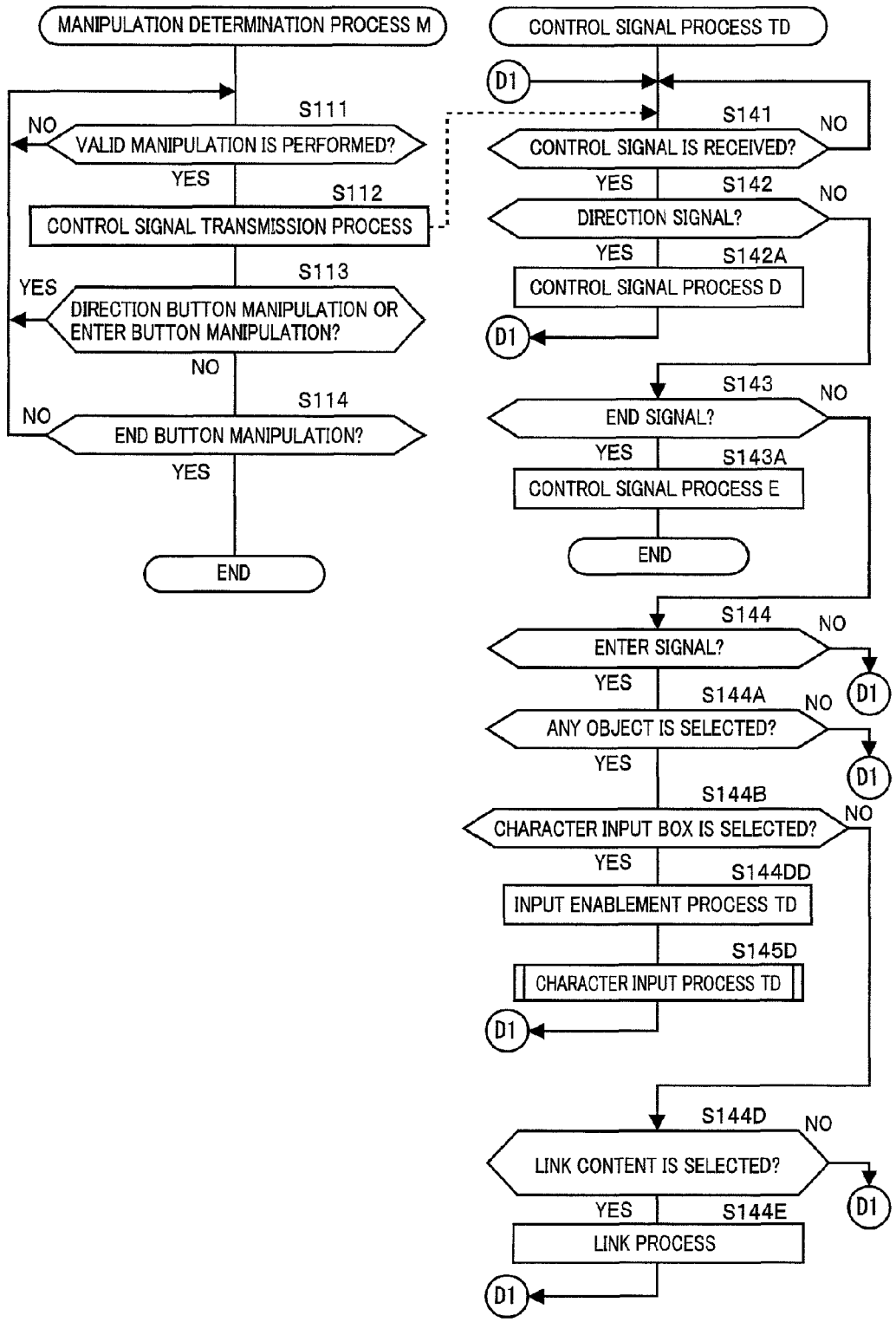
FIG. 39 is a flowchart for a manipulation determination process M and a control signal process TD.

FIG. 39 is a flowchart for manipulation determination process M and control signal process TD. In FIG. 39, a process of the same step number as that of FIG. 11 is performed similarly to the process described in connection with FIG. 11, and the detailed description thereof will not be repeated. In the following, processes different from those of FIG. 11 will mainly be described.

Referring to FIG. 39, manipulation determination process M is similar to manipulation determination process M of FIG. 11 described in connection with the first embodiment, and the detailed description thereof will not be repeated. Control signal process TD differs from control signal process T of FIG. 11 in that step S144DD is performed instead of step S144C, and step S145D is performed instead of step S145. Control signal process TD is similar to control signal process T in other respects, and the detailed description thereof will not be repeated.

It is supposed here that the ENTER-RC signal serving as a control signal and including device ID "11MA" is transmitted from portable terminal 500 to data processor 600. Display unit 630 of data processor 600 displays web page image G200 of FIG. 8. Namely, character input box IW212 is selected.

In this case, the determination in step S144B of control signal process TD is YES, and the flow proceeds to step S144DD.

In step S144DD, an input enablement process TD is performed. In input enablement process TD, control unit 610 sets each of all character input boxes displayed on display unit 630 to the state where a character can be input in the character input box (hereinafter also referred to as input enabled state).

Here, display unit 630 displays web page image G200 of FIG. 8. In this case, all character input boxes displayed in web page image G200 are set to the input enabled state. The flow then proceeds to step S145D.

In step S145D, a character input process TD is performed. Character input process TD is performed while a character input box displayed on display unit 630 is in the input enabled state. The character input box in the input enabled state is an input box set to the input enabled state. At portable terminal 500, a character input process MD is performed independently of other processes as follows.

Figure 40:
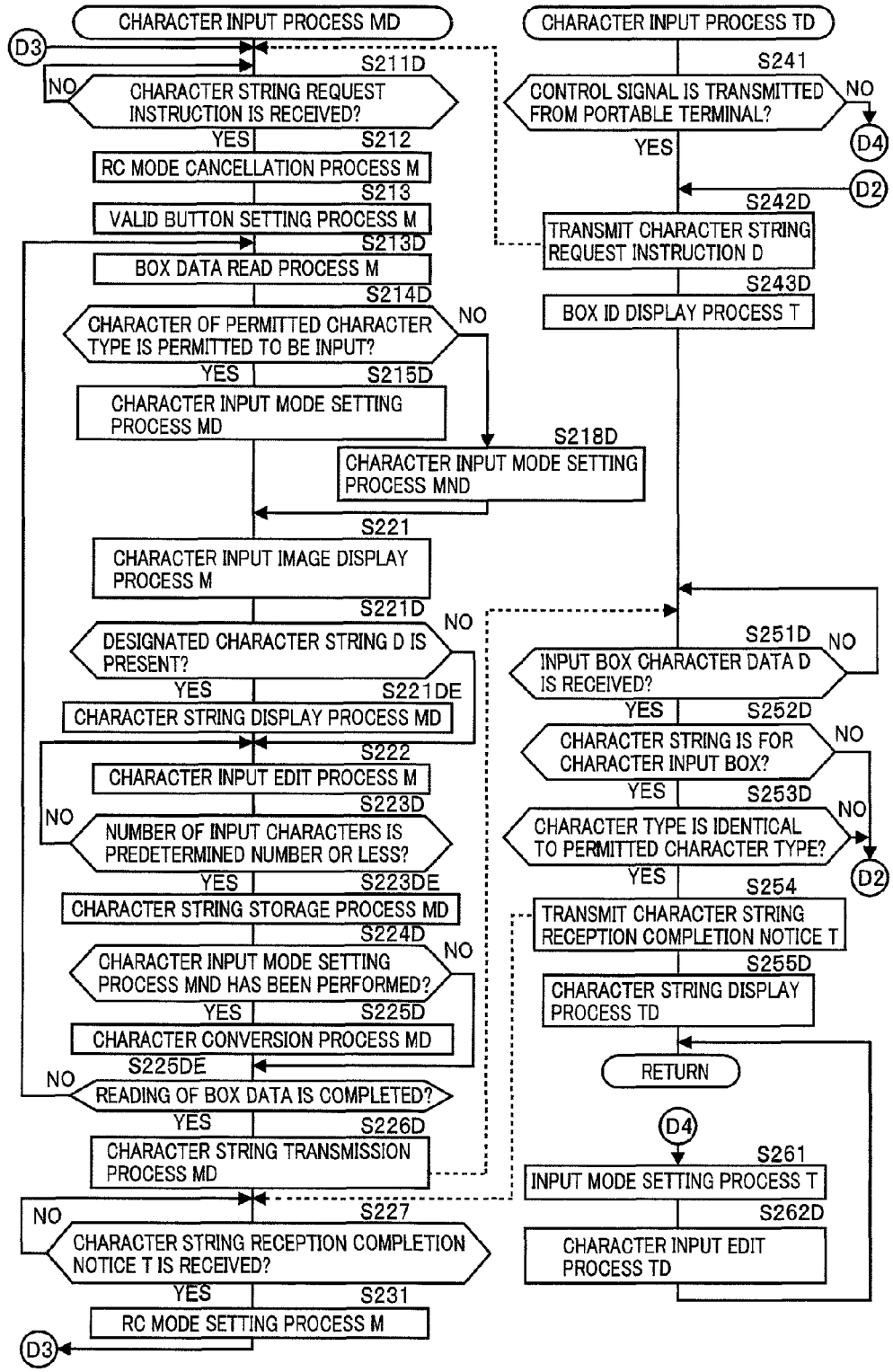
FIG. 40 is a flowchart for a character input process MD and a character input process TD.

FIG. 40 is a flowchart for character input process MD and character input process TD. In FIG. 40, a process of the same step number as that of FIG. 12 is performed similarly to the process described in connection with FIG. 12, and the detailed description thereof will not be repeated. In the following, processes different from those of FIG. 12 will mainly be described.

In step S241, a process similar to the one described in connection with the first embodiment is performed, and the detailed description thereof will not be repeated. If YES in step S241, the flow proceeds to step S242D. If NO in step S241, the flow proceeds to step S261.

In step S242D, control unit 610 uses communication unit 660 to transmit to portable terminal 500 character string request data D serving as character string request instruction D that is an instruction to request a character string. Character string request data D as transmitted includes device ID "11TA" of the transmitter device itself and input box data D. Input box data D shows an input box ID identifying an input enabled character input box and input box associated information associated with the input box ID in the input box data table. Character string request data D serving as character string request instruction D is transmitted, and step S242D is ended.

In the case where the determination in step S252D or step S253D of FIG. 40 as described later is NO and step S242D is performed again, control unit 610 transmits in step S242D character string request data D including an error message in addition to the device ID of the transmitter device and input box data D, to portable terminal 500. The error message is for example as follows. "Error occurred. Please perform manipulation again."

Here, display unit 630 displays web page image G200 of FIG. 8. Further, the above-described input enablement process TD in step S144DD is performed so that character input boxes IW212, IW214, IW222, IW224, IW232, IW234, IW236, IW242, IW244, IW252, IW262, IW264, IW266, IW272, and IW282 are in the input enabled state. The input box data table used in the process of step S242D is input box data table TD100A of FIG. 17. In this case, input box data D included in character string request data D is an input box data table TD200D as follows.

FIG. 41 shows an exemplary input box data table TD200D. Input box data table TD200D includes a plurality of input box data pieces. Referring to FIG. 41, in input box data table TD200D, "number" refers to the number for identifying input box data. The items except for the item "number" in input box data table TD200D are similar to the corresponding ones in input box data table TD100A of FIG. 17, and the detailed description thereof will not be repeated.

Referring again to FIG. 40, in character input process TD, the flow proceeds to step S243D after step S242D.

In step S243D, a box ID display process T is performed. In box ID display process T, control unit 610 uses VDP 632 to display respective input IDs for identifying a plurality of input enabled character input boxes, respectively, as displayed on display unit 630, in association with the corresponding character input boxes. Step S243D is then ended.

Before box ID display process T is performed, display unit 630 displays web page image G200 of FIG. 8. In this case, box ID display process T is performed so that web page image G200 is changed to a web page image G200N as follows.

FIG. 42 shows an exemplary web page image G200N. Referring to FIG. 42, web page image G200N differs from web page image G200 of FIG. 8 in that input box IDs for identifying character input boxes IW212, IW214, IW222, IW224, IW232, IW234, IW236, IW242, IW244, IW252, IW262, IW264, IW266, IW272, and IW282 respectively are displayed respectively above the associated input boxes. Web page image G200N is similar to web page image G200 in other respects, and the detailed description thereof will not be repeated.

Referring again to FIG. 40, in character input process MD, step S211D is performed first.

In step S211D, control unit 510 determines whether or not character string request data D serving as character string request instruction D is received. If YES in step S211D, the flow proceeds to step S212. If NO in step S211D, step S211D is performed again. Here, character string request data D serving as character string request instruction D is received, and the flow proceeds to step S212.

In the case where received character string request data D includes an error message, control unit 510 causes display unit 530 to display the error message for a predetermined time (two seconds for example). The flow then proceeds to step S212.

In step S212, a process similar to the one described in connection with the first embodiment is performed, and the detailed description thereof will not be repeated. This process is performed so that the operation mode of portable terminal 500 is changed from the RC mode to the normal mode.

In step S213, a process similar to the one described in connection with the first embodiment is performed, and the detailed description thereof will not be repeated. The flow then proceeds to step S213D.

It is supposed here that storage unit 520 stores a counter S. Counter S is used for counting the number. The initial value of counter S is "1".

In step S213D, a box data read process M is performed. In box data read process M, control unit 510 reads the input box data having the number identical to the value indicated by counter S and included in input box data D included in received character string request data D. It is supposed here that input box data D included in character string request data D is an input box data table TD200D of FIG. 41, and the value indicated by counter S is "1". In this case, the input box data with the number "1" included in input box data table TD200D is read. In the following, the input box data read in box data read process M is also referred to as read input box data. The flow then proceeds to step S214D.

In step S214D, it is determined whether or not a character of the permitted character type is permitted to be input. Specifically, control unit 510 determines whether or not the permitted character type shown in the read input box data is input permitted character type M. Input permitted character type M as described above is the type of characters permitted to be input to portable terminal 500. Input permitted character type M includes, by way of example, kanji, hiragana, full width katakana, half width alphabet uppercase, half width alphabet lowercase, and half width numeral.

If YES in step S214D, the flow proceeds to step S215D. If NO in step S214D, the flow proceeds to step S218D.

In step S215D, a character input mode setting process MD is performed. In character input mode setting process MD, a process similar to that of step S215 of FIG. 12 is performed except that the input box data included in the received character string request data is replaced with the read input box data, and the detailed description thereof will not be repeated.

In step S218D, a character input mode setting process MND is performed. In character input mode setting process MND, a process similar to that of step S218 of FIG. 12 is performed except that the input box data included in the received character string request data is replaced with the read input box data, and the detailed description thereof will not be repeated.

In step S221, a process similar to the one described in connection with the first embodiment is performed, and the detailed description thereof will not be repeated. This process is performed so that character input image MG300 of FIG. 14 where character input image N without character string "あ…" is shown is displayed. The flow then proceeds to step S221D.

In step S221D, it is determined whether or not there is a designated character string D. Here, designated character string D is a character string of the character string type shown in the read input box data. Namely, designated character string D is a character string of the character string type requested to be input in the character input box identified by the input box ID shown in the read input box data. Specifically, control unit 510 determines whether or not storage unit 520 stores designated character string D. In the case where step S221D is performed for the first time, designated character string D is not stored in storage unit 520.

If YES in step S221D, control unit 510 causes display unit 530 to display a message DE as described later for a predetermined time, and the flow proceeds to step S221DE as described later. If NO in step S221D, control unit 510 causes display unit 530 to display a message DF for a predetermined time, and the flow proceeds to step S222.

Message DF is a message for inviting a user to input a character string in the character input box identified by the input box ID shown in the read input box data. In the case for example where the read input box data is the input box data with the number "1" included in input box data table TD200D of FIG. 41, message DF is, for example, "please input a character string to be input to the character input box of input box ID "TX01" among 15 character input boxes".

It is supposed here that storage unit 520 does not store designated character string D, and control unit 510 causes display unit 530 to display message DF for a predetermined time (two seconds for example), and the flow proceeds to step S222.

In step S222, a process similar to the one described in connection with the first embodiment is performed, and the detailed description thereof will not be repeated. The flow then proceeds to step S223D.

In step S223D, a process similar to the one described in connection with step S223 of FIG. 12 is performed except that the input box data included in the received character string request data is replaced with the read input box data, and the detailed description thereof will not be repeated. The flow then proceeds to step S223DE.

In step S223DE, a character string storage process MD is performed. In character string storage process MD, control unit 510 causes storage unit 520 to store character string data in which the character string type shown in the read input box data is associated with the input and confirmed character string. When step S223DE is performed for the first time, storage unit 520 stores a character string data table including one character string data piece.

In the case where storage unit 520 has already stored a character string data table, control unit 510 adds the character string data to the character string data table stored in storage unit 520.

In the case where storage unit 520 stores a character string data table showing the character string type indicated in the read input box data, control unit 510 replaces the confirmed character string (input character string) shown in the character string data table and associated with the character string type indicated in the read input box data, with the newly input and confirmed character string.

It is supposed here that the input and confirmed character string is "たろう" for example, and the read input box data is, for example, the input box data with the number "4" included in input box data table TD200D of FIG. 41. In this case, storage unit 520 stores character string data table MD400B of FIG. 22. Step S223DE is then ended, and the flow proceeds to step S224D.

In step S224D, control unit 510 determines whether or not a character input mode setting process MND is performed. Namely, it is determined whether or not character input mode setting process MND is performed in response to the fact that the permitted character type shown in the read input box data is not input permitted character type M but input inhibited character type M. If YES instep S224D, the flow proceeds to step S225D. If NO in step S224D, the flow proceeds to step S226D.

In step S225D, a character conversion process MD is performed. In character conversion process MD, a process similar to the one in step S225 of FIG. 12 is performed except that character input mode setting process MN and the input box data included in the received character string request data are replaced respectively with character input mode setting process MND and the read input box data, and the detailed description thereof will not be repeated.

In character conversion process MD, control unit 510 further replaces the input character string (half width numeral character string for example) shown in the character string data corresponding to the read input box data and included in the character string data table stored in storage unit 520 by above-described character string storage process MD, with the confirmed character string of the permitted character type as converted (full width numeral character string for example). The flow then proceeds to step S225DE.

In step S225DE, it is determined whether or not reading of the box data is completed. Specifically, control unit 510 determines whether or not all input box data pieces included in input box data D included in received character string request data D have been read. If YES in step S2225DE, control unit 510 sets the value of counter S to "1" and the flow proceeds to step S226D. If NO in step S225DE, control unit 510 increments the value of counter S by one, and step S213D is performed again.

Here, input box data D included in character string request data D is input box data table TD200D of FIG. 41. It is supposed that reading of all input box data pieces included in input box data table TD200D is not completed. In this case, the determination in step S225DE is NO, control unit 510 increments the value of counter S by one, and step S213D is performed again.

Until the determination of YES is made in step S225DE, above-described processes in steps S213D to S225D are performed repeatedly. These processes are performed so that storage unit 520 of portable terminal 500 stores character string data table MD400A of FIG. 23.

If YES in step S225DE, control unit 510 sets the value of counter S to "1", and the flow proceeds to step S226D.

In step S226D, a character string transmission process MD is performed. In character string transmission process MD, control unit 510 uses communication unit 560 to transmit input box character data D to the device identified by the device ID included in received character string request data D. Here, input box character data D is data showing the character string to be input to the input enabled character input box identified by the input box ID shown in each of a plurality of input box data pieces and included in input box data D included in the received character string request data D.

Here, input box character data D as transmitted is data showing: the input box ID that is included in input box data D included in received character string request data D and shown in each of a plurality of input box data pieces; the input character string stored in storage unit 520 in association with the character string type associated with the input box ID; and the data size of the input character string.

Here, input box data D included in received character string request data D is input box data table TD200D of FIG. 41. In this case, the input character strings stored in storage unit 520 in association with the character string types corresponding to respective input box IDs shown in a plurality of input box data pieces respectively included in input box data table TD200D that is input box data D are the input character strings shown in character string data table MD400A of FIG. 23. The device ID included in character string request data D is "11TA".

In this case, input box character data D is an input box character data table MD300D as follows. Input box character data table MD300D that is input box character data D is transmitted to data processor 600 identified by device ID "11TA". Step S226D is then ended.

FIG. 43 shows an exemplary input box character data table MD300D. Input box character data table MD300D includes a plurality of input box character data pieces. Referring to FIG. 43, in input box character data table MD300D, "number" is the number for identifying an input box character data piece. Items other than the item "number" in input box character data table MD300D are similar to those of input box character data MD300 of FIG. 15, and the detailed description thereof will not be repeated.

Referring again to FIG. 40, in character input process TD, the flow proceeds to step S251D after step S243D.

In step S251D, control unit 610 determines whether or not input box character data D is received. If YES in step S251D, the flow proceeds to step S252D. If NO in step S251D, step S251D is performed again. Here, input box character data table MD300D of FIG. 43 that is input box character data D is received, and the flow proceeds to step S252D.

In step S252D, it is determined whether or not a plurality of input character strings shown respectively in a plurality of input box character data pieces included in received input box character data D are character strings to be input to a plurality of input enabled character input boxes, respectively.

Specifically, control unit 610 determines whether or not the input box ID shown in each of a plurality of input box character data pieces included in received input box character data D is identical to the input box ID shown in a corresponding one of a plurality of input box data pieces included in input box data D included in character string request data D transmitted to portable terminal 500. If YES in step S252D, the flow proceeds to step S253D. If NO in step S252D, step S242D is performed again.

Here, received input box character data D is input box character data table MD300D of FIG. 43. Input box data D included in character string request data D transmitted to portable terminal 500 is input box data table TD200D of FIG. 41. In this case, the determination in step S252D is YES, and the flow proceeds to step S253D.

In step S253D, control unit 610 determines whether or not the type of characters of the input character string shown in each of a plurality of input box character data pieces included in received input box character data D is identical to the permitted character type shown in a corresponding one of a plurality of input box data pieces included in input box data D included in character string request data D transmitted to portable terminal 500. If YES in step S253D, the flow proceeds to step S254. If NO in step S253D, step S242D is performed again.

Here, received input box character data D is input box character data table MD300D. Input box data D included in character string request data D transmitted to portable terminal 500 is input box data table TD200D of FIG. 41. In this case, the determination in step S253D is YES, and the flow proceeds to step S254.

In step S254, a process similar to the one described in connection with the first embodiment is performed, and the detailed description thereof will not be repeated. This process is performed so that character string reception completion notice T is transmitted to portable terminal 500. Character string reception completion notice T is, as described above, a notice that reception of the character strings to be input to the input enabled character input boxes is completed. Step S254 is then ended.

In character input process MD, the flow proceeds to step S227 after step S226D. Steps S227 and S231 are similar to those described in connection with the first embodiment, and the detailed description thereof will not be repeated. After step S231, step S211D is performed again.

In character input process TD, the flow proceeds to step S255D after step S254. In step S255D, a character string display process TD is performed. In character string display process TD, control unit 610 uses VDP 632 to cause the input character strings shown respectively in a plurality of input box character data pieces included in received input box character data D to be displayed in the input enabled character input boxes in which the input character strings are requested to be input. Control unit 610 also causes storage unit 620 to store the input character strings shown respectively in a plurality of input box character data pieces included in received input box character data D, in association with the input enabled character input boxes in which the input character strings are requested to be input.

Here, display unit 630 displays web page image G200N of FIG. 42, and character input boxes IW212, IW214, IW222, IW224, IW232, IW234, IW236, IW242, IW244, IW252, IW262, IW264, IW266, IW272, and IW282 displayed in web page image G200N are in the input enabled state.

Further, received input box character data D is input box character data table MD300D of FIG. 43. In this case, character string display process TD is performed so that the character string "たろう" for example is displayed in character input box IW224 identified by input box ID "TX04" that is shown in input box character data table MD300D. Storage unit 620 stores the character string "たろう" in association with input box ID "TX04" for identifying character input box IW224.

Likewise, in each of character input boxes IW212, IW214, IW222, IW232, IW234, IW236, IW242, IW244, IW252, IW262, IW264, IW266, IW272, and IW282, the corresponding input character string is displayed. These processes are performed so that web page image G200N displayed on display unit 630 is changed to a web page image G200NA as follows.

In other words, input character strings are input respectively to a plurality of input enabled character input boxes at a time. Then, this character input process TD is ended, the flow returns to control signal process TD of FIG. 39, and step S141 is performed again.

FIG. 44 shows an exemplary web page image G200NA. Referring to FIG. 44, web page image G200NA differs from web page image G200N in that the character strings are input respectively to character input boxes IW212, IW214, IW222, IW224, IW232, IW234, IW236, IW242, IW244, IW252, IW262, IW264, IW266, IW272, and IW282. Web page image G200NA is similar to web page image G200N in other respects, and the detailed description thereof will not be repeated.

A description will now be given of a process performed in the case where the determination in step S241 is NO. It is supposed here that the determination in step S241 is NO because data processor 600 receives from wireless keyboard 400 the RC signal serving as a control signal and including device ID "11KB". When the determination in step S241 is NO, the flow proceeds to step S261.

In step S261, a process similar to the one described in connection with the first embodiment is performed, and the detailed description thereof will not be repeated.

In step S262D, a character input edit process TD is performed. It is supposed here that a plurality of character input boxes displayed on display unit 630 are in the input enabled state. In the following, a character input box which is one of a plurality of character input boxes in the input enabled state and in which character data is to be displayed is also referred to as target character display box. The target character input box is determined in advance.

In character input edit process TD, control unit 610 uses VDP 632 to display, each time character data is received in response to user's manipulation of wireless keyboard 400, the character shown in the received character data, in the target character display box. Wireless keyboard 400 may be manipulated to change the target character display box.

In character input edit process TD, an input ending determination process TD is also performed independently of other processes. In input ending determination process TD, control unit 610 determines whether or not input ending manipulation T is performed. Input ending manipulation T is the manipulation of wireless keyboard 400 for ending the process of inputting characters.

When input ending manipulation T is performed, control unit 610 ends character input edit process TD. This character input process TD is then ended, the flow returns to control signal process TD of FIG. 39 and step S141 is performed again.

Next, it is supposed that character input process MD of FIG. 40 as described above is performed multiple times so that storage unit 520 of portable terminal 500 stores character string data table MD400A of FIG. 23. A description will now be given of above-described processes of FIGS. 39 and 40 performed in this case.

It is supposed here that display unit 530 of portable terminal 500 displays control image MG100A of FIG. 7. Namely, the state of portable terminal 500 is State MA. In State MA, buttons such as direction buttons 541A, 541B, 541C, 541D and enter button 541E are manipulated so that web page image G200 of FIG. 8 is displayed on display unit 630 of data processor 600. Further, control unit 610 generates an input box data table in a similar manner to the one described in connection with the second embodiment, so that input box data table TD100A of FIG. 17 is stored in storage unit 620.

Then, above-described manipulation determination process M and control signal process TD of FIG. 39 are performed so that all character input boxes shown in web page image G200 of FIG. 8 are set to the input enabled state.

Then, steps S241 and S242D in character input process TD of FIG. 40 are performed so that character string request data D serving as character string request instruction D is transmitted to portable terminal 500. Further, step S243D is performed so that web page image G200N of FIG. 42 is displayed on display unit 630.

In step S211D of character input process MD, character string request data D serving as character string request instruction D is received, and the flow proceeds to step S212. Then, steps S212 and S213 are performed as described above.

In step S213D, a process similar to the above-described one is performed, and the detailed description thereof will not be repeated. It is supposed here that input box data D included in received character string request data D is input box data table TD200D of FIG. 41, and the value indicated by counter S is "1". In this case, the input box data with the number "1" included in input box data table TD200D is read. Namely, the input box data with the number "1" is the read input box data.

Then, step S214D is performed, step S215D or step S218D is performed, and thereafter the flow proceeds to step S221.

In step S221, a process similar to the one described in connection with the first embodiment is performed, and the detailed description thereof will not be repeated. This process is performed so that character input image MG300 of FIG. 14 where character input image N without character string "あ…" is shown is displayed.

In step S221D, a process similar to the above-described one is performed, and the detailed description thereof will not be repeated. Here, the read input box data is for example the input box data with the number "1" included in input box data table TD200D. Further, storage unit 620 stores character string data table MD400A of FIG. 23.

In this case, designated character string D is kanji letters "秋春" in character string data table MD400A that is the input character string associated with the character string type (label "NAME-SEI") shown in the input box data of the number "1" included in input box data TD200D. In this case, it is determined that storage unit 520 stores designated character string D, and control unit 510 causes display unit 530 to display message DE for a predetermined time (two seconds for example), and the flow proceeds to step S221DE.

Message DE is a message that the character string to be input to the character input box identified by the input box ID shown in the read input box data table is displayed. When the read input box data is the input box data with the number "1" included in input box data table TD200D, for example, an example of message DE is as follows. "The character string to be input to the character input box with input box ID of "TX01" among 15 character input boxes has been input to this device. Therefore, the already input character string is displayed."

In step S221DE, a character string display process MD is performed. In character string display process MD, control unit 510 uses VDP 532 to display the input character string that is designated character string D in character input region MR320 displayed on display unit 530. When the input character string that is designated character string D is kanji letters "秋春", kanji letters "秋春" are displayed in character input region MR320.

In step S222, when the character confirmation manipulation is performed, the input character string that is designated character string D and displayed in character input region MR320 becomes the confirmed character string. In step S222, a user may press buttons such as direction buttons 541C, 541D and valid character buttons, as required, so as to edit the input character string that is designated character string D displayed in character input region MR320. In this case, the edited character string is the confirmed character string.

In step S223DE, a process similar to the above-described one is performed, and the detailed description thereof will not be repeated.

Then, step S224D is performed. Depending on the determination in step S224D, step S225D is also performed.

In step S225DE, a process similar to the above-described one is performed, and the detailed description thereof will not be repeated. Until the determination YES is made in step S225DE, steps S213D to S225D are repeatedly performed.

Since storage unit 520 of portable terminal 500 stores character string data table MD400A of FIG. 23, each time above-described steps S213D to S225D are performed, the determination in step S221D is YES, and step S221DE is performed so that the character string of the character string type requested to be input to the character input box is displayed in character input region MR320. Therefore, it is unnecessary for the user to input the character string of the character string type requested to be input to the character input box.

If YES in step S225DE, control unit 510 sets the value of counter S to "1" and the flow proceeds to step S226D.

In step S226D, a process similar to the above-described one is performed, and the detailed description thereof will not be repeated. This process is performed so that input box character data D is transmitted to data processor 600. Here, transmitted input box character data D is input box character data table MD300D of FIG. 43.

In character input process TD, step S251D is performed. Steps S251D, S252D, S253D, S254, and S255D are performed similarly to the above-described ones, and the detailed description thereof will not be repeated. These steps are performed so that web page image G200N of FIG. 42 displayed on display unit 630 is changed to web page image G200NA of FIG. 44. Namely the input character strings are input respectively to a plurality of input enabled character input boxes at a time.

According to the present embodiment as heretofore described, when a plurality of character input boxes displayed on display unit 630 of data processor 600 are set to the input enabled state, input box data D showing respective types of a plurality of character strings (character string types) that are requested to be input respectively to the plurality of character input boxes is transmitted to portable terminal 500. Transmitted input box data D includes a plurality of input box data pieces. These input box data pieces each show the character string type requested to be input to the associated character input box.

At portable terminal 500, a plurality of input box data pieces included in received input box data D are read one by one. At portable terminal 500, character string storage process MD is performed. Namely, storage unit 520 is caused to store the character string data in which the character string type shown in the input box data as read (read input box data) is associated with the confirmed character string that is the character string of this character string type and input by means of portable terminal 500. Character string storage process MD is performed each time the input box data piece is read.

Accordingly, the character string data pieces of the number equal to the number of input box data pieces included in input box data D are stored in storage unit 520. Namely, storage unit 520 stores the character strings of the character string types requested to be input to the character input boxes identified by respective input box IDs shown respectively in a plurality of input box data pieces included in input box data D. In other words, storage unit 520 stores the character strings of a plurality of character string types requested to be input to a plurality of character input boxes respectively associated respectively with a plurality of input box data pieces included in input box data D.

Further, at portable terminal 500, a plurality of input box data pieces included in received input box data D are read one by one. At portable terminal 500, it is determined whether or not storage unit 520 stores the character string (designated character string D) of the character string type shown in the input box data piece as read (read input box data). When storage unit 520 stores designated character string D, character string display process MD of displaying designated character string D on display unit 530 is performed. Character string display process MD is performed each time the input box data piece is read and it is determined that designated character string D is stored.

Portable terminal 500 transmits to data processor 600 the character strings of a plurality of character string types requested to be input respectively to a plurality of input enabled character input boxes. Then, the character strings of the character string types requested to be input are input at a time to a plurality of input enabled character input boxes respectively.

Therefore, in the case where the character strings of the character string types shown respectively in a plurality of input box data pieces included in received input box data D have been input at least once by means of portable terminal 500, a user can input the character strings respectively to a plurality of input enabled character input boxes at a time that are displayed at data processor 600, without the need to perform the manipulation of inputting the character strings.

In other words, according to the present embodiment, in the case where character strings are to be input to a plurality of character input boxes, the character strings can be more speedily input and the manipulation of inputting character strings by the user can be reduced to a large extent, as compared with the second embodiment.

Accordingly, the effect is achieved that a character string of the type requested to be input to at least one character input box of a plurality of input enabled character input boxes can be easily input.

Further, in the present embodiment, the processes described in connection with the first embodiment are performed as well. Therefore, the present embodiment also achieves the effects of the first embodiment. Specifically, the effect is achieved that a character of the type permitted to be input to an input enabled character input box can be easily input. The effect is also achieved that a character of the type permitted to be input to an input enabled character input box can be input even when such a character cannot be directly input by means of portable terminal 500. The effect is further achieved that a received character can be prevented from being input to a character input box to which the received character should not be input.

Functional Block Diagram

Figure 45:
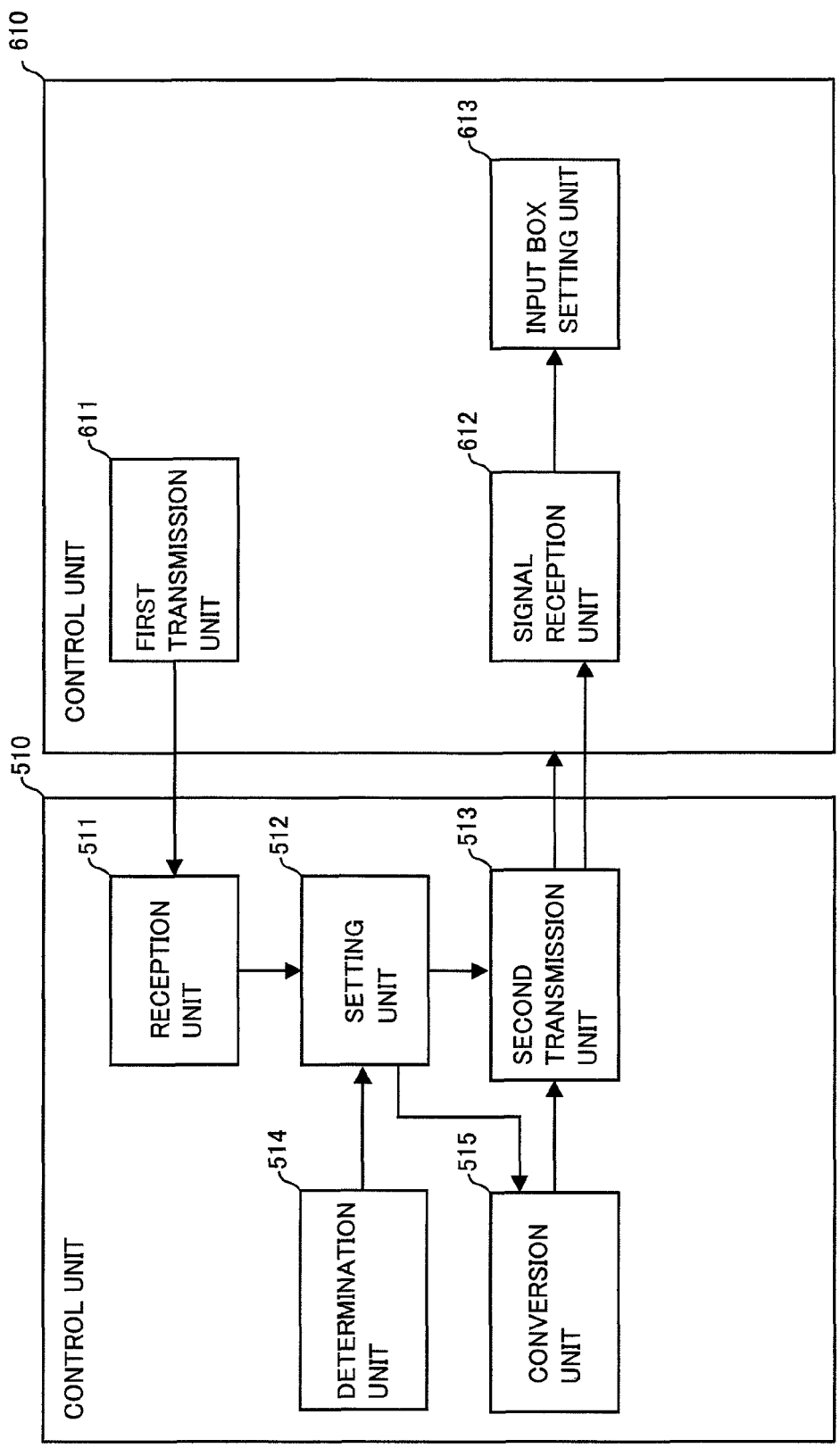
FIG. 45 is a functional block diagram of two different control units in a first embodiment.

FIG. 45 is a functional block diagram of control unit 510 and control unit 610 in the first embodiment. Referring to FIG. 45, control unit 510 includes a reception unit 511, a setting unit 512 and a second transmission unit 513. Control unit 610 includes a first transmission unit 611.

Here, display unit 630 displays one or more input boxes to which a character(s) is to be input. Further, storage unit 620 stores the input permitted character type that is the type of characters permitted to be input to each of one or more input boxes, in association with the corresponding input box. First transmission unit 611 transmits to portable terminal 500 the input permitted character type associated with an input box which is one of one or more input boxes displayed by display unit 630 and in which a character(s) can be input.

Reception unit 511 receives the input permitted character type transmitted from data processor 600. Setting unit 512 sets the type of characters to be input by input unit 540 to the input permitted character type. Display unit 530 displays a character(s) that is of the input permitted character type as set by setting unit 512 and is input by input unit 540. Second transmission unit 513 transmits the character(s) displayed by display unit 530 to data processor 600.

Control unit 610 further includes a signal reception unit 612 and an input box setting unit 613. Here, second transmission unit 513 transmits to data processor 600 a selection signal for selecting one input box from one or more input boxes. Signal reception unit 612 receives the selection signal. Input box setting unit 613 performs a setting process of setting the input box selected by the received selection signal from one or more input boxes to the state where characters can be input.

Control unit 510 further includes a determination unit 514 and a conversion unit 515. Determination unit 514 determines whether or not the received input permitted character type is a terminal input permitted character type, namely the type of characters that can be input by portable terminal 500. When determination unit 514 determines that the input permitted character type is not the terminal input permitted character type, setting unit 512 sets the type of characters to be input by input unit 540 to the terminal input permitted character type.

Conversion unit 515 converts the character that is of the terminal input permitted character type as set by setting unit 512 and is input by input unit 540 to the character of the received input permitted character type. Second transmission unit 513 transmits the character by conversion unit 515 to data processor 600.

All or a part of reception unit 511, setting unit 512, second transmission unit 513, determination unit 514, and conversion unit 515 included in control unit 510 may be configured by hardware. Further, all or a part of reception unit 511, setting unit 512, second transmission unit 513, determination unit 514, and conversion unit 515 may be a module(s) of a program executed by control unit 510.

Further, all or a part of first transmission unit 611, signal reception unit 612 and input box setting unit 613 included in control unit 610 may be configured by hardware. Further, all or a part of first transmission unit 611, signal reception unit 612 and input box setting unit 613 may be a module(s) of a program executed by control unit 610.

Further, storage unit 620, first transmission unit 611, reception unit 511, setting unit 512, second display unit 530, and second transmission unit 513 may be configured in the following manner.

Storage unit 620 stores the input data capacity that is the data size of characters that can be input to each of one or more input boxes, in association with the corresponding input box.

First transmission unit 611 transmits to portable terminal 500 the input data capacity associated with the input box in which characters can be input, among one or more input boxes displayed by first display unit 630. Reception unit 511 receives the input data capacity transmitted from data processor 600. Setting unit 512 sets the data size of characters to be input by input unit 540 to the input data capacity or less. Further, second display unit 530 displays a character(s) that is of the input data capacity or less as set by setting unit 512 and is input by input unit 540. Second transmission unit 513 transmits the character(s) displayed by second display unit 530 to data processor 600.

Figure 46:
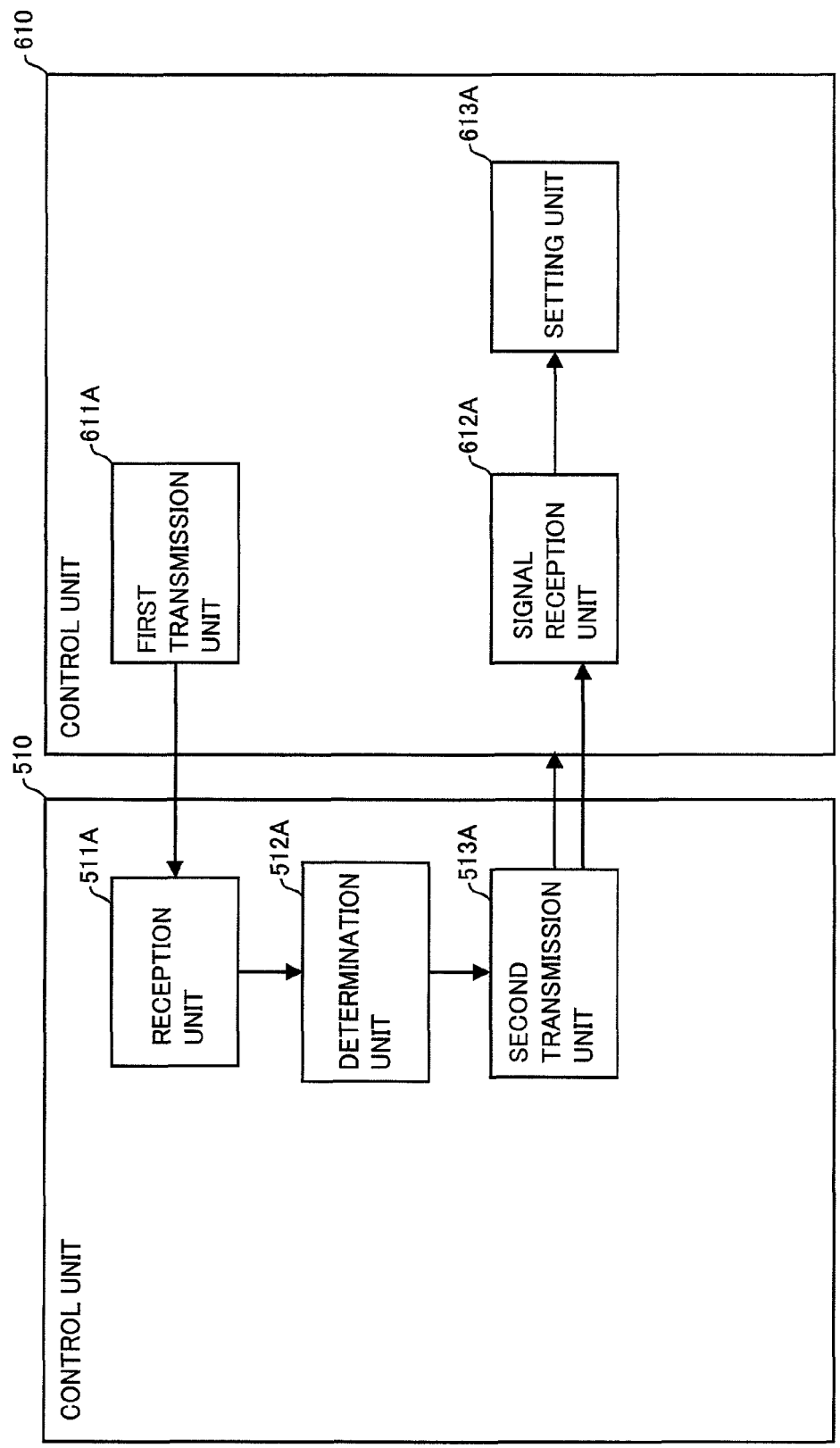
FIG. 46 is a functional block diagram of two different control units in a second embodiment.

FIG. 46 is a functional block diagram of control unit 510 and control unit 610 in the second embodiment. Referring to FIG. 46, control unit 510 includes a reception unit 511A, a determination unit 512A and a second transmission unit 513A. Control unit 610 includes a first transmission unit 611A.

Here, display unit 630 displays one or more input boxes to which a character(s) is to be input. Further, storage unit 620 stores the character string type that is the type of a character string requested to be input to each of one or more input boxes, in association with the corresponding input box. First transmission unit 611A transmits to portable terminal 500 the character string type associated with an input box which is one of one or more input boxes displayed by display unit 630 and in which a character(s) can be input.

Reception unit 511A receives the character string type transmitted from data processor 600. Storage unit 520 stores the received character string type and an input character string that is a character string input by input unit 540, in association with each other. Determination unit 512A determines whether or not storage unit 520 stores the input character string associated with the received character string type. When determination unit 512A determines that the input character string is stored, display unit 530 displays the input character string. Second transmission unit 513A transmits the input character string displayed by display unit 530 to data processor 600.

Control unit 610 further includes a signal reception unit 612A and a setting unit 613A. Here, second transmission unit 513A transmits to data processor 600 a selection signal for selecting one input box from one or more input boxes. Signal reception unit 612A receives the selection signal. Setting unit 613A performs a setting process of setting the input box selected by the received selection signal from one or more input boxes to the state where characters can be input.

All or a part of reception unit 511A, determination unit 512A and second transmission unit 513A included in control unit 510 may be configured by hardware. Further, all or a part of reception unit 511A, determination unit 512A and second transmission unit 513A may be a module(s) of a program executed by control unit 510.

Further, all or a part of first transmission unit 611A, signal reception unit 612A and setting unit 613A included in control unit 610 may be configured by hardware. Further, all or a part of first transmission unit 611A, signal reception unit 612A and setting unit 613A may be a module(s) of a program executed by control unit 610.

Figure 47:
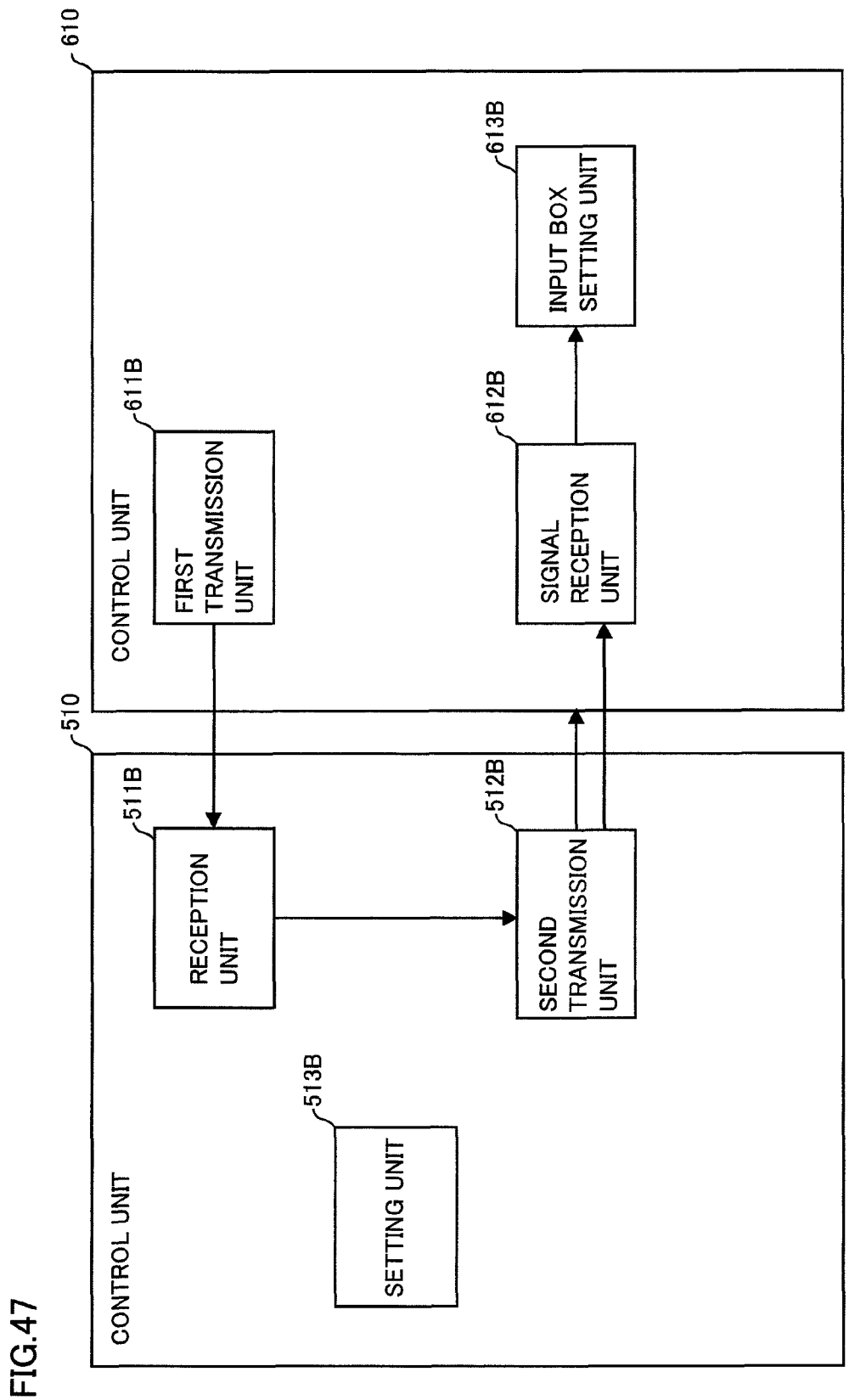
FIG. 47 is a functional block diagram of two different control units in a third embodiment.

FIG. 47 is a functional block diagram of control unit 510 and control unit 610 in the third embodiment. Referring to FIG. 47, control unit 510 includes a reception unit 511B and a second transmission unit 512B. Control unit 610 includes a first transmission unit 611B.

Here, display unit 630 displays one or more input boxes to which a character(s) is to be input. Storage unit 620 stores an input completed character string that is a character string having been input to an input completed box, in association with the input completed box that is an input box in which the character string has been input, among one or more input boxes. First transmission unit 611B transmits to portable terminal 500 the input completed character string associated with the input completed box.

Reception unit 511B receives the input completed character string transmitted from data processor 600. Display unit 530 displays the received input completed character string. An edit unit included in input unit 540 edits the input completed character string displayed by display unit 530. Second transmission unit 512B transmits the character string edited by the edit unit to data processor 600.

Control unit 610 further includes a setting unit 513B. Here, storage unit 620 further stores the input permitted character type that is the type of characters permitted to be input to each of one or more input boxes, in association with the corresponding input box. First transmission unit 611B transmits to portable terminal 500 the input permitted character type associated with the input completed box. Reception unit 511B receives the input permitted character type. Setting unit 513E sets the type of characters to be input by input unit 540 to the input permitted character type.

Control unit 610 further includes a signal reception unit 612B and an input box setting unit 613B. Here, second transmission unit 512B transmits to data processor 600 a selection signal for selecting one input box from one or more input boxes. Signal reception unit 612B receives the selection signal. Input box setting unit 613B performs a setting process of setting the input box selected by the received selection signal from one or more input boxes to the state where characters can be input.

All or a part of reception unit 511B, second transmission unit 512B and setting unit 513B included in control unit 510 may be configured by hardware. Further, all or a part of reception unit 511B, second transmission unit 512B and setting unit 513B may be a module(s) of a program executed by control unit 510.

Further, first transmission unit 611B, signal reception unit 612B and input box setting unit 613B may be configured by hardware. Further, all or a part of first transmission unit 611B, signal reception unit 612B and input box setting unit 613B may be a module(s) of a program executed by control unit 610.

Figure 48:
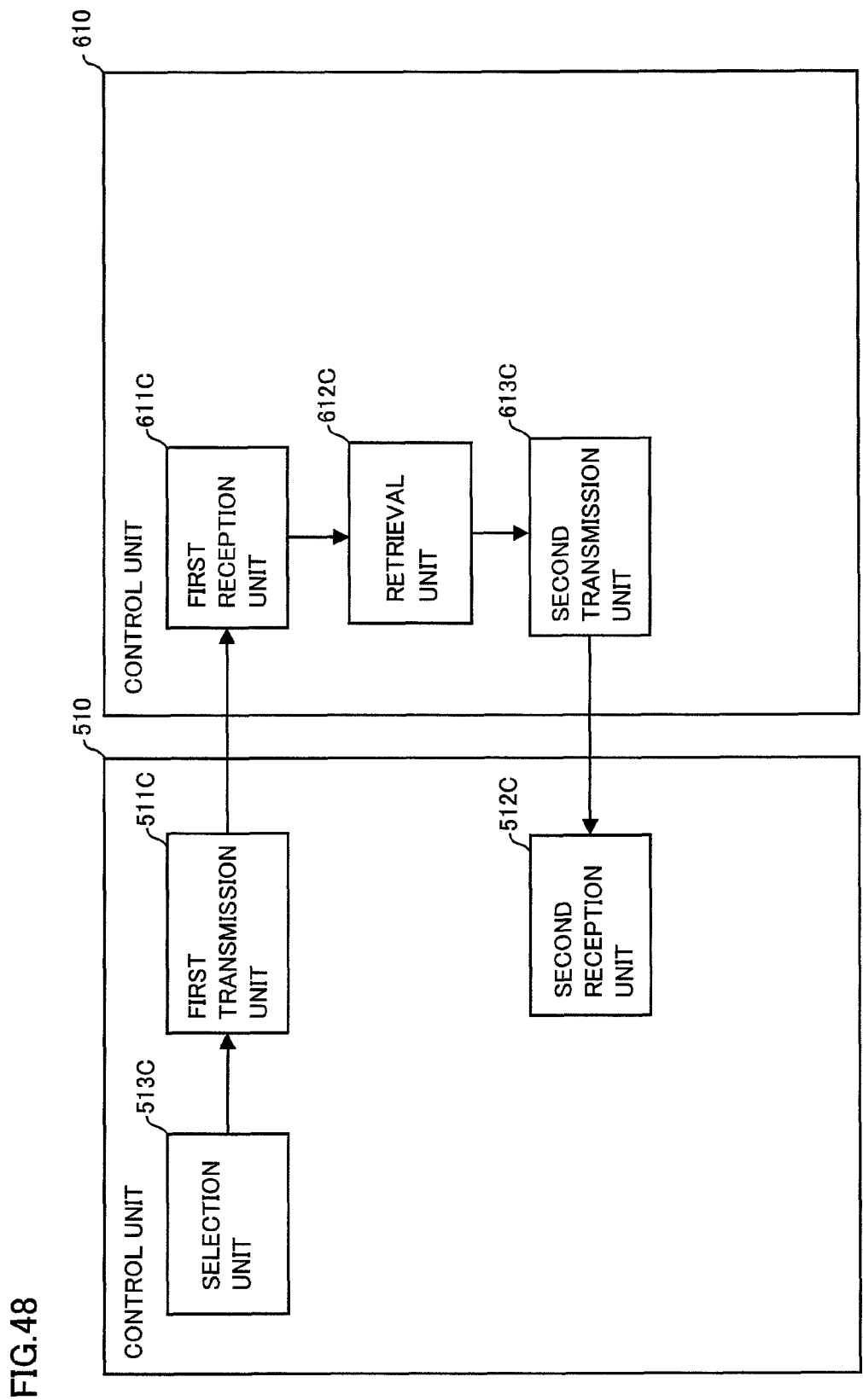
FIG. 48 is a functional block diagram of two different control units in a fourth embodiment.

FIG. 48 is a functional block diagram of control unit 510 and control unit 610 in the fourth embodiment. Referring to FIG. 48, control unit 510 includes a first transmission unit 511C and a second transmission unit 512C. Control unit 610 includes a first reception unit 611C, a retrieval unit 612C and a second transmission unit 613C.

First transmission unit 511C transmits to data processor 600 an input completed character that is an input character, each time input unit 540 inputs the character. Here, storage unit 620 of data processor 600 stores a plurality of character strings. First reception unit 611C receives the input completed character transmitted from portable terminal 500. Retrieval unit 612C retrieves from a plurality of character strings an inclusion character string that is a character string including the received input completed character. Second transmission unit 613C transmits the inclusion character string retrieved by retrieval unit 612C to portable terminal 500. Second reception unit 512C receives the inclusion character string transmitted from data processor 600. Display unit 530 displays the inclusion character string as received.

Control unit 510 further includes a selection unit 513C. Here, second reception unit 512C receives a plurality of inclusion character strings. Display unit 530 displays a plurality of inclusion character strings as received. Selection unit 513C selects one of a plurality of inclusion character strings displayed by display unit 530. First transmission unit 511C transmits to data processor 600 character string identifying information for identifying the inclusion character string selected by selection unit 513C.

All or a part of first transmission unit 511C, second reception unit 512C and selection unit 513C included in control unit 510 may be configured by hardware. Further, all or a part of first transmission unit 511C, second reception unit 512C and selection unit 513C may be a module(s) of a program executed by control unit 510.

Further, all or a part of first reception unit 611C, retrieval unit 612C and second transmission unit 613C included in control unit 610 may be configured by hardware. Further, all or a part of first reception unit 611C, retrieval unit 612C and second transmission unit 613C may be a module(s) of a program executed by control unit 610.

FIG. 49 is a functional block diagram of control unit 510 and control unit 610 in the fifth embodiment. Referring to FIG. 49, control unit 510 includes a reception unit 511D and second transmission unit 513D. Control unit 610 includes a first transmission unit 611D.

Here, display unit 630 displays a plurality of input boxes to which characters are to be input. Storage unit 620 stores the character string type that is the type of a character string requested to be input to each of a plurality of input boxes, in association with the corresponding input box. First transmission unit 611D transmits to portable terminal 500 a plurality of character string types associated respectively with a plurality of input boxes displayed by display unit 630 as well as a plurality of box identifying information pieces for identifying a plurality of input boxes respectively.

Reception unit 511D receives a plurality of character string types and a plurality of box identifying information pieces transmitted from data processor 600. Storage unit 520 stores each of one or more input character strings that are character strings input by input unit 540 among character strings of a plurality of character string types, and the character string type of the input character string, in association with each other. Display unit 530 displays at least one of one or more input character strings stored in storage unit 520. Second transmission unit 513D transmits to data processor 600 one or more input character strings and the box identifying information piece among a plurality of box identifying information pieces for identifying an input box among a plurality of input boxes to which the input character string is requested to be input.

All or a part of reception unit 511D and second transmission unit 513D included in control unit 510 may be configured by hardware. Further, all or a part of reception unit 511D and second transmission unit 513D may be a module(s) of a program executed by control unit 510.

Further, first transmission unit 611D included in control unit 610 may be configured by hardware. Further, first transmission unit 611D may be a module of a program executed by control unit 610.

Applications of the Invention

The first to fifth embodiments have been described where an image displayed on display unit 630 for allowing characters to be input is, by way of example, a web page image (web page image G200 of FIG. 8 for example). The image displayed on display unit 630 for allowing characters to be input is not limited to a web page and may be any image as long as characters can be input at the image.

It should be construed that embodiments disclosed herein are by way of illustration in all respects, not by way of limitation. It is intended that the scope of the present invention is defined by claims, not by the above description, and includes all variations equivalent in meaning and scope to the claims.

The invention claimed is:

1. An input system comprising
a data processor and a portable terminal for performing short-range communication with said data processor,
said data processor including:
   a first display unit for displaying not less than one input box to which a character is to be input;
   a storage unit for storing, in association with an input completed box that is an input box to which a character string has been input among said not less than one input box, an input completed character string that is the character string having been input to said input completed box; and
   a first transmission unit for transmitting to said portable terminal said input completed character string associated with said input completed box, and
said portable terminal including:
   a reception unit for receiving said input completed character string transmitted from said data processor;
   a second display unit for displaying said received input completed character string;
   an edit unit for editing said input completed character string displayed by said second display unit; and
   a second transmission unit for transmitting the character string edited by said edit unit to said data processor.

2. The input system according to claim 1, wherein
said storage unit further stores an input permitted character type that is a type of characters permitted to be input to a corresponding one of said not less than one input box,
said storage unit storing said input permitted character type in association with the corresponding input box,
said first transmission unit transmits said input permitted character type associated with said input completed box to said portable terminal,
said reception unit receives said input permitted character type transmitted from said data processor,
said portable terminal further includes:
   an input unit for inputting a character and including said edit unit; and
   a setting unit for setting a type of characters to be input by said input unit to said input permitted character type, and
the character string edited by said edit unit includes a character that is input by said input unit and is of said input permitted character type set by said setting unit.

3. The input system according to claim 1, wherein
said second transmission unit transmits to said data processor a selection signal for selecting one input box from said not less than one input box, and
said data processor further includes:
   a signal reception unit for receiving said selection signal; and
   an input box setting unit executing a setting process for setting a state of the input box selected by said received selection signal from said not less than one input box, to a state where a character can be input to said input box.

4. The input system according to claim 3, wherein
said first transmission unit transmits to said portable terminal a character string request instruction for requesting a character string in response to execution of said setting process,
said reception unit of said portable terminal receives said character string request instruction, and
said second display unit displays an input image that is an image for inputting a character, and displays said input completed character string in said input image, in response to reception of said character string request instruction.

5. The input system according to claim 1, wherein
said first transmission unit transmits to said portable terminal box identifying information that is information for specifying said input completed box,
said reception unit of said portable terminal receives said box identifying information, and
said second transmission unit transmits to said data processor the character string edited by said edit unit and said box identifying information.

6. The input system according to claim 1, wherein
said first transmission unit transmits to said portable terminal device identifying information that is information for specifying said data processor,
said reception unit of said portable terminal receives said device identifying information, and
said second transmission unit transmits the character string edited by said edit unit to said data processor specified by said received device identifying information.

7. A portable terminal for performing short-range communication with a data processor,
said data processor displaying not less than one input box to which a character is to be input, and storing, in association with an input completed box that is an input box to which a character string has been input among said not less than one input box, an input completed character string that is the character string having been input to said input completed box,
said data processor including a first transmission unit for transmitting to said portable terminal said input completed character string associated with said input completed box, and
said portable terminal comprising:
a reception unit for receiving from said data processor said input completed character string associated with said input completed box;
a display unit for displaying said received input completed character string;
an edit unit for editing said input completed character string displayed by said display unit; and
a second transmission unit for transmitting the character string edited by said edit unit to said data processor.

8. A data processor for performing short-range communication with a portable terminal,
said data processor displaying not less than one input box to which a character is to be input,
said portable terminal receiving an input completed character string that is a character string having been input to an input completed box that is an input box to which the character string has been input among said not less than one input box, and displaying said input completed character string,
said portable terminal including a first transmission unit for transmitting to said data processor said input character string displayed in said display step, and
said data processor comprising:
a storage unit for storing, in association with said input completed box, the input completed character string that is the character string having been input to said input completed box;

a second transmission unit for transmitting to said portable terminal said input completed character string associated with said input completed box; and a reception unit for receiving from said portable terminal a character string generated by editing said input completed character string.

9. An input method for inputting a character by an input system, said input system including a data processor and a portable terminal for performing short-range communication with said data processor, said portable terminal including a display unit for displaying information, said data processor displaying not less than one input box to which a character is to be input, and storing an input completed character string that is a character string having been input to an input completed box that is an input box to which the character string has been input, among said not less than one input box, in association with each other, and said input method comprising the steps of:

transmitting by said data processor to said portable terminal said input completed character string associated with said input completed box;

receiving by said portable terminal said input completed character string transmitted from said data processor;

displaying by said portable terminal said received input completed character string on said display unit;

editing by said portable terminal said displayed input completed character string; and transmitting by said portable terminal the edited character string to said data processor.

10. An input system comprising a data processor and a portable terminal for performing short-range communication with said data processor, said data processor including:
  a first display unit for displaying not less than one input box to which a character is to be input;
  a first storage unit for storing a character string type that is a type of a character string requested to be input to a corresponding one of said not less than one input box, said first storage unit storing said character string type in association with the corresponding input box; and
  a first transmission unit for transmitting to said portable terminal said character string type associated with a character input enabled input box among said not less than one input box displayed by said first display unit, and said portable terminal including:
  an input unit for inputting a character;
  a reception unit for receiving said character string type transmitted from said data processor;
  a second storage unit for storing said received character string type and an input character string that is a character string input by said input unit, in association with each other;
  a determination unit for determining whether said input character string associated with said received character string type is stored by said second storage unit;
  a second display unit for displaying said input character string when said determination unit determines that said input character string is stored; and
  a second transmission unit for transmitting said input character string displayed by said second display unit to said data processor.

11. The input system according to claim 10, wherein
said input unit includes an edit unit for editing said input character string displayed by said second display unit.

12. The input system according to claim 10, wherein
said second transmission unit transmits to said data processor a selection signal for selecting one input box from said not less than one input box, and
said data processor further includes:
  a signal reception unit for receiving said selection signal; and
  a setting unit executing a setting process for setting a state of the input box selected by said received selection signal from said not less than one input box, to a state where a character can be input to said input box.

13. The input system according to claim 10, wherein
said first transmission unit transmits to said portable terminal box identifying information that is information for specifying said character input enabled input box,
said reception unit of said portable terminal receives said box identifying information, and
said second transmission unit transmits to said data processor said input character string and said box identifying information when said determination unit determines that said input character string is stored.

14. The input system according to claim 10, wherein
said first transmission unit transmits to said portable terminal device identifying information that is information for specifying said data processor,
said reception unit of said portable terminal receives said device identifying information, and
said second transmission unit transmits said input character string, when said determination unit determines that said input character string is stored, to said data processor specified by said received device identifying information.

15. A portable terminal for performing short-range communication with a data processor, said data processor displaying not less than one input box to which a character is to be input, and storing a character string type that is a type of a character string requested to be input to a corresponding one of said not less than one input box, said data processor storing said character string type in association with the corresponding input box, said data processor including a first transmission unit for transmitting to said portable terminal said character string type associated with a character input enabled input box among said not less than one input completed box, and said portable terminal comprising:
an input unit for inputting a character;
a reception unit for receiving from said data processor said character string type associated with said character input enabled input box among said not less than one input box;
a storage unit for storing said received character string type and an input character string that is a character string input by said input unit, in association with each other;
a determination unit for determining whether said input character string associated with said received character string type is stored by said storage unit;
a display unit for displaying said input character string when said determination unit determines that said input character string is stored; and
a second transmission unit for transmitting said input character string displayed by said display unit to said data processor.

16. A data processor for performing short-range communication with a portable terminal,
said data processor displaying not less than one input box to which a character is to be input,
said portable terminal receiving a character string type that is a type of a character string requested to be input to a corresponding one of said not less than one input box, storing said character string type and an input character string that is a character string input by said portable terminal, in association with each other and, in a case where said portable terminal stores said input character string associated with said received character string type, said portable terminal displaying said input character string,
said portable terminal including a first transmission unit for transmitting to said data processor said input character string displayed in said display step, and
said data processor comprising:
a storage unit for storing a character string type that is a type of a character string requested to be input to a corresponding one of said not less than one input box, said storage unit storing said character string type in association with the corresponding input box;
a second transmission unit for transmitting to said portable terminal said character string type associated with a character input enabled input box among said not less than one input box; and
a reception unit for receiving from said portable terminal said displayed input character string.

17. An input method for inputting a character by an input system,
said input system including a data processor and a portable terminal for performing short-range communication with said data processor,
said portable terminal including a storage unit for storing information,
said data processor displaying not less than one input box to which a character is to be input, and storing a character string type that is a type of a character string requested to be input to a corresponding one of said not less than one input box, said data processor storing said character string type in association with the corresponding input box, and
said input method comprising the steps of:
transmitting by said data processor to said portable terminal said character string type associated with a character input enabled input box among said not less than one input box;
receiving by said portable terminal said character string type transmitted from said data processor;
storing by said portable terminal in said storage unit said received character string type and an input character string that is a character string input by said portable terminal, in association with each other;
determining by said portable terminal whether said input character string associated with said received character string type is stored in said storage unit;
displaying by said portable terminal said input character string when it is determined that said input character string is stored; and
transmitting by said portable terminal to said data processor said input character string displayed in said displaying step.

18. An input system comprising
a data processor and a portable terminal for performing short-range communication with said data processor,
said data processor including:
a first display unit for displaying a plurality of input boxes to which characters are to be input;
a first storage unit for storing a character string type that is a type of a character string requested to be input to a corresponding one of said plurality of input boxes, said first storage unit storing said character string type in association with the corresponding input box; and
a first transmission unit for transmitting to said portable terminal a plurality of said character string types associated respectively with said plurality of input boxes displayed by said first display unit, and a plurality of box identifying information pieces for specifying said plurality of input boxes respectively,
said portable terminal including:
an input unit for inputting a character; and
a reception unit for receiving said plurality of character string types and said plurality of box identifying information pieces transmitted from said data processor,
said input unit inputting a character string of at least one character string type among said received plurality of character string types, and
said portable terminal further including:
a second storage unit for storing each of not less than one input character string that is a character string input by said input unit, among character strings of said plurality of character string types, and the character string type of the input character string, said second storage unit storing the input character string and the character string type in association with each other;
a second display unit for displaying at least one of said not less than one input character string stored by said second storage unit; and
a second transmission unit for transmitting to said data processor said not less than one input character string, and the box identifying information piece among said plurality of box identifying information pieces, for specifying an input box among said plurality of input boxes, to which input of the input character string is requested.

19. The input system according to claim 18, wherein said input unit includes an edit unit for editing said input character string displayed by said second display unit.

20. The input system according to claim 18, wherein said first transmission unit transmits to said portable terminal device identifying information that is information for specifying said data processor,
said reception unit receives said device identifying information, and
said second transmission unit transmits said not less than one input character string to said data processor specified by said received device identifying information.

21. A portable terminal for performing short-range communication with a data processor,
said data processor displaying a plurality of input boxes to which characters are to be input, and storing a character string type that is a type of a character string requested to be input to a corresponding one of said plurality of input boxes, said data processor storing said character string type in association with the corresponding input box, and
said portable terminal comprising:
an input unit for inputting a character; and
a reception unit for receiving from said data processor a plurality of said character string types associated respectively with said plurality of input boxes, and a plurality of box identifying information pieces for specifying said plurality of input boxes respectively, said input unit inputting a character string of at least one character string type among said received plurality of character string types, said portable terminal further comprising:

a storage unit for storing each of not less than one input character string that is a character string input by said input unit, among character strings of said plurality of character string types, and the character string type of the input character string, said storage unit storing the input character string and the character string type in association with each other;

a display unit for displaying at least one of said not less than one input character string stored by said storage unit; and a transmission unit for transmitting to said data processor said not less than one input character string, and the box identifying information piece among said plurality of box identifying information pieces, for specifying an input box among said plurality of input boxes, to which input of the input character string is requested.

22. A data processor for performing short-range communication with a portable terminal, said data processor displaying a plurality of input boxes to which characters are to be input, said portable terminal receiving a plurality of character string types that are each a type of a character string requested to be input to a corresponding one of said plurality of input boxes and receiving a plurality of box identifying information pieces for specifying said plurality of input boxes respectively, storing each of not less than one input character string that is input by said portable terminal, among character strings of said plurality of character string types and storing the character string type of the input character string, in association with each other, and displaying at least one of said not less than one input character string, and said data processor comprising:

a storage unit for storing a character string type that is a type of a character string requested to be input to a corresponding one of said plurality of input boxes, said storage unit storing said character string type in association with the corresponding input box;

a transmission unit for transmitting to said portable terminal a plurality of said character string types associated respectively with said plurality of input boxes and said plurality of box identifying information pieces; and a reception unit for receiving from said portable terminal said not less than one input character string, and a box identifying information piece among said plurality of box identifying information pieces, for specifying an input box among said plurality of input boxes, to which the input character string is requested to be input.

23. An input method for inputting a character by an input system, said input system including a data processor and a portable terminal for performing short-range communication with said data processor, said portable terminal including a storage unit for storing information, said data processor displaying a plurality of input boxes to which characters are to be input, and storing a character string type that is a type of a character string requested to be input to a corresponding one of said plurality of input boxes, said data processor storing the character string type in association with the corresponding input box, and said input method comprising the steps of:

transmitting by said data processor to said portable terminal a plurality of said character string types associated respectively with said plurality of input boxes, and a plurality of box identifying information pieces for specifying said plurality of input boxes respectively;

receiving by said portable terminal said plurality of character string types and said plurality of box identifying information pieces transmitted from said data processor;

storing by said portable terminal in said storage unit each of not less than one input character string that is a character string input by said portable terminal, among character strings of said plurality of character string types, and the character string type of the input character string, in association with each other;

displaying by said portable terminal at least one of said not less than one input character string stored in said storage unit; and transmitting by said portable terminal to said data processor said not less than one input character string, and a box identifying information piece among said plurality of box identifying information pieces, for specifying an input box among said plurality of input boxes, to which the input character string is requested to be input.

* * * * *